(12) United States Patent
Howarth

(10) Patent No.: US 12,460,565 B2
(45) Date of Patent: Nov. 4, 2025

(54) LIQUID SEPARATOR SYSTEM

(71) Applicant: LTH HOLDINGS PTY LTD, Currumbin Waters (AU)

(72) Inventor: Leon Howarth, Currumbin Waters (AU)

(73) Assignee: LTH HOLDINGS PTY LTD, Currumbin Waters (AU)

( * ) Notice: Subject to any disclaimer, the term of this patent is extended or adjusted under 35 U.S.C. 154(b) by 0 days.

(21) Appl. No.: 18/549,813

(22) PCT Filed: Mar. 9, 2022

(86) PCT No.: PCT/AU2022/050193
§ 371 (c)(1),
(2) Date: Sep. 8, 2023

(87) PCT Pub. No.: WO2022/187897
PCT Pub. Date: Sep. 15, 2022

(65) Prior Publication Data
US 2024/0151170 A1    May 9, 2024

(30) Foreign Application Priority Data
Mar. 10, 2021   (AU) ................................ 2021900676

(51) Int. Cl.
*F01M 13/04*        (2006.01)
*B01D 45/08*        (2006.01)
(Continued)

(52) U.S. Cl.
CPC ............. *F01M 13/04* (2013.01); *B01D 45/08* (2013.01); *B01D 45/16* (2013.01);
(Continued)

(58) Field of Classification Search
CPC .... F01M 11/12; F01M 13/0011; F01M 13/04; F01M 2013/0438; B01D 45/08;
(Continued)

(56) References Cited

U.S. PATENT DOCUMENTS 4,167,164 A * 9/1979 Bachmann ............. F01M 13/04
                                                                    123/573
4,668,393 A * 5/1987 Stone ..................... B01D 21/10
                                                                    210/493.4
(Continued)

FOREIGN PATENT DOCUMENTS

CN         205638604 U  * 10/2016
DE    102010027787 A1 * 10/2011   ........... B01D 46/003
(Continued)

OTHER PUBLICATIONS

International Search Report and Written Opinion received for PCT/AU2022/050193, mailed May 19, 2022.

*Primary Examiner* — John M Zaleskas
(74) *Attorney, Agent, or Firm* — Greer, Burns & Crain, Ltd

(57) ABSTRACT

A liquid separator system for removing liquid particles from a blow-by gas stream in the internal combustion engine is disclosed. The system has a liquid separating device and a remote warning/maintenance system generating a signal for an operator of the internal combustion engine. The liquid separator device has a base housing with at least one receptacle with a filter element and a pressure regulator is received within a removable cap portion. A liquid level sensor is mounted in the base housing in the receptacle. A pressure sensing system has a filter blocked valve to indicate a partially blocked filter element. When a filter is partially blocked the pressure sensing system generates a signal to the remote warning/maintenance system and when liquid in the (Continued)

base housing reaches a predetermined level the liquid level sensor generates a signal to the remote warning/maintenance system.

19 Claims, 35 Drawing Sheets

(51) Int. Cl.
| | |
|---|---|
| *B01D 45/16* | (2006.01) |
| *B01D 46/00* | (2022.01) |
| *B01D 46/24* | (2006.01) |
| *B01D 46/44* | (2006.01) |
| *B01D 50/20* | (2022.01) |
| *F01M 11/12* | (2006.01) |
| *F01M 13/00* | (2006.01) |
| *F02M 25/06* | (2016.01) |
| *G07C 5/00* | (2006.01) |
| *G07C 5/08* | (2006.01) |

(52) U.S. Cl.
CPC ..... *B01D 46/0031* (2013.01); *B01D 46/0086* (2013.01); *B01D 46/24* (2013.01); *B01D 46/2411* (2013.01); *B01D 46/446* (2013.01); *B01D 50/20* (2022.01); *F01M 11/12* (2013.01); *F01M 13/0011* (2013.01); *F02M 25/06* (2013.01); *G07C 5/008* (2013.01); *G07C 5/0816* (2013.01); *F01M 2013/0066* (2013.01); *F01M 2013/0083* (2013.01); *F01M 2013/0438* (2013.01); *F01M 2250/60* (2013.01)

(58) Field of Classification Search
CPC .. B01D 45/16; B01D 46/003; B01D 46/0031; B01D 46/0086; B01D 46/24; B01D 46/241; B01D 50/20; F02M 25/06
See application file for complete search history.

(56) References Cited

U.S. PATENT DOCUMENTS

| | | | | |
|---|---|---|---|---|
| 4,740,299 A | * | 4/1988 | Popoff | B01D 35/18 |
| | | | | 210/232 |
| 6,058,917 A | * | 5/2000 | Knowles | F02D 11/02 |
| | | | | 123/573 |
| 6,279,555 B1 | * | 8/2001 | Crowell | F01M 13/022 |
| | | | | 123/572 |
| 11,326,489 B1 | * | 5/2022 | Brazeel | F01M 13/0011 |
| 2004/0069286 A1 | * | 4/2004 | Knowles | F01M 13/04 |
| | | | | 123/572 |
| 2005/0211232 A1 | * | 9/2005 | Dushek | F16K 17/0453 |
| | | | | 123/574 |
| 2006/0207948 A1 | * | 9/2006 | Hacker | B01D 35/16 |
| | | | | 210/791 |
| 2010/0139585 A1 | * | 6/2010 | Frazier, Jr. | F02M 35/10222 |
| | | | | 123/573 |
| 2011/0017155 A1 | * | 1/2011 | Jacob | B01D 46/2414 |
| | | | | 123/41.86 |
| 2011/0023425 A1 | * | 2/2011 | De Paepe | B01D 46/0087 |
| | | | | 55/312 |
| 2014/0096753 A1 | * | 4/2014 | Monros | F01M 13/04 |
| | | | | 123/574 |
| 2014/0352271 A1 | * | 12/2014 | Jacob | F01M 13/04 |
| | | | | 55/492 |
| 2015/0345349 A1 | * | 12/2015 | Monros | F01M 13/04 |
| | | | | 123/574 |
| 2016/0138442 A1 | * | 5/2016 | An | F01M 13/04 |
| | | | | 123/559.1 |
| 2016/0169143 A1 | * | 6/2016 | Monros | F01M 13/04 |
| | | | | 123/525 |
| 2016/0348550 A1 | * | 12/2016 | Zuerker | F01M 13/04 |
| 2016/0376951 A1 | * | 12/2016 | Jacob | B01D 46/0031 |
| | | | | 55/492 |
| 2017/0002705 A1 | * | 1/2017 | Grein | B01D 46/003 |
| 2017/0014745 A1 | * | 1/2017 | Zuerker | B01D 50/20 |
| 2019/0178123 A1 | * | 6/2019 | Mainiero | F01M 13/0011 |
| 2020/0325807 A1 | * | 10/2020 | Ishida | B01D 45/14 |

FOREIGN PATENT DOCUMENTS

| | | | | | |
|---|---|---|---|---|---|
| FR | | 2910069 A1 | * | 6/2008 | ........ F02M 37/221 |
| JP | | H02294510 A | * | 12/1990 | |
| JP | | H0351121 U | * | 5/1991 | |
| JP | | 2004285870 A | * | 10/2004 | |
| JP | | 2005146887 A | * | 6/2005 | |
| JP | | 2006170164 A | * | 6/2006 | |
| JP | | 2007/120431 A | | 5/2007 | |
| KR | | 20030049046 A | * | 6/2003 | |
| KR | | 20040024096 A | * | 3/2004 | |

* cited by examiner

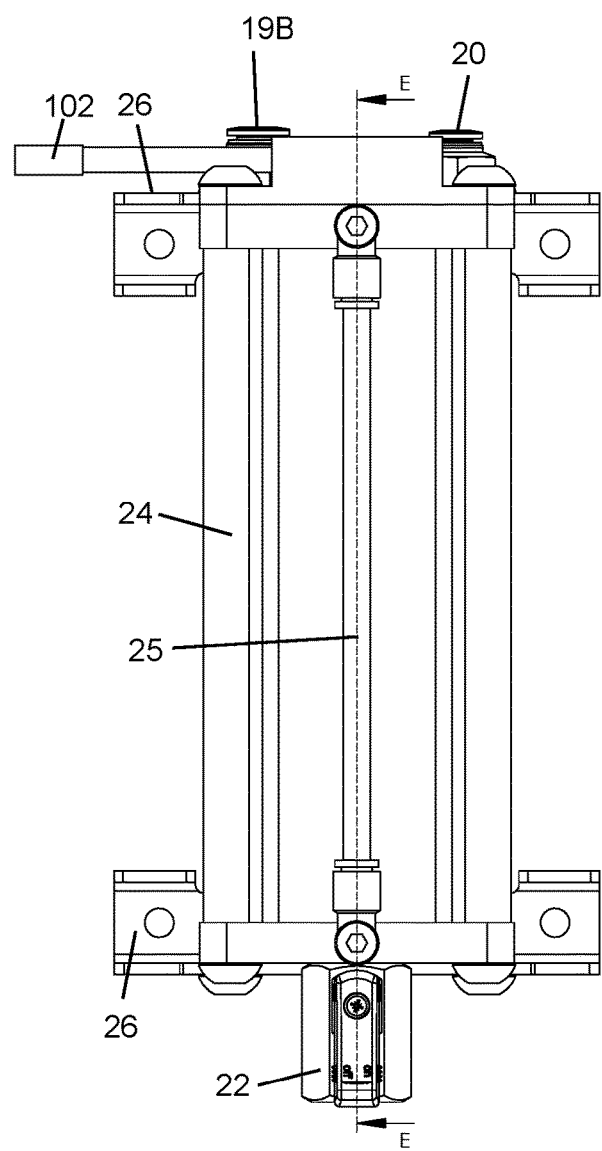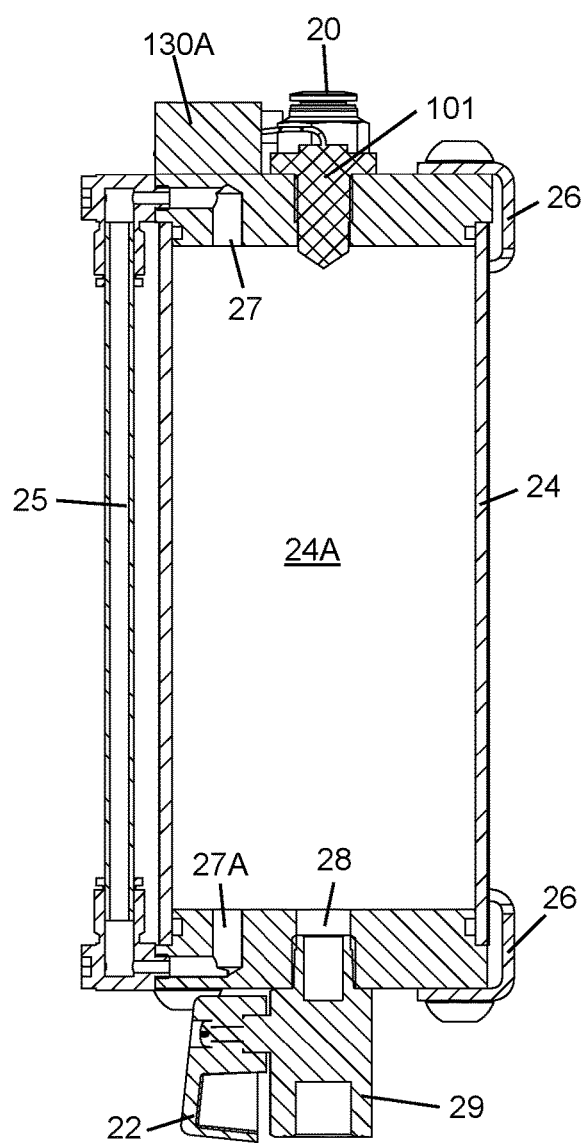
FIG. 22
FIG. 23

LIQUID SEPARATOR SYSTEM

BACKGROUND

The present invention relates to pollution control for internal combustion engines and, more particularly although not exclusively to management of liquid laden gases generated in internal combustion engines.

It should be noted that reference to the prior art herein is not to be taken as an acknowledgement that such prior art constitutes common general knowledge in the art.

An internal combustion engine generates blow-by gas in a crankcase containing engine oil and an oil, fuel and other liquid aerosol. Blow-by gases are created with every piston stroke in a combustion engine. These gases enter into the crankcase as exhaust gases, which flow between the piston rings and sleeves. The blow-by gas needs to be expelled as excessive crankcase pressure will damage the engine and cause poor engine performance. Regulations governing car emissions stipulate that the crankcase ventilation must not enter the atmosphere and so the blow-by gas must recirculate using a closed system known as a positive crankcase ventilation (PCV) system back into the engine air intake path and subsequently be burnt by the combustion process and pass to the atmosphere via the engine exhaust.

Without any form of separating or cleaning of the liquid from the blow-by gas the pollutants can cause deposits that form on engine components such as turbo chargers, intercoolers, intake manifolds, inlet valves and in the combustion chamber. These deposits can negatively influence the engine performance, fuel consumption and the life and durability of the engine. Both closed and open crankcase ventilation systems for internal combustion engines are known in the prior art. The open systems (without a cleaning process) direct the often-hazardous liquid laden blow-by gases through a pipe into the atmosphere exposing the environment to all the undesirable gases and their damaging environmental effects. In view of the pollution aspect and environmental requirements, allowing blow-by gases into the environment is unacceptable. The closed positive crankcase ventilation system solves this problem.

A liquid air separator basically operates to remove the liquid from the blow-by gases by relying firstly on gravity, given that oil is heavier than air to separate the two, and then some form of filter or coalescing filtration system. With minimal loss, the engine oil taken out is then returned to the oil sump where it can re-enter the engine oil circuit. The cleaned gas passes through a pressure valve which regulates the pressure inside the crankcase to within permissible limits. Therefore, the task of the separator device is that of allowing the recirculation of the blow-by gases, in the system for supplying air, to the engine, simultaneously preventing the liquid particles from ending up in the engine air intake.

The known liquid air separator systems are fitted in line with the crankcase breather system. It is placed in between the engine crankcase breather outlet and the engine air intake system. As the crank vapours pass through the liquid air separator the oil droplets, un-burnt fuel, and water vapour will be separated and settle in the bottom of the tank. This stops the liquid from reaching the engine air intake and causing the issues mentioned above. A liquid air separator will often have some sort of filter media inside such as a fine metal mesh or paper filter which will create a much larger surface area to allow liquids to be separated from gasses. Over time the liquid air separator tank will fill up with the excess liquid and will need to be drained. Likewise, the filter media will become partially blocked and need to be cleaned or replaced. In recent times, liquid air separators have been designed to incorporate by-pass valves and pressure regulation/compensation valves.

The known liquid air separators all suffer from several inherent problems. For example, as mentioned above without regular maintenance the liquid air separator liquid collection tank can become full and or the filter media can become partially blocked and force the filter by-pass valve to open, allowing unfiltered oil and liquids to circulate either directly to the atmosphere or to downstream engine components. Thus, on an ongoing or unmanaged basis the blow-by gasses are being allowed to enter the atmosphere, damaging the engine or affecting engine performance. Crankcase pressures increase accordingly and can force oil past engine gaskets and seals. This can lead to increased fuel consumption, loss of engine power, elevated exhaust emissions and a host of other engine operating problems result.

An additional compounding factor is the human element, in that many owner/operators do not regularly change their liquid air separator filter and likewise do not drain the excess oil which builds up over time in the liquid air separator tank. In most cases, after the liquid air separator is installed in the engine compartment it is simply forgotten. As such, the performance of the liquid air separator degrades rapidly because of the build-up of contaminants on the filter media and the excessive liquid level in the liquid air separator tank. Some liquid air separators are also difficult to maintain because they have not been designed to be easily disassembled to allow access to the interior of the liquid air separator and/or they are mounted in inaccessible locations within the engine compartment. In some cases, liquid air separators are designed as a throw-away item and therefore are not maintainable. This is both expensive and unfriendly to the environment.

The actual size of the liquid air separator is another issue identified with the known liquid air separators. To effectively separate the oil and liquid from the blow-by gas requires a high flow capacity of gas over the filter media within the liquid air separator. To achieve a suitable flow rate, most known liquid air separators simply have a single filter element located within a large housing. This can be an issue as in the majority of internal combustion engine compartments space is at a premium, especially in modern day vehicles and the ability of a single liquid air separator filter element to handle the required blow-by gas flow rates generated in larger engines is sometimes marginal at best.

Clearly it would be advantageous if a liquid separator system for an internal combustion engine could be devised that helped to at least ameliorate some of the shortcomings described above. In particular, it would be beneficial to provide a liquid separator system to control liquid laden gases generated in internal combustion engines which provided an indication of partially blocked filter/s and high liquid levels in the liquid separating system or at least provide the public with a useful choice.

SUMMARY

In accordance with a first aspect, the present invention provides a liquid separator system for an internal combustion engine, the liquid separator system comprising: a liquid separating device for removing liquid particles from a blow-by gas stream from a crankcase, the liquid separating device comprising: an elongated housing having a removable cap portion mounted on a base housing, an inlet port, an outlet port, a drain port, at least one receptacle in the base housing, the inlet port in fluid communication with the crankcase and the outlet port is in fluid communication with an engine air inlet manifold; a filter element disposed within the at least one receptacle, the filter element when positioned within the receptacle leaving an annular space between an external surface of the filter element and an internal surface of the filter receptacle; a pressure regulator received within the removable cap portion, the pressure regulator keeps a predetermined crankcase pressure independent from a negative pressure of the engine air intake manifold; a pressure sensing system in fluid communication with the filter element, the pressure sensing system is adapted to detect a pressure built up in the liquid separating device due to a partially blocked filter element; and a liquid level sensor mounted adjacent a bottom portion of the base housing in the at least one receptacle, the liquid level sensor is adapted to detect when a level of liquid within the base housing has reached a predetermined level; a remote warning/maintenance system to generate a signal for an operator of the internal combustion engine; and wherein the pressure sensing system generates a signal to the remote warning/maintenance system when the pressure build up is sensed indicating the filter is partially blocked, and the liquid level sensor generates a signal to the remote warning/maintenance system when the liquid in the base housing has reached the predetermined level.

Preferably, the removable cap portion may be secured to the base housing by a fastener arrangement to close an upper end of the base housing. Preferably, the fastener arrangement may be positively retained within the removable cap portion when the removable cap portion is detached from the base housing to allow access within the liquid separating device. The fastener arrangement may be a plurality of fasteners.

Preferably, the outlet port may extend axially from the removable cap portion and is aligned with and above the inlet port extending axially from the base housing.

Preferably, the removable cap portion may be adapted to be rotatable on the base housing to change a position of the outlet port with respect to the inlet port.

Preferably, the internal surface of the at least one filter receptacle in the base housing may have a surface finish that is adapted to maximize a liquid wettability of the internal surface of the receptacle, the blow-by gas flow has a tangential nature relative to the internal surface of the receptacle which in conjunction with the surface finish increases the separating efficiency of oil and similar liquid particles in the blow-by gas flow within the receptacle, the surface finish assists with collecting and promoting the liquid in a downward flow and encouraging the blow-by gas in a downward direction through the filter receptacle to ensure that the blow-by gas is cleaned over substantially the entire length of the filter element.

Preferably, the surface finish may form a sawtooth spiral pattern or any other pattern on the internal surface of the at least one receptacle.

Preferably, the drain port in the lower portion of the base housing may be connected to any one of: a) a hose connected directly into a sump on the internal combustion engine; b) a drain valve connected directly to the drain port or connected on the distal end of a hose with a proximal end connected to the drain port; or c) a remote reservoir connected by a hose to the drain port.

Preferably, when the drain port is connected to the remote reservoir, the remote reservoir may comprise: an elongated housing having a first end spaced apart from a second end with a reservoir formed therebetween; an inlet port positioned on the first end for connecting the hose from the drain port; a breather vent positioned on the first end of the elongated housing to allow any pressure in the reservoir to escape to atmosphere, the breather vent having a floating member designed to seal the vent and prevent any liquid in the reservoir escaping through the breather vent; a liquid level sensor mounted in the first end and in fluid communication with the reservoir, the liquid level sensor is adapted to detect when a level of liquid within the reservoir has reached a predetermined level; a sight glass indicating the level of liquid in the reservoir; and a reservoir drain port positioned in the second end of the housing to allow a user to drain the remote reservoir.

Preferably, the breather vent may have an internal channel formed therein with an upper ball seat spaced apart from a lower ball seat.

Preferably, the floating member may be a polyethylene ball weighted to float on the liquid in the reservoir, when the liquid in the reservoir reaches the level of the breather valve in the first end of the elongated housing the polyethylene ball will float on the liquid and close the upper ball seat and seal the breather vent.

Preferably, the floating member may prevent air or liquid entering the reservoir from the environment as well as avoiding a possible vacuum within the liquid separator system from allowing liquid within the remote reservoir from being pushed or sucked back into the liquid separator device.

Preferably, the filter element may be formed as a removable cylindrical filter. The removable cylindrical filter may have a filter case and a filter medium housed therein, the filter medium extending parallel to the filter case. The filter medium may be formed from any one of a metal mesh, a synthetic fibre or a natural fibre material.

Preferably, the removable cap portion may further comprise a cover for securing the pressure regulator within the removable cap portion.

Preferably, a plurality of slots may extend around an underside of the cover, each slot extends axially from an outer periphery of the underside of the cover, when the cover is secured to the removable cap portion, the slots form an open space between the underside of the cover and the removable cap portion to open a space above the pressure regulator to atmosphere.

Preferably, the pressure regulator may comprise a moveable means and a biasing mechanism, wherein during operation of the liquid separator system the moveable means and the biasing mechanism open and close the outlet port to regulate the flow of blow-by gas to keep a predetermined crankcase pressure independent from a negative pressure of the engine air intake manifold. The moveable means may further comprise a surge reduction plate with cutouts in the surge reduction plate to reduce pressure surge and allow blow-by gas from the crankcase to maintain flow to the air intake manifold when the moveable means is in a closed position.

Alternatively, the moveable means may be an elastomeric diaphragm, the elastomeric diaphragm is produced from a synthetic co-polymer such as nitrile.

Preferably, the pressure sensing system may further comprise: an electronic controller allowing connection to the remote warning/maintenance system; a filter blocked valve mounted adjacent an inner rear portion of the base housing and positioned to open and close a pressure relief port; and a filter blocked switch.

Preferably, the electronic controller may be mounted to an outer rear portion of the base housing, the electronic controller has a conformal coating to protect the electronic controller from moisture, dust, chemicals, and temperature extremes. The conformal coating may be selected from any one or more of the group consisting of acrylics, silicones, urethanes, polymers or any combination thereof.

Preferably, the remote warning/maintenance system may comprise a warning light and a reset switch. The remote warning/maintenance system may further comprise a warning buzzer.

Preferably, the electronic controller may comprise: a fixed contact portion of the filter blocked switch; a latching relay; a warning buzzer; a delay circuit for the liquid level sensor; and an electrical connector.

Preferably, the electronic controller may further comprise circuitry to activate the warning light and/or buzzer and circuitry to: a) control a flash rate of the warning light to provide the operator of the internal combustion engine with a fault indication based on the flash rate of the warning light; and b) control a flash rate of the warning light to provide the operator of the internal combustion engine with a status indication of the liquid separator system when power is connected to the liquid separator system.

Preferably, the electronic controller may connect to the remote warning/maintenance system electrically via a wiring harness incorporated into the electrical connector.

Alternatively, the electronic controller may connect to the remote warning/maintenance system wirelessly via a wireless transceiver mounted on the electronic controller.

Preferably, the electronic controller may be a programmable computing device comprising a communication interface, a central processing unit in communication with the communication interface, and a memory in communication with the central processing unit, the memory having stored therein a set of machine readable code executable by the programmable computing device to perform one or more operations. The machine readable code may comprise code for receiving and sending, via the communication interface, instructions for operation and control of the liquid separator system.

Preferably, the code for receiving and sending instructions for operation and control of the liquid separator system may comprise code for receiving and sending the instruction for operation and control from an application running on a mobile device or a remote communication device, wherein the application allows a user to send and receive the instructions, the mobile or remote communication device communicating with the liquid separator system using a Bluetooth technology or any wireless communication technology.

Preferably, the pressure relief port may extend centrally from the at least one receptacle in the base housing so that the filter blocked valve is in fluid communication with the filter element.

Preferably, the filter blocked valve may further comprise a moveable means and a biasing mechanism, wherein during operation of the liquid separator system when the filter element becomes partially blocked an increase in pressure in the crankcase and within the liquid separating device overcomes the biasing member and opens the moveable means to allow an amount of the flow of blow-by gas to atmosphere.

Alternatively, the filter blocked valve may further comprise a moveable means and a biasing mechanism, wherein during operation of the liquid separator system when the filter element becomes partially blocked an increase in pressure in the crankcase and within the liquid separating device overcomes the biasing member and opens the moveable means to allow an amount of the flow of blow-by gas to flow back to the engine air inlet manifold via the outlet port of the liquid separating device.

Preferably, the moveable means may further comprise a metal contact plate which is adapted to move with the moveable means between open and closed positions, the metal contact plate forming a moving contact of the filter blocked switch.

Preferably, when in the open position the metal contact plate may close the circuit with the fixed contact portion of the filter blocked switch on the electronic controller to activate the remote warning/maintenance system.

Preferably, the moveable means may have a knife edge surface which closes the moveable means against the pressure relief port, the knife edge surface increases the contact pressure between the movable means and a seat surface of the pressure relief port to prevent leakage of gas pressure and liquid within the pressure relief port.

Preferably, the moveable means may be an elastomeric diaphragm, the elastomeric diaphragm is produced from a synthetic co-polymer such as nitrile.

Preferably, the liquid level switch may be selected from any one of: a) a mechanical switch; b) a pneumatic switch; c) an optical sensor; d) an ultrasonic sensor; e) a conductive sensor; or f) any other liquid level sensor.

Preferably, the base housing and the removable cap portion of the liquid separating device may be a polymer material formed by an injection molding process or any other known process. The polymer material may be a reinforced polyamide 66 with 30% glass fiber.

Preferably, the liquid separating device may provide a high airflow capacity within a compact sized housing.

Preferably, the electronic controller of the liquid separating device may be connected to a 12 or 24 VDC power source to supply the system with power to the respective components.

Preferably, the internal combustion engine may be powered by an energy-dense fuel such as petrol or diesel fuel, liquids derived from fossil fuels.

Preferably, the base housing may further comprise at least one mounting block positioned on an outer rear portion of the base housing, the at least one mounting block having mounting apertures for receiving fasteners therein to allow the liquid separating device to be secured in close proximity to the internal combustion engine.

Alternatively, the at least one receptacle may comprise a pair of receptacles with a filter element positioned within each receptacle leaving an annular space between an external surface of the filter element and an internal surface of each filter receptacle.

Preferably, the pair of receptacles may be positioned on opposing sides of a flow splitter means within the base housing of the liquid separating device. The flow splitter means may comprise a leading edge positioned diametrically opposite and centrally positioned within the inlet port.

Preferably, the leading edge may be vertically aligned with a centerline passing vertically between each receptacle in the base housing, and the leading edge has a height which is substantially equivalent to an internal diameter of the inlet port.

Preferably, a pair of diametrically opposite openings of equivalent cross sectional area to that of the inlet port may be formed in fluid communication with the inlet port and positioned between the inlet port and the leading edge of the flow splitter. Each opening may be in fluid communication with each annular space formed between the filter element and the internal wall of each receptacle of the base housing, the internal walls of the receptacles forming two opposing, substantially equally sized faces, which are formed contiguous to each other at the leading edge, with each face being oriented to form a substantially similar deflection angle with respect to the leading edge of the flow splitter.

Preferably, the leading edge and the two opposing, substantially equally sized faces of the receptacles may form two symmetrical flow paths which divide the inlet blow-by gas stream into two equal parts.

Preferably, as the blow-by gas enters the inlet port and flows in a direction substantially parallel to the longitudinal axis of the inlet port, the blow-by gas may hit the flow splitter tangentially, thereby splitting the volume of the blow-by gas stream equally so that each part enters the opening in each receptacle and is distributed evenly into the annular space and over each filter element, the reduction in volume of the blow-by gas also has a subsequent reduction in velocity.

Preferably, the internal surface of each filter receptacle in the base housing may have a surface finish that is adapted to maximize a liquid wettability of the internal surface of the receptacle to assist with collecting and promoting the liquid in a downward flow and encouraging the blow-by gas in a downward direction through each filter receptacle to ensure that the blow-by gas is cleaned over substantially the entire length of each filter element.

Preferably, the pressure relief port may extend centrally from a position approximately in between the pair of receptacles in the base housing so that the filter blocked valve is in fluid communication with both filter elements.

In accordance with a further aspect, the present invention provides a liquid separator system for an internal combustion engine, the liquid separator system comprising: a liquid separating device for removing liquid particles from a blow-by gas stream from a crankcase, the liquid separating device comprises an elongated housing having a removable cap portion mounted on a base housing, an inlet port, an outlet port, a drain port, at least one receptacle in the base housing with a filter element disposed therein, a pressure regulator received within the removable cap portion and adapted to open and close the outlet port to keep the crankcase pressure independent from the pressure in an engine air intake manifold, a pressure sensing system in fluid communication with the filter element and adapted to detect a pressure built up in the liquid separating device due to a partially blocked filter element, and a liquid level sensor mounted adjacent a bottom portion of the base housing in the receptacle and adapted to detect when a level of liquid within the base housing has reached a predetermined level; a remote warning/maintenance system to generate a signal for an operator of the internal combustion engine; and wherein the pressure sensing system generates a signal to the remote warning/maintenance system when the pressure build up is sensed indicating the filter is partially blocked, and the liquid level sensor generates a signal to the remote warning/maintenance system when the liquid in the base housing has reached the predetermined level.

Preferably, the liquid separator system may comprise any one of the features of the first aspect.

In accordance with a still further aspect, the present invention provides a liquid separator system for an internal combustion engine, the system comprising: a liquid separating device for removing liquid particles from a blow-by gas stream from a crankcase, the liquid separating device comprising: an elongated housing having a removable cap portion mounted on a base housing, an inlet port, an outlet port, a drain port, a pair of receptacles in the base housing positioned on opposing sides of a centrally located flow splitter means, the inlet port is in fluid communication with the crankcase and the outlet port is in fluid communication with an engine air inlet manifold; a filter element disposed within each receptacle, the filter element when positioned within the receptacle leaving an annular space between an external surface of the filter element and an internal surface of the filter receptacle; a pressure regulator received within the removable cap portion, the pressure regulator opens and closes the outlet port to keep a predetermined crankcase pressure independent from a negative pressure of the engine air intake manifold; a pressure sensing system in fluid communication with each filter element, the pressure sensing system is adapted to detect a pressure built up in the liquid separating device due to a partially blocked filter element; and a liquid level sensor mounted adjacent a bottom portion of the base housing in one of the pair of receptacles, the liquid level sensor is adapted to detect when a level of liquid within the base housing has reached a predetermined level; a remote warning/maintenance system to generate a signal for an operator of the internal combustion engine; and wherein the pressure sensing system generates a signal to the remote warning/maintenance system when the pressure build up is sensed indicating the filter is partially blocked, and the liquid level sensor generates a signal to the remote warning/maintenance system when the liquid in the base housing has reached the predetermined level; and wherein a differential pressure between the crankcase and the engine air inlet manifold of the internal combustion engine draws blow-by gas stream from the crankcase to maintain a regulated pressure within the crankcase and pass the blow-by gas stream through the inlet port, the flow splitter means positioned opposite the inlet port equally splits the flow and velocity of the blow-by gas into each filter receptacle and the filter elements separate the liquid from the blow-by gas and drains the liquid to the bottom of the base housing to prevent passing the liquid in the blow-by gas to the engine air inlet manifold.

Preferably, the liquid separator system may comprise any one of the features of the first aspect.

In accordance with a still further aspect, the present invention provides a liquid separating device for removing liquid particles from a blow-by gas stream from an internal combustion engine, the liquid separating device comprising: an elongated housing having a removable cap portion mounted on a base housing; an inlet port adapted to be in fluid communication with a crankcase of the internal combustion engine; an outlet port adapted to be in fluid communication with an engine air inlet manifold of the internal combustion engine; at least one receptacle in the base housing; a drain port positioned centrally in a bottom portion of the base housing; a filter element disposed within the at least one receptacle, the filter element when positioned within the receptacle leaving an annular space between an external surface of the filter element and an internal surface of the filter receptacle; a pressure regulator received within the removable cap portion, the pressure regulator opens and closes the outlet port to keep a predetermined crankcase pressure independent from a negative pressure of the engine air intake manifold; a pressure sensing system in fluid communication with the filter element, the pressure sensing system is adapted to detect a pressure built up in the liquid separating device due to a partially blocked filter element; a liquid level sensor mounted adjacent a bottom portion of the base housing in the at least one receptacle, the liquid level sensor is adapted to detect when a level of liquid in the base housing has reached a predetermined level; an electronic controller mounted on an outer rear portion of the base housing, the electronic controller activating a remote warning/maintenance system when the filter is partially blocked and the pressure sensing system detects the pressure build up in the liquid separating device and/or the liquid level sensor detects that the liquid in the base housing has reached the predetermined level, the remote warning/maintenance system generating a signal for an operator of the internal combustion engine; and wherein a differential pressure between the crankcase and the engine air inlet manifold of the internal combustion engine draws the blow-by gas stream from the crankcase to maintain a regulated pressure within the crankcase and pass the blow-by gas stream through the inlet port, and the filter element separates the liquid from the blow-by gas and drains the liquid to the bottom of the base housing to prevent passing the liquid in the blow-by gas to the engine air inlet manifold.

Preferably, the liquid separating device and the remote warning/maintenance system may comprise any one of the features of the first aspect.

Any one or more of the above embodiments or preferred features can be combined with any one or more of the above aspects.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

FIG. 22 shows a front elevation view of the remote liquid reservoir of FIG. 21;

FIG. 23 is a sectional view taken along the line EE of FIG. 22;

DETAILED DESCRIPTION

Figure 1:
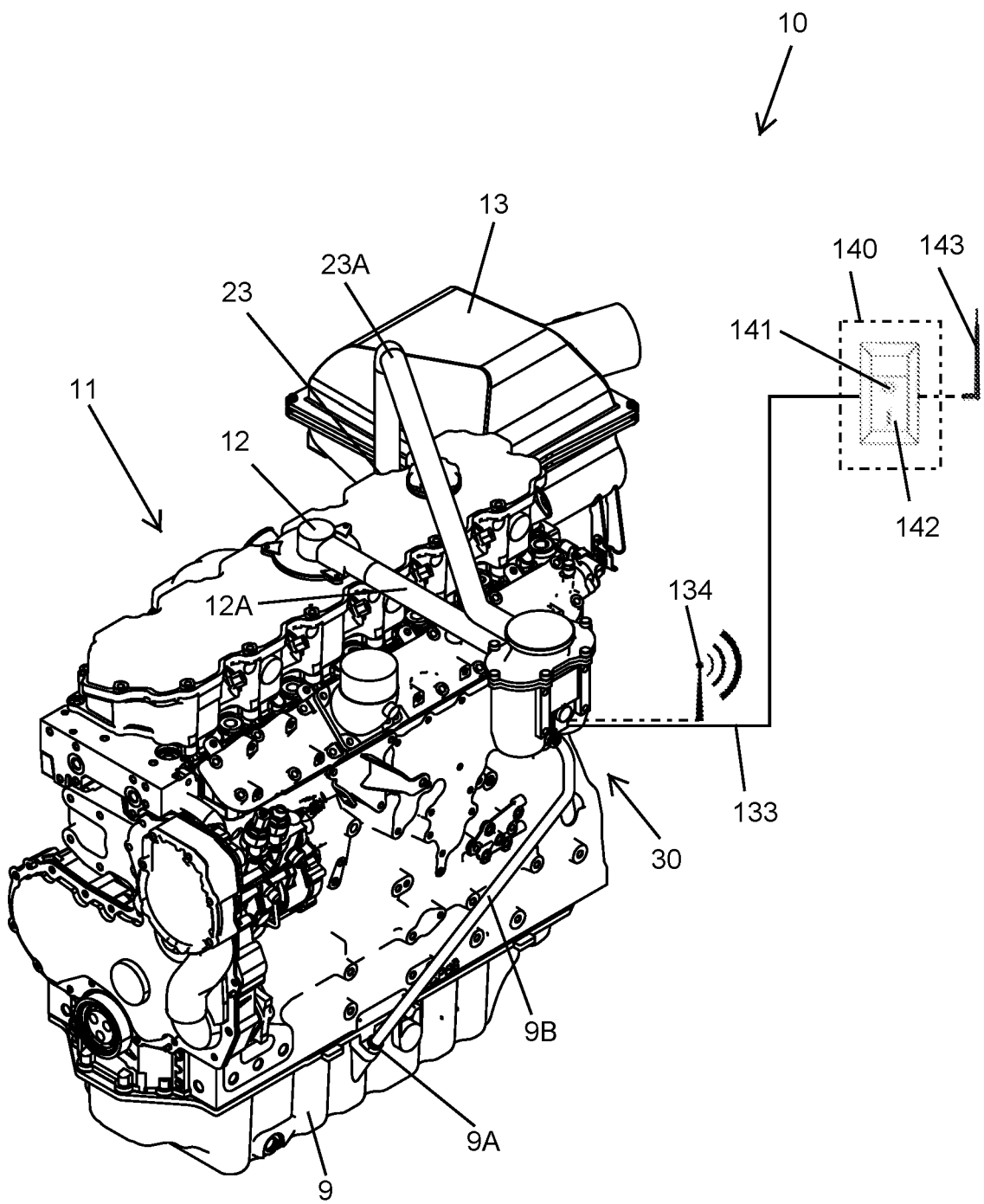
FIG. 1 shows a perspective view of the liquid separator system in accordance with an embodiment of the present invention.

The following description, given by way of example only, is described to provide a more precise understanding of the subject matter of a preferred embodiment or embodiments.

It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Reference will now be made to the drawings in which the various elements of embodiments will be given numerical designations and in which embodiments will be discussed to enable one skilled in the art to make and use the invention. It will be further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand. Descriptions of well-known components and processing techniques are omitted to not unnecessarily obscure the embodiments herein.

An internal combustion engine is any heat engine in which the combustion of a fuel occurs with an oxidizer (usually air) in a combustion chamber that is an integral part of the working fluid flow circuit. In most cases an internal combustion engine is powered by energy-dense fuels such as petrol or diesel fuel. While an internal combustion engine may be any stationary application, most internal combustion engines are used in mobile applications and are the dominant power supply for vehicles such as cars, aircraft, and boats. While the present invention will be described and illustrated in relation to a diesel engine, it is understood that the present invention is not only limited to that application. Likewise, it is understood that the present teachings apply to any number of piston-cylinder arrangements and a variety of engine configurations including, but not limited to, V-engines, inline engines, and horizontally opposed engines, as well as both overhead cam and cam-in-block configurations.

Pressure-charged diesel engines often generate blow-by gases. A blow-by gas is any gas stream or flow of air-fuel mixture leaking past pistons from the combustion chambers. Most blow-by gases contain a gas phase, such as air or combustion gases, typically containing a hydrophobic fluid, such as oil including fuel aerosol. Blow-by gases are generally directed outwardly from the engine crankcase.

The present invention relates to a liquid separator system 10, 10A, 10B for an internal combustion engine 11. The liquid separator system 10, 10A, 10B consists of a liquid separating device 30, 30A and a remote warning/maintenance system 140 for providing an operator with an indication that the liquid level in the liquid separating device 30, 30A has reached a predetermined level or that a pressure built up in the liquid separating device 30, 30A has occurred due to a partially blocked filter element 90. In its most basic form, the liquid separating device 30, 30A is a unit for installation into a crankcase ventilation system of an internal combustion engine 11 consisting of a housing 31, 35 containing at least one filter element 90, a liquid level sensor 100, a filter blocked valve 60, an integral pressure regulator 110, flashing led indicator 141 and a system reset switch 142.

The liquid separator system 10, 10A, 10B has been designed to accommodate the latest generation of turbo-charged engines by providing protection against accidental crankcase over pressurization due to partially blocked filter elements 90 in the liquid separating device 30, 30A. It also provides protection against high liquid levels within the liquid separating device 30, 30A causing poor efficiency and potential crankcase over pressurization. The liquid separator system 10, 10A, 10B can be utilised in closed and open crankcase ventilation systems by providing a liquid separating device 30, 30A with a high flow capacity in a small form factor.

The liquid separator system 10, 10A, 10B and the liquid separating device 30, 30A is designed to provide a differential pressure between the crankcase and the engine air inlet manifold 23 of the internal combustion engine 11, draw a blow-by gas stream from the crankcase to maintain a regulated pressure within the crankcase and pass the blow-by gas stream through the inlet port 33 and into the at least one filter receptacle. The filter element 90 separates the liquid from the blow-by gas and drains the liquid to the bottom of the base housing 31 to prevent passing the liquid in the blow-by gas to the engine air inlet manifold 23.

FIG. 1 illustrates the liquid separator system 10 installed on an internal combustion engine 11. The liquid separating device 30 is conveniently positioned to receive the blow-by gasses flowing from the crankcase via the positive crankcase ventilation outlet 12 and the connecting hose 12A. The blow-by gas and the end of hose 12A is connected to the inlet port 33 on the liquid separating device 30. The outlet port 38 of the liquid separating device 30 provides a gas stream with oil/fuel aerosol removed and returned to the engine air inlet manifold 23 via hose 23A. The returned gas stream is then mixed with fresh air from the engine air filter 13. In this embodiment the liquid separating device 30 and the liquid drain 41 of the liquid separating device 30 is connected directly back to the engine sump 9 via the sump inlet port 9A and hose 9B. The remote warning/maintenance system 140 has been illustrated in FIG. 1 is a combination flashing LED 141 and reset switch 142 which is conveniently positioned to provide the operator of the internal combustion engine 11 with the required indications in the event of a liquid level in the liquid separating device 30 reaching a predetermined level or that a pressure built up in the liquid separating device 30 has occurred due to a partially blocked filter element 90. The flashing LED 141 is also designed as a system status indicator which when power is connected to the system provides the operator with confirmation that the liquid separating device 10, 10A is operating correctly.

As also illustrated in FIG. 1 the remote warning/maintenance system 140 is preferably connected to the liquid separating device 30 by wiring harness 133 connected through the electrical connector 132. Alternatively, a wireless transceiver 134 may be connected to the liquid separating device 30 to provide wireless connectivity between the liquid separating device 30 and the remote warning/maintenance system 140 via wireless antenna and receiver 143.

Figure 2:
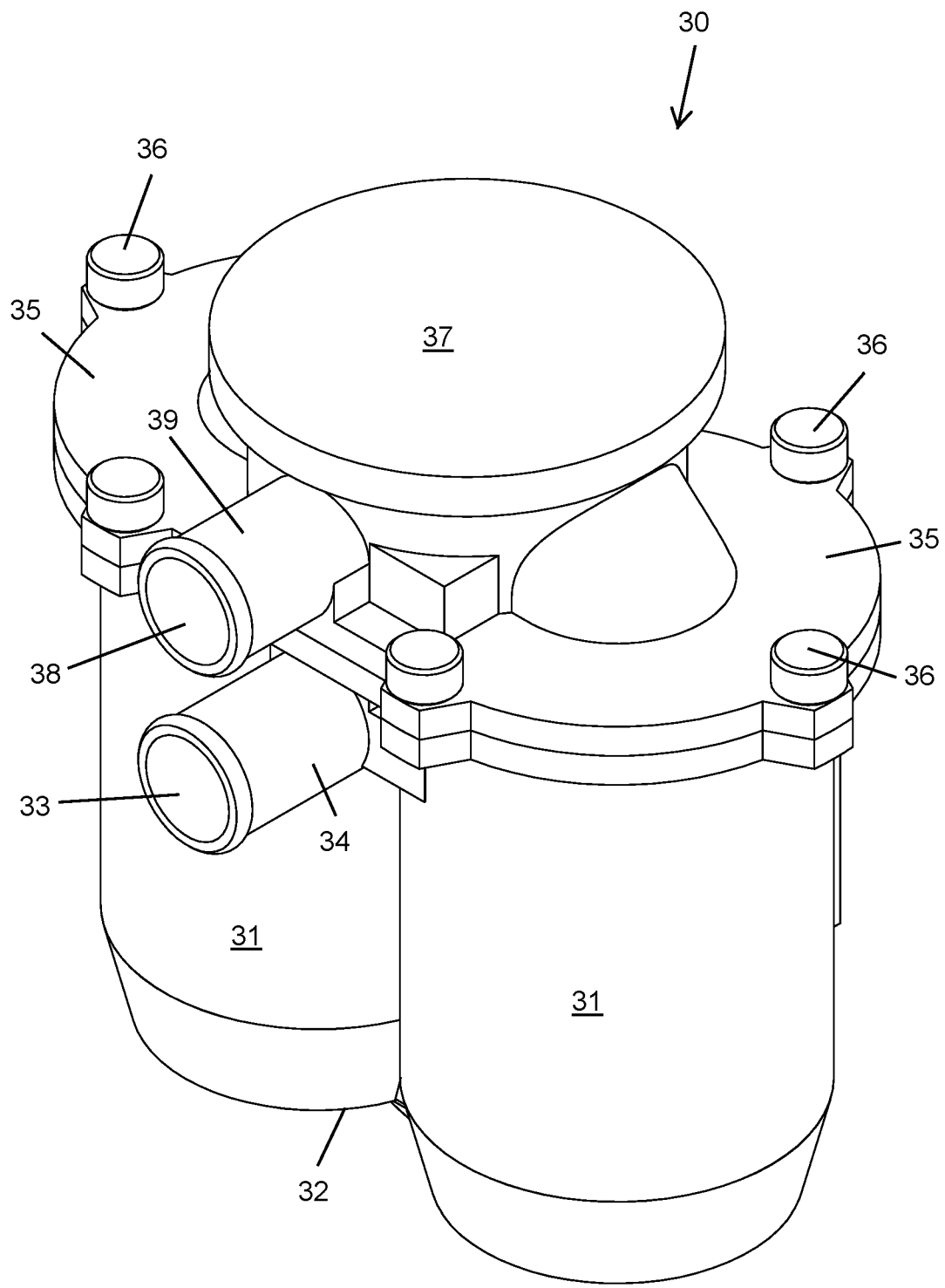
FIG. 2 shows a front perspective view of the liquid separating device of FIG. 1.

FIGS. 2 to 20 illustrate several views of the liquid separating device 30 in accordance with the present invention. FIG. 2 shows a perspective view of the liquid separating device showing the base body housing 31 which includes the two substantially cylindrical receptacles for receiving the filter elements 90 in each receptacle. Connected to the top of the base housing 31 is the removable cap 35 which is secured to the base housing 31 by fasteners 36. The base housing 31 includes the inlet port 33 from the crankcase of the internal combustion engine 11 and the inlet spigot 34 to which an end of the hose 12A is connected and secured. The removable cap 35 incorporates the air outlet port 38 and the outlet spigot 39 to which the hose 23A is connected and secured, the hose connects to the engine air inlet manifold 23. The removable cap 35 also incorporates the cover 37 which seals the pressure regulator 110 within the removable cap 35. While fasteners 36 have been illustrated to secure the cap 35 to the base housing 31, it should be understood that any type of fastening arrangement could be used to secure the cap 35 to the base housing 31 without departing from the present invention. For example, a clip arrangement could be placed on one side of the cap 35, with the cap 35 hinged to one side of the base housing 31 and the clip passing over the opposite side to secure the cap 35 in place on the base housing 31.

Both the base housing 31 and the removable cap 35 are injection moulded from a polymer material such as reinforced polyamide 66 with 30% glass fiber (PA66+GF30). Alternatively, base housing 31 and the removable cap 35 can be made from any polymer or other material using any other process for forming, machining or fabricating such components. The material and process must provide a finished product which has high mechanical strength, hardness, and rigidity, thermostability and resistance to hot lubricants and hot water. The base housing 31 and the removable cap 35 and any other parts made from such materials or processes must show dimensional stability and high creep strength. Other materials and other processes utilised to produce the base housing 31 and removable cap 35 are therefore not excluded from the present invention.

Figure 3:
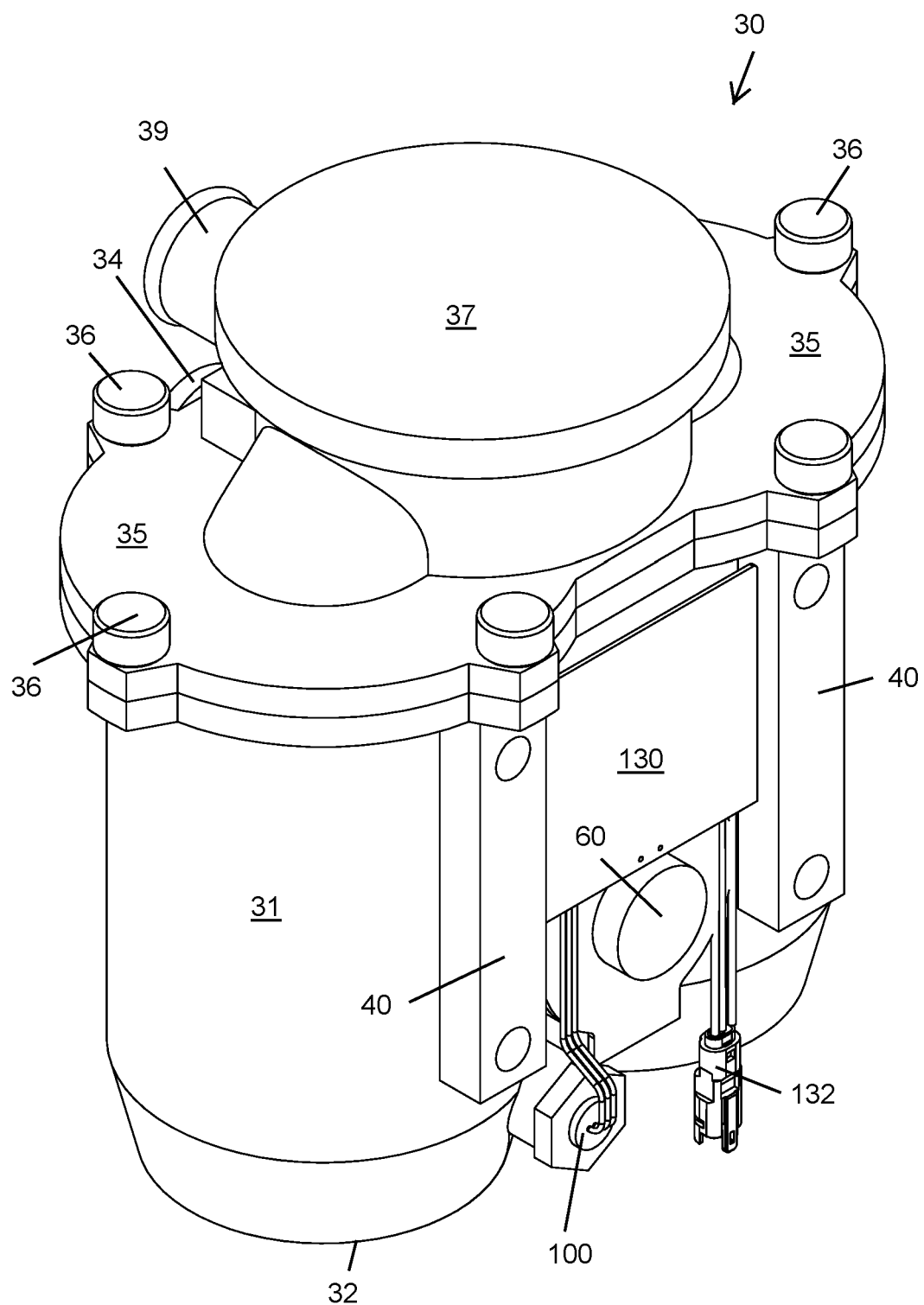
FIG. 3 shows a rear perspective view of the liquid separating device of FIG. 2.

FIG. 3 illustrates a rear perspective view of the liquid separating device 30 showing the electronic controller 130 mounted centrally to the rear surface of the base housing 31 and between mounting blocks 40 on opposing sides of the electronic controller 130. The electrical connector 132 extends from one side of the electronic controller 130 and is utilised for the connection to a power source 17 and allows the connection of the wiring harness 133 from the remote warning/maintenance system 140. The liquid level switch 100 is also illustrated showing the switch 100 positioned towards the base 32 of one of the receptacles in the base housing 31. The liquid level switch 100 indicates when a liquid in the bottom of the base housing 31 has reached a pre-determined level therein.

By way of example only, the liquid level switch 100 may be chosen from any one of a mechanical switch, a pneumatic switch, an optical sensor, an ultrasonic sensor, a conductive sensor, or any other type of liquid level sensor available.

The electronic controller 130 contains the electronics for the operation of the filter blocked valve 60 and the liquid level switch 100. The electronic controller 130 may also house a warning buzzer (not shown) or alternatively as illustrated provide connection to output wiring for connection to warning light 141, reset switch 142 and a warning buzzer remotely located from the internal combustion engine 11. The output wiring may also connect to a wireless transceiver to allow wireless communication to the warning light 141 and buzzer (not shown). The electronic controller 130 may also have components 137 which control the speed at which the warning light or LED 141 flashes or the intensity of the warning light 141 to indicate the operating status, predetermined faults or indicates certain problems.

The electronic controller 130 also includes a latching relay 135 which maintains a closed circuit for the LED 141 when activated by either the filter blocked switch 80 or the oil level switch 100. The latching relay 135 maintains the closed circuit until it is reset by the reset switch 142 of the remote warning/maintenance system 140. The electronic controller 130 also includes a delay circuit 136 for the liquid level switch 100. The delay circuit 136 is designed to prevent false triggering of the remote warning/maintenance system 140 by liquid movement within the receptacle base housing 31. The liquid movement can activate the liquid level switch 100 in error. This is particularly problematic when the liquid separating device 30 is installed in off-road or 4×4 vehicles.

Figure 4:
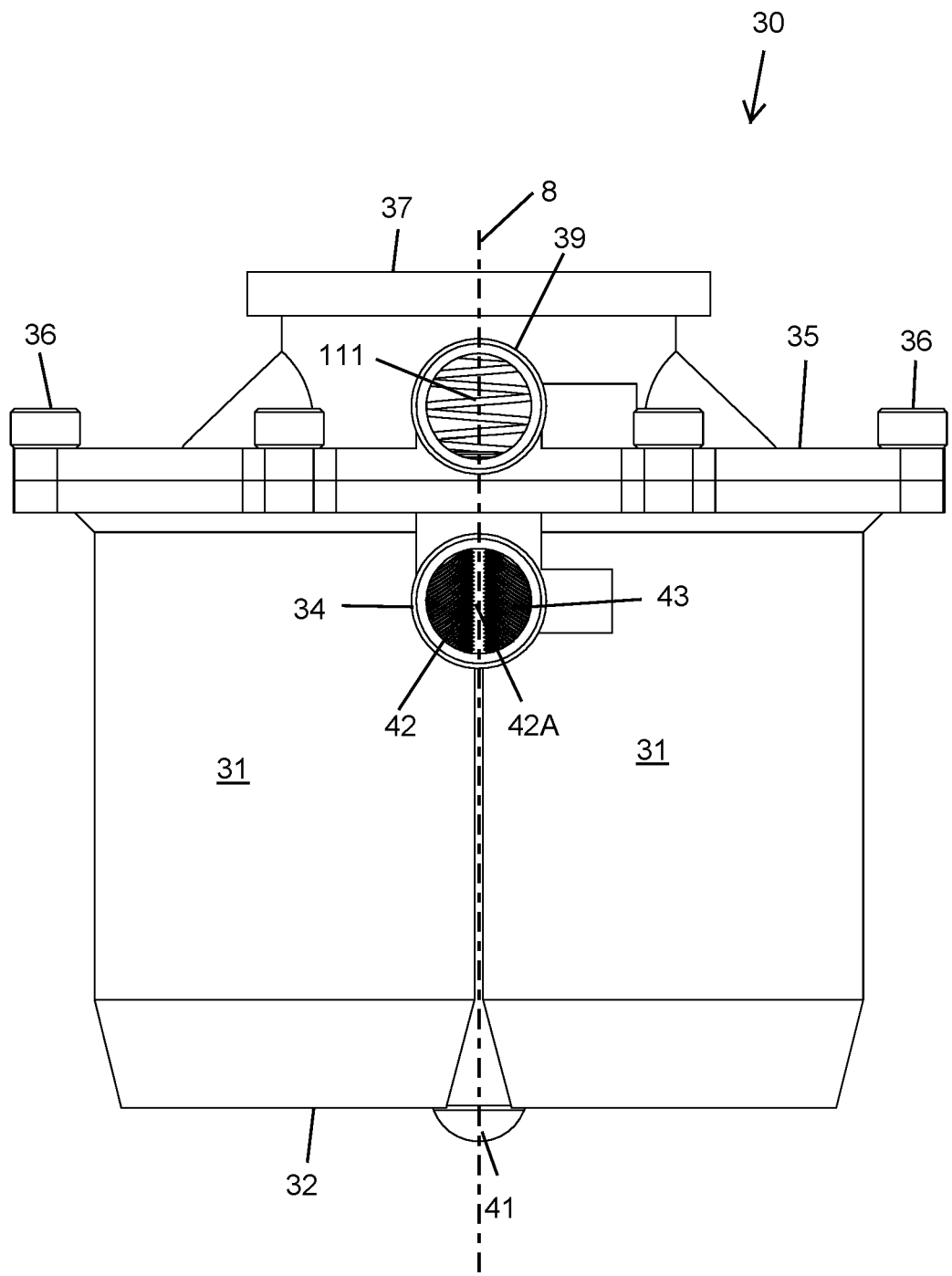
FIG. 4 shows a front view of the liquid separating device of FIG. 2.

FIG. 4 illustrates a front elevation view of the liquid separating device 30 showing the flow splitter 42 centrally positioned at the rear of the inlet port 34. The flow splitter 42 is designed to equally split both the flow and velocity of blow-by gas entering the filter receptacles from the positive crankcase ventilation outlet 12 on the internal combustion engine 11. The flow splitter 42 has a leading edge 42A which connects with each receptacle of the base housing 31. The leading edge 42A is positioned diametrically opposite and centrally aligned with the inlet port 33. The height of the leading edge 42A is substantially equal to the inside diameter of the inlet port 33. A pair of diametrically opposite openings 42B of equivalent cross sectional area to that of the inlet port 33 is formed in fluid communication with the inlet port 33 and between the inlet port 33 and the leading edge 42A of the flow splitter 42. Each opening 42B is in fluid communication with each annular space 50 formed between the filter element 90 and the internal wall 43 of the base housing 31.

The leading edge 42A is vertically oriented along a centerline 8 of the liquid separating device 30, the centerline 8 passing vertically between each receptacle of the base housing 31. The receptacle internal walls 43 form two opposing, substantially equally sized faces, which are formed contiguous to each other at the leading edge 42A, with each face being oriented to form substantially the same deflection angle. Each face of the receptacles is oriented at substantially the same horizontal angle relative to the centerline 8 of the liquid separating device 30 and function to divide the inlet blow-by gas stream into two equal parts. The leading edge 42A and the two opposing, substantially equally sized faces of the receptacles form two symmetrical flow paths.

Blow-by gas enters the inlet port 33 and flows in a direction substantially parallel to the longitudinal axis of the inlet port 33 and hits the flow splitter 42 tangentially, thereby splitting the volume of the stream equally so that each part enters a receptacle opening 42B and is distributed evenly into the annular space 50 and over each filter element 90. The reduction in volume of the blow-by gas also has a subsequent reduction in velocity. Therefore, the flow splitter 42 controls the inlet momentum of the blow-by gas stream as it passes through the liquid separating device 30.

The leading edge 42A and the receptacle opening geometry is such that it substantially directs the flow of blow-by gas equally and tangentially onto the textured surface on each of the internal receptacle walls 43 and thus also into the annular space 50 in each receptacle. The annular space 50 has a substantially larger cross sectional area to that of the receptacle openings 42B therefore further reducing blow-by gas velocity which aids in gravitational settling of liquid particles from the blow-by gas.

Positioned at the bottom of the base housing 31 is the liquid drain port 41 which allows the draining of any liquid which is filtered by the filter elements 90 in the liquid separating device 30.

Figure 5:
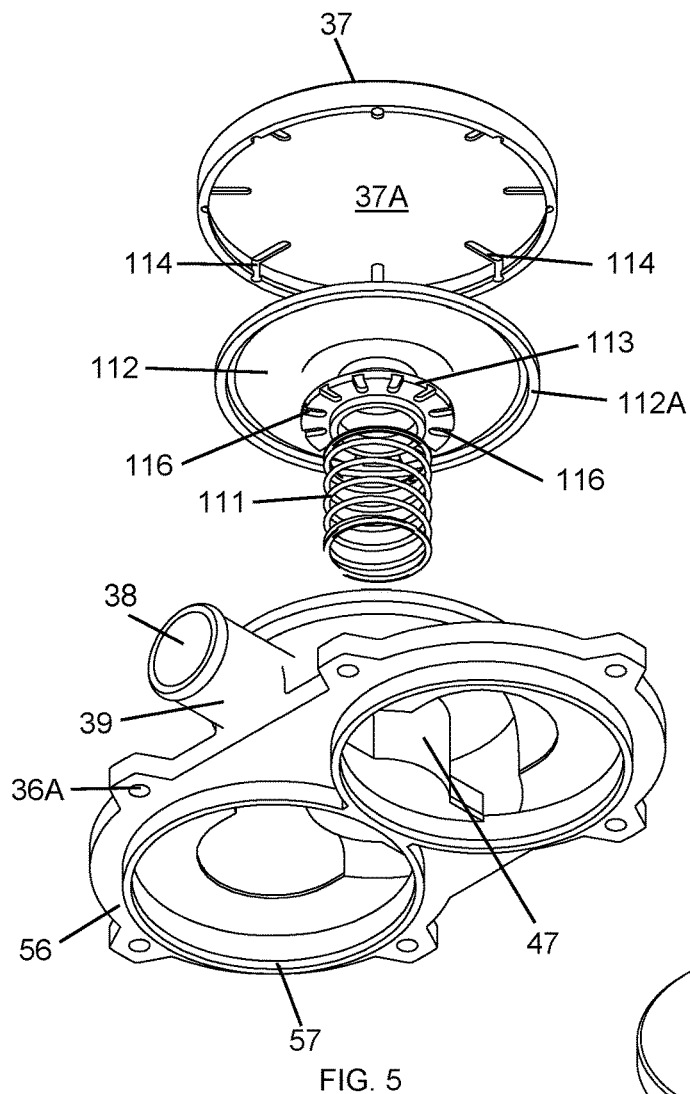
FIG. 5 shows an exploded perspective view of the removable cap from below.
Figure 6:
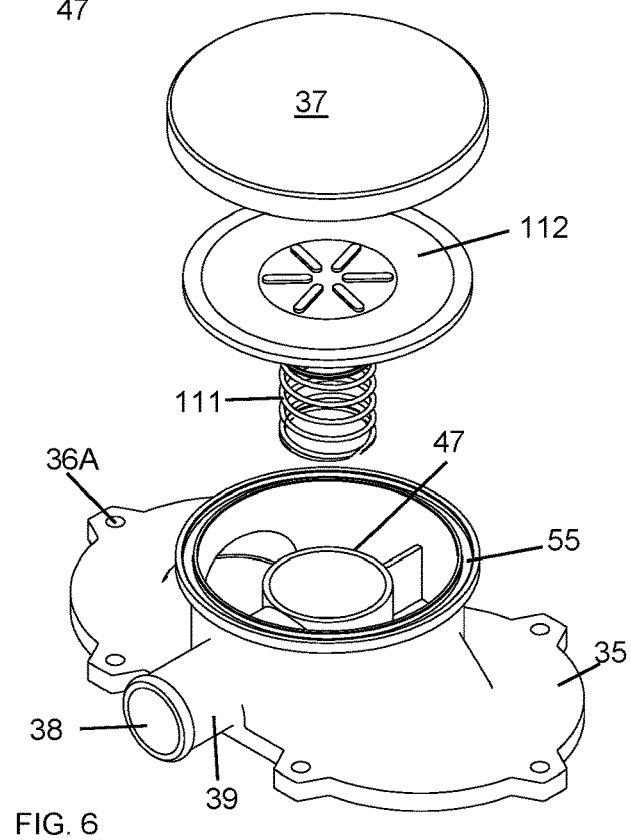
FIG. 6 shows an exploded perspective view of the removable cap from above.

FIGS. 5 and 6 illustrate exploded views of a first embodiment of the removable cap portion 35. A pair of substantially cylindrical rings 57 is positioned on the underside of the removable cap 35. When placed in position on the base housing 31 the cylindrical rings 57 are received within each receptacle and between the base housing 31 and the filter top flange 94. The underside of the removable cap 35 has a flange 56 which is complementary in shape and mates with the flange 46 on the base housing 31. The flange 56 has a plurality of apertures 36A adapted to receive therein a part of the screws 36. The removable cap 35 also has the outlet port 38 and corresponding outlet spigot 39 extending axially from and centrally positioned on the removable cap 35.

Positioned centrally within the removable cap 35 is the housing wall 47 which extends upwardly from the flange 56 and is adapted to receive the spring 111 of the pressure regulator 110. The outlet spigot 39 extends from an opening in the housing wall 47 to allow fluid communication of the blow-by gas stream to the outlet port 38. Positioned above the spring 111 and on the bottom side of the movable means 112 is the surge reduction plate 113. Extending around the periphery of the surge reduction plate 113 is a plurality of cutouts 116 which reduce any pressure surges and allow blow-by gas from the crankcase to maintain flow to the engine air intake manifold 23 when the movable means 112 of the pressure regulator 110 is in a closed position. The movable means 112 and the surge reduction plate 113 closes against the top of the wall 47 when the pressure regulator 110 is in the closed position.

The peripheral edge 112A of the moveable means 112 is received within the recess 55 of the removable cap 35. To secure the pressure regulator 110 within the removable cap 35, the cap 37 is pressed or otherwise secured to the top of the removable cap 35. In this embodiment and as illustrated, the movable means 112 is an elastomeric diaphragm which opens and closes to regulate the flow of blow-by gas from the crankcase to the engine air intake manifold 23. The underside 37A of the cap 37 has a plurality of slots 114 extending a distance inwardly from the outer edge of the cap 37. The slots 114 open a space above the pressure regulator 110 to atmosphere 115.

Figure 7:
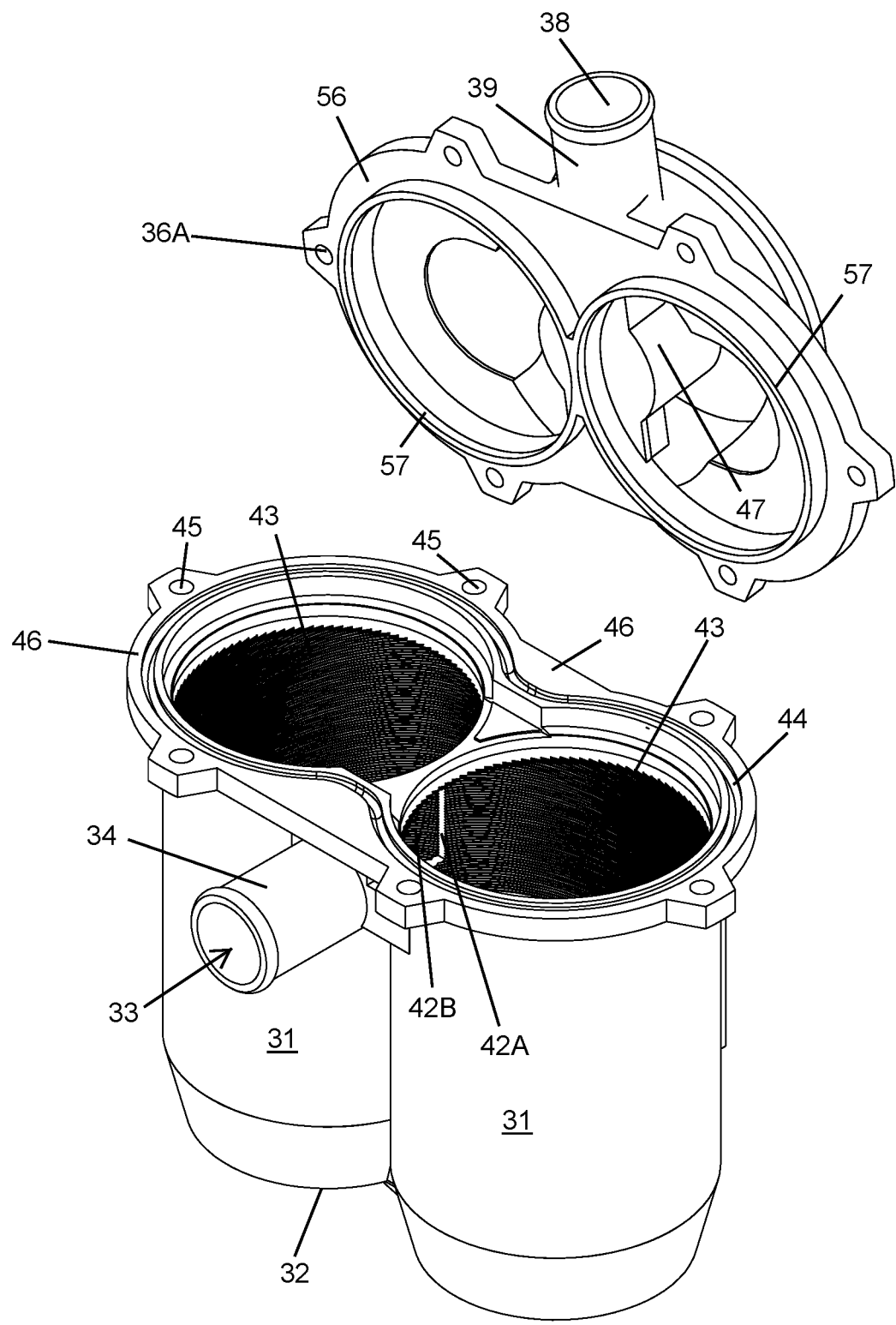
FIG. 7 shows a front perspective view of a first embodiment of the base housing and removable cap of the liquid separating device of FIG. 2.

FIG. 7 shows a first embodiment of the connection between base housing 31 and the removable cap 35 with the filter elements 90 removed to show the receptacle internal surface 43. The internal surface 43 of each filter receptacle in the base housing 31 has a surface finish or textured finish, such as a surface finished with vane shapes extending in a downward helical or spiral direction towards the bottom 32 of the base housing 31. Alternatively, the surface finish may be a sawtooth spiral pattern, which spirals in a downward direction on the internal surface 43 towards the bottom 32 of the filter receptacle. The shape and/or surface texture is adapted to significantly increase the surface area per unit volume of each receptacle internal surface 43 in comparison to that of a smooth walled receptacle. The substantially tangential direction of the blow-by gas flow relative to the textured receptacle wall 43 increases the effects of gravitational and centrifugal settling of the liquid particles as the liquid particles are heavier than gas and tend to make their way outward due to centrifugal forces. The liquid particles also have a higher inertia than the gas particles and as such the liquid tends to travel in a straight line causing liquid droplet impingement onto the vanes or textured wall of the receptacle internal wall 43 where smaller liquid particles combine or coalesce into larger particles. A high surface tension finish at the textured wall surface of the receptacle internal wall 43 causes the liquid to cling to the receptacle wall rather than recombine with the gas flow. The liquid is therefore separated from the gas by the textured finish or surface finish of the receptacle internal walls 43.

The vane shapes or textured finish may have a grooved bottom or channel that acts to collect the combined liquid and channels it downwardly in a helical spiral manner due to gravitation effects on the liquid and the direction of gas flow working to encourage the liquid along the downward helical spiral toward the bottom 32 of the base housing 31. The textured finish or surface finish also assists with forcing the blow-by gas in a downward direction through the filter receptacle to ensure that the blow-by gas is cleaned over substantially the entire length of each filter element 90.

Any surface finish may be used to assist in separating the liquid from the blow-by gas. For example, the textured finish may be formed as a spiral pattern or any other pattern on the internal surface 43 of each receptacle which assists with collecting and promoting oil downward flow and encouraging the blow-by gas in a downward direction through the filter receptacle. The top flange 46 of the base housing 31 has a recess groove 44 for receiving therein a sealing member 44A to assist with sealing the base housing 31 to the removable cap 35. The sealing member 44A is compressed to seal against the flange 56 of the removable cap 35. Also located in the flange 46 are threaded apertures 45 adapted to receive the fasteners 36 to secure the removable cap 35 to the base housing 31.

The fasteners 36 retaining the removable cap 35 to the base housing 31 are an anodized aluminum screw 36. The screws 36 are positively retained within the removable cap 35 by an O-ring or the like which is placed over the end of the screw 36 once it has been placed through the aperture 45 in the removable cap 35. This ensures that when the removable cap 35 is detached from the base housing 31 the screws 36 are retained within apertures 45 in the removable cap 35. As described above the fastening arrangement to secure the cap 35 to the base housing 31 is not limited to only screws 36, other fastening arrangements could be substituted without departing from the present invention.

Figure 8:
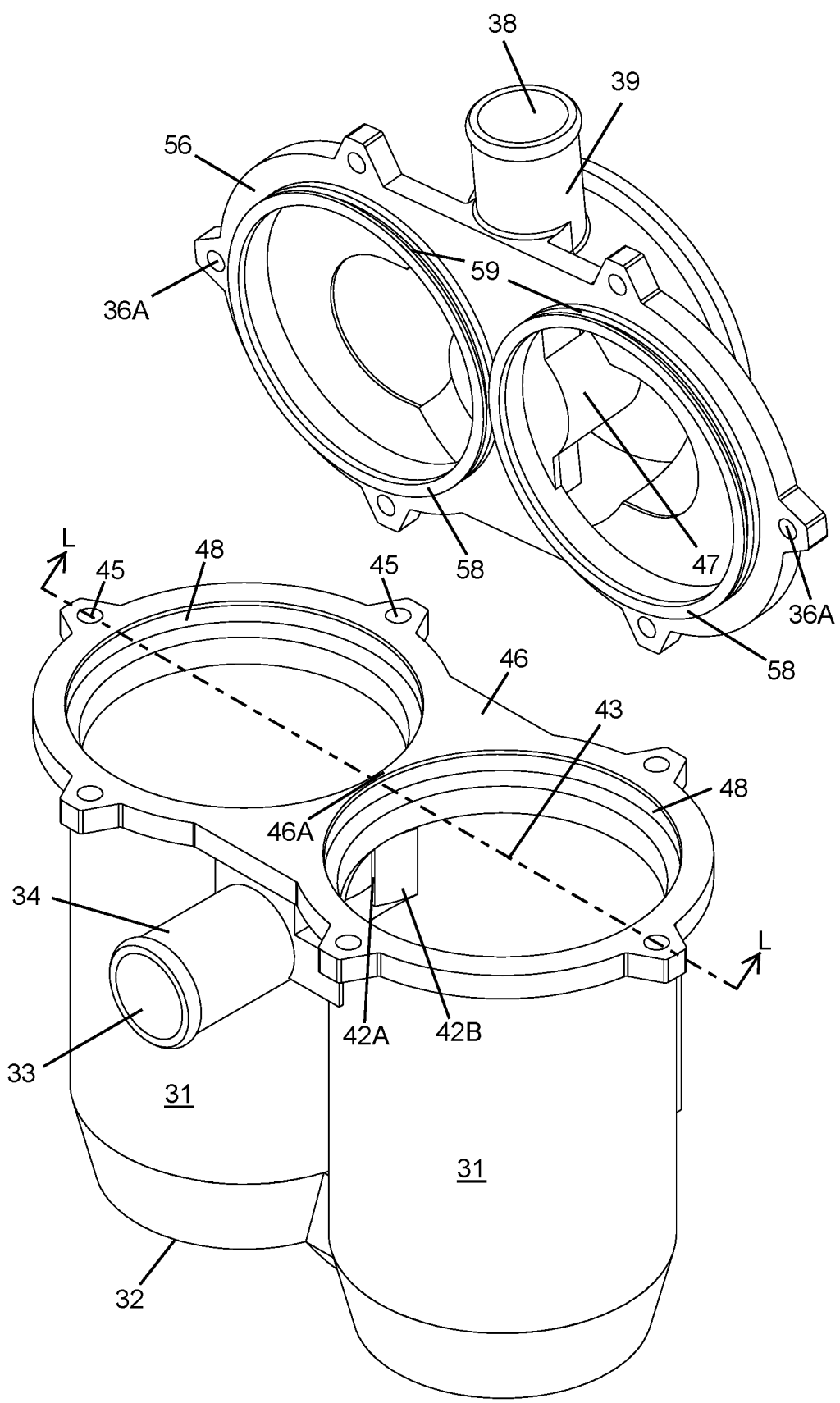
FIG. 8 shows a front perspective view of a further embodiment of the base housing and removable cap of the liquid separating device of FIG. 2.

FIG. 8 shows a further embodiment of the connection between the base housing 31 and the removable cap 35 with the filter elements 90 removed. While the majority of the components are the same and will not be repeated here, the connection and sealing between the base housing 31 and the removable cap 35 are different. In this embodiment a pair of cylindrical rings 58 extend from the flange 56 on the underside of the removable cap 35. Each ring 58 has a recess 59 for receiving therein a sealing member 44A. When placed in position on the base housing 31 the cylindrical rings 58 are received within each receptacle and between the base housing 31 and the filter top flange 94. The sealing member 44A seals against the surface 48 in each receptacle of the base housing 31. The flange 56 on the underside of the removable cap 35 is complementary in shape and mates with the flange 46, 46A on the base housing 31.

Figure 9:
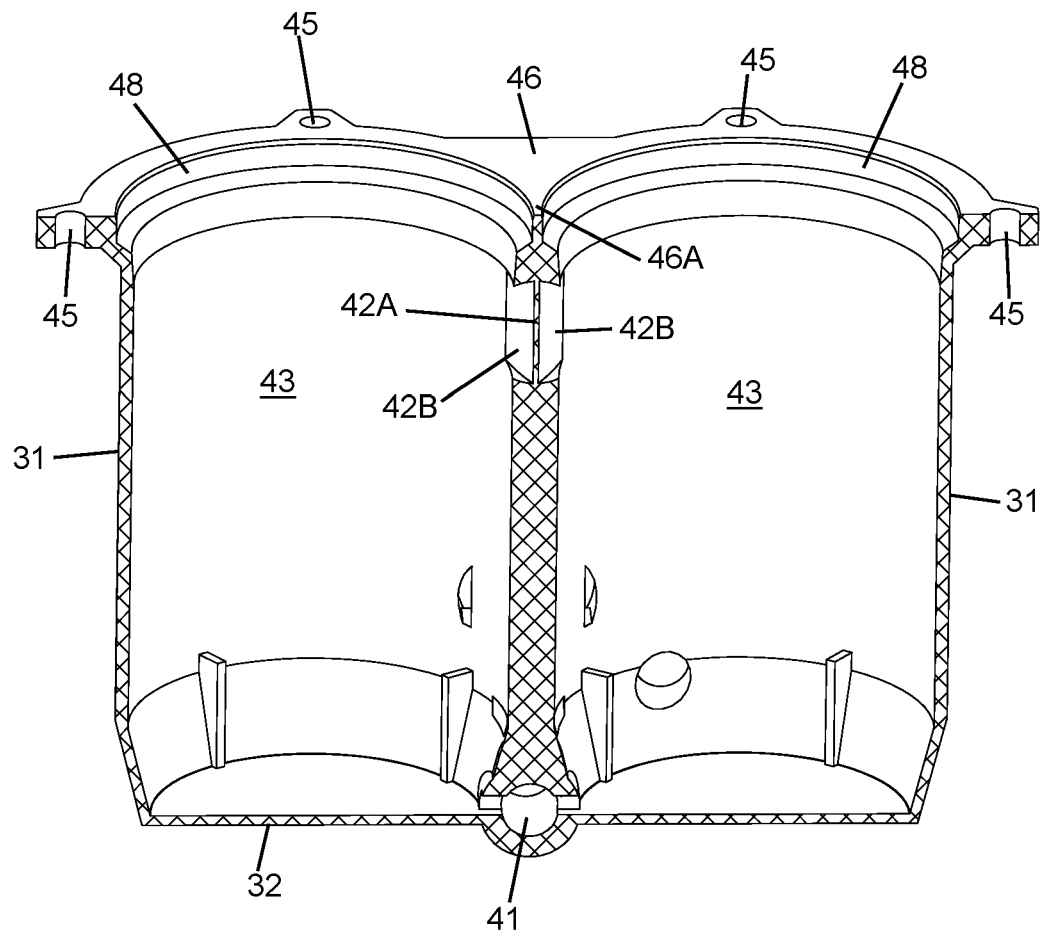
FIG. 9 shows a sectional view taken along line LL of the base housing of FIG. 8.

FIG. 9 shows a sectional view of the base housing 31 taken along the line LL of FIG. 8. The flow splitter 42 is shown centrally positioned at the rear of the inlet port 34. The flow splitter 42 has a leading edge 42A which connects with each receptacle of the base housing 31. The leading edge 42A is positioned diametrically opposite and centrally aligned with the inlet port 33. The height of the leading edge 42A is substantially equal to the inside diameter of the inlet port 33. A pair of diametrically opposite openings 42B of equivalent cross sectional area to that of the inlet port 33 is formed in fluid communication with the inlet port 33 and between the inlet port 33 and the leading edge 42A of the flow splitter 42. Each opening 42B is in fluid communication with each annular space 50 formed between the filter element 90 and the internal wall 43 of the base housing 31. While not illustrated, the internal surface 43 of each filter receptacle in the base housing 31 has a surface finish or textured finish, such as a surface finished with vane shapes extending in a downward helical or spiral direction towards the bottom 32 of the base housing 31.

Figure 10:
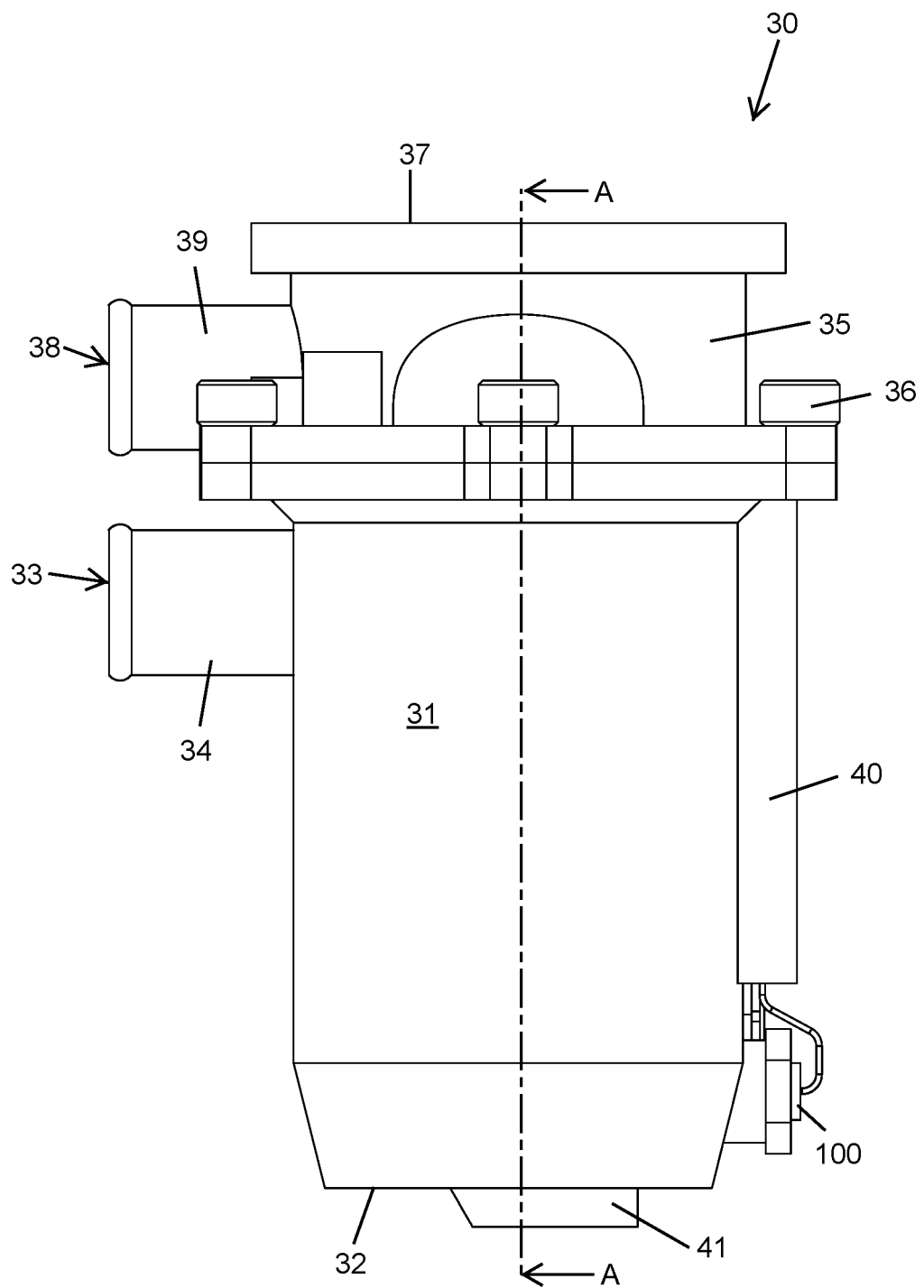
FIG. 10 illustrates an end view of the liquid separating device of FIG. 2.

FIG. 10 shows the two axially aligned ports 33, 38 extending from one side of the liquid separating device 30. The inlet port 33 and the inlet spigot 34 extend axially from the base housing 31 and the outlet port 38 and the outlet spigot 39 extending axially from the removable cap 35.

Figure 11:
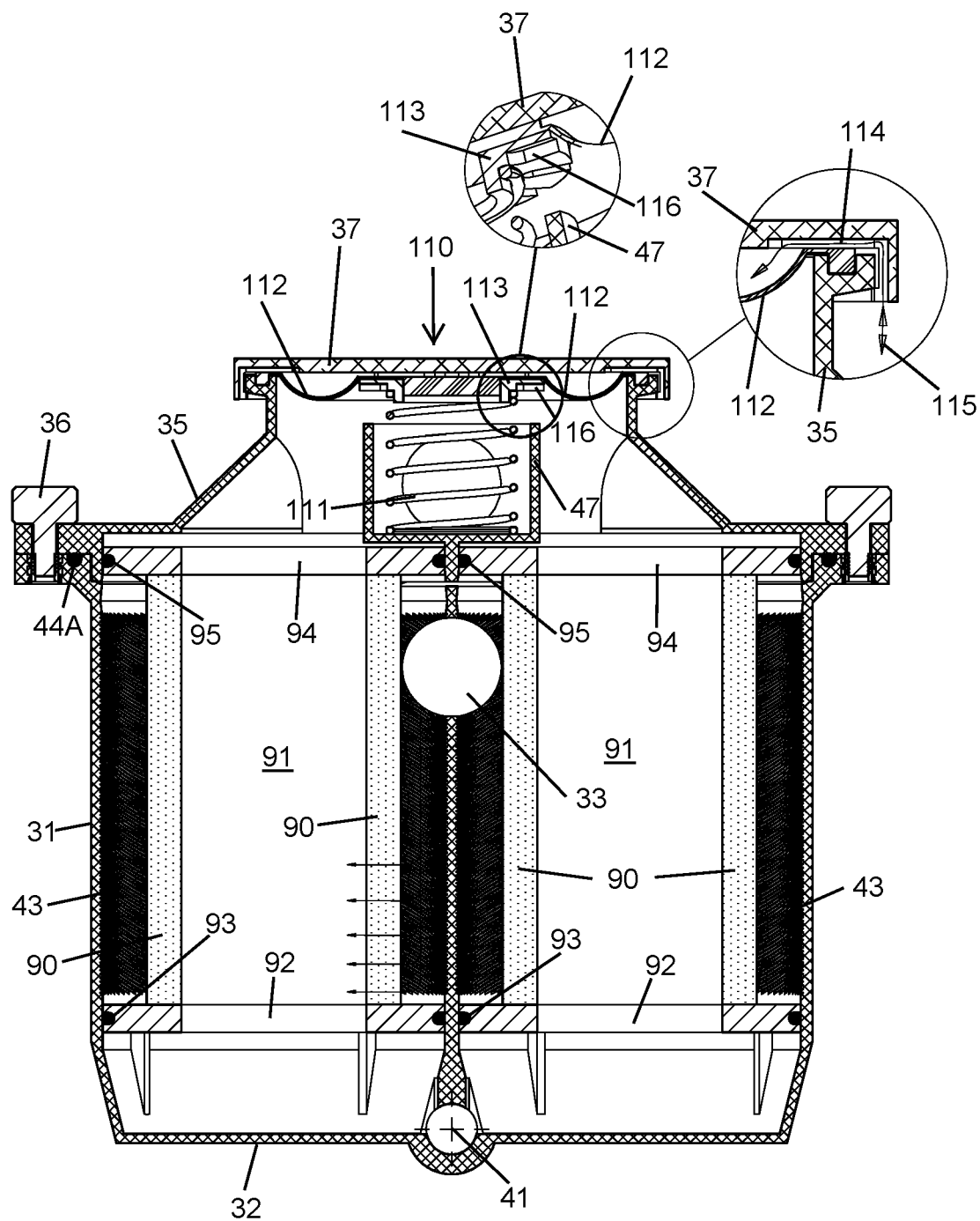
FIG. 11 shows a first sectional view taken along line AA of FIG. 10 showing the internal components of the liquid separating device and in particular the pressure regulator in the removable cap portion drawn in the open position.
Figure 12:
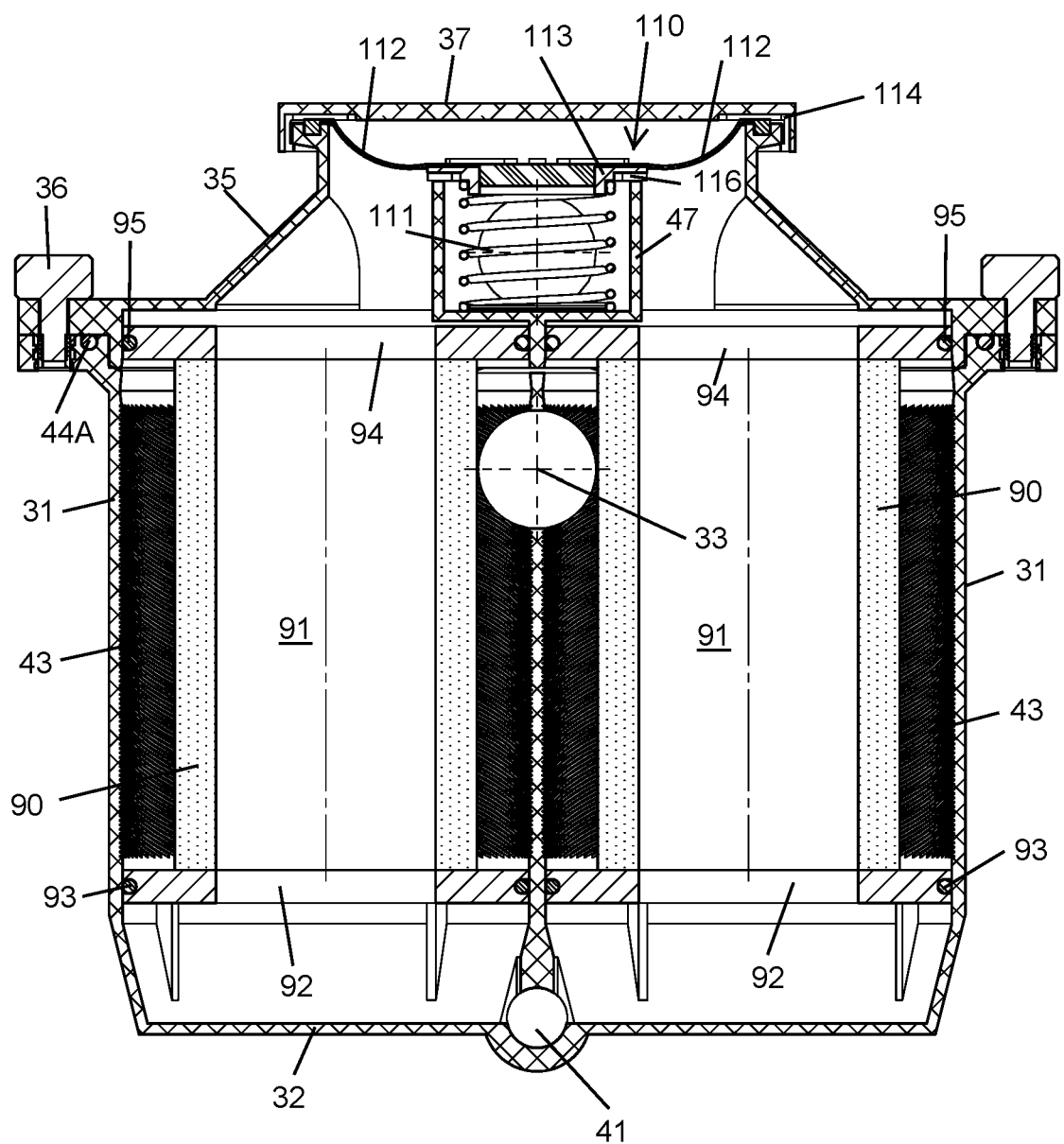
FIG. 12 shows a second sectional view taken along line AA of FIG. 10 showing the internal components of the liquid separating device and in particular the pressure regulator in the removable cap portion drawn in the closed position.

FIGS. 11 and 12 are sectional views taken along the line AA of FIG. 10 when using the first embodiment of connecting the base housing 31 to the removable cap as shown in FIG. 7. The pressure regulator 110 is received within the removable cap portion 35 and keeps a predetermined crankcase pressure independent from a negative pressure of the air intake manifold 23. The cap or cover 37 secures the valve 110 within the removable cap portion 35. The cap or cover 37 is preferably manufactured from anodized aluminum to allow the cap 37 to be secured or crimped to the top of the replaceable cap 35. Obviously, the cap or cover 37 can be provided in any material and also can be secured to the replaceable cap 35 using other processes. Around the outer edge or periphery of the cap 37, a plurality of slots 114 are positioned between the edge of the cap 37 and the body of the removable cap 35, so that when the cap 37 is secured to the top of the removable cap 35, air 115 is allowed to enter the removable cap 35. The slots 114 open a space above the pressure regulator 110 to atmosphere 115.

FIG. 11 illustrates the pressure regulator 110 in the open position with the moveable means 112 and the surge reduction plate 113 positioned adjacent the cap 37. The biasing member or spring 111 forces the moveable means 112 and surge reduction plate 113 to the open position to allow the flow of cleaned gas to return to the engine air intake manifold 23. The moveable means 112 is preferably an elastomeric diaphragm produced from a synthetic co-polymer such as nitrile. Nitrile rubber is an acrylonitrile butadiene rubber, or a synthetic rubber derived from acrylonitrile and butadiene. The nitrile material is used as it is resistant to oil, fuel, and other chemicals. The biasing member or spring 111 is a stainless steel spring to resist corrosion within the liquid separating device 30.

FIG. 11 also shows a cross sectional view of the filter elements 90 positioned in the receptacles in the base housing 31. Each cylindrical filter element 90 is designed to be replaced or cleaned when the filter element 90 becomes partially blocked. The filter element 90 is a cylindrical filter with a base flange 92 and an upper flange 94. Each base flange 92 is sealed at its peripheral edge to the base housing 31 by seals 93. Likewise, each upper flange 94 is sealed at its peripheral edge to the inner surface of the rings 57 extending from the flange 56 of the end cap 35 by seals 95. Each filter element 90 has a filter media 91 extending laterally between each flange 92 and 94. The filter media 91 may be selected from any one of a metal mesh, a synthetic fibre, a natural fibre material or any other filter media which is suitable for filtration of liquid such as oil from the blow-by gasses from an internal combustion engine 11. Preferably, the metal mesh is a stainless steel mesh.

FIG. 12 illustrates the pressure regulator 110 in the closed position with the moveable means 112 and the surge reduction plate 113 seated upon the walls 47 in the removable cap 35. In this position the differential pressure between the crankcase and the engine air inlet manifold 23 forces the moveable means 112 and surge reduction plate 113 to the closed position. The differential pressure between the crankcase and the engine air inlet manifold 23 overcomes the biasing force of the spring 111 to force the moveable means 112 and the surge reduction plate 113 to the closed position. The surge reduction plate 113 has cutouts 116 therein to reduce any pressure surges and allow blow-by gas from the crankcase to maintain flow to the engine air intake manifold 23 when the moveable means 112 is in the closed position.

As shown in FIGS. 11 and 12, the top flange 46 of the base housing 31 has a recess groove 44 for receiving therein a sealing member 44A to assist with sealing the base housing 31 to the removable cap 35. The sealing member 44A is compressed to seal against the flange 56 of the removable cap 35.

Figure 13:
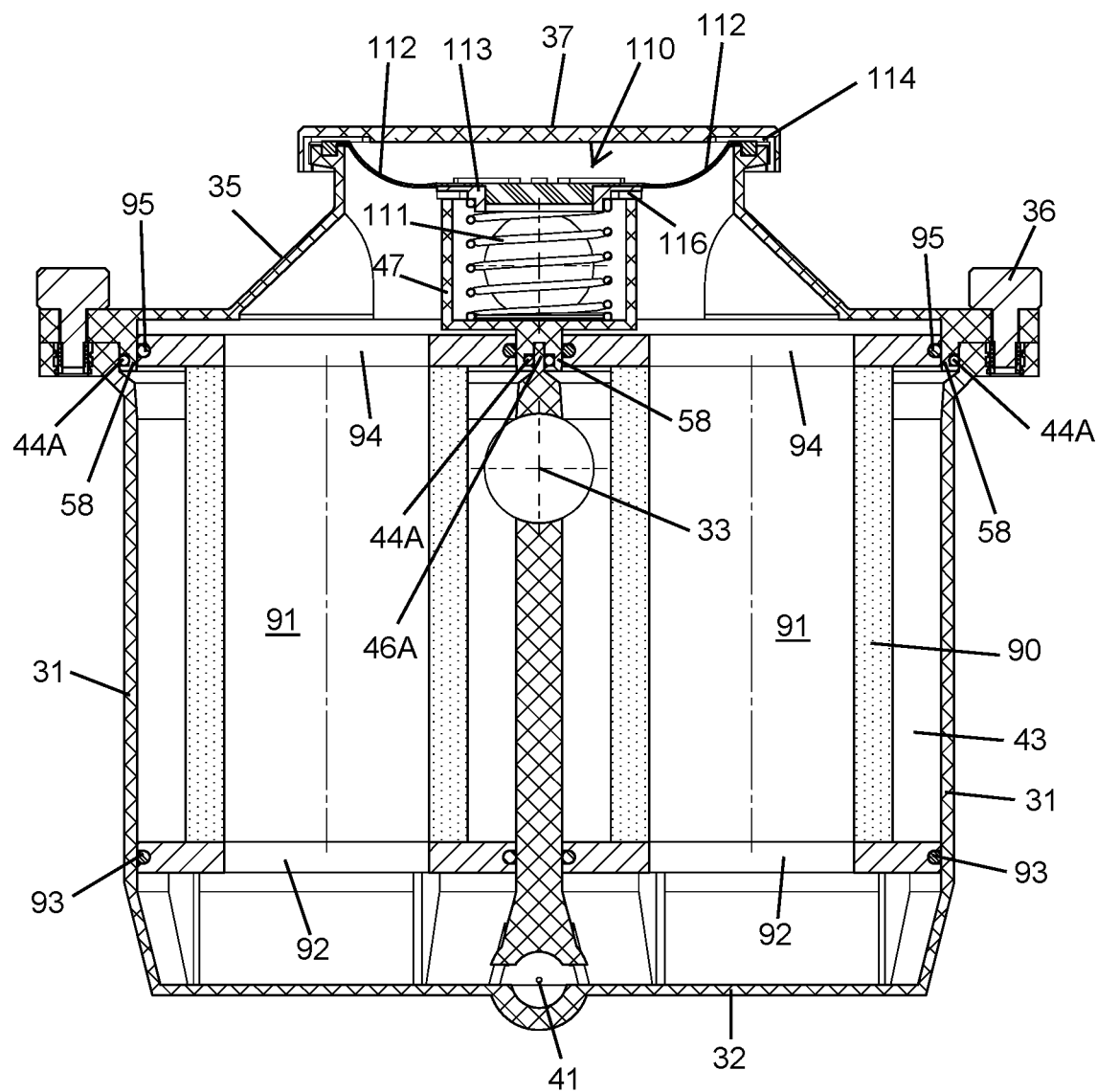
FIG. 13 shows a third sectional view taken along line AA of FIG. 10 but using the base housing and removable cap of FIG. 8 and showing the internal components of the liquid separating device and in particular the pressure regulator in the removable cap portion drawn in the closed position.
Figure 14:
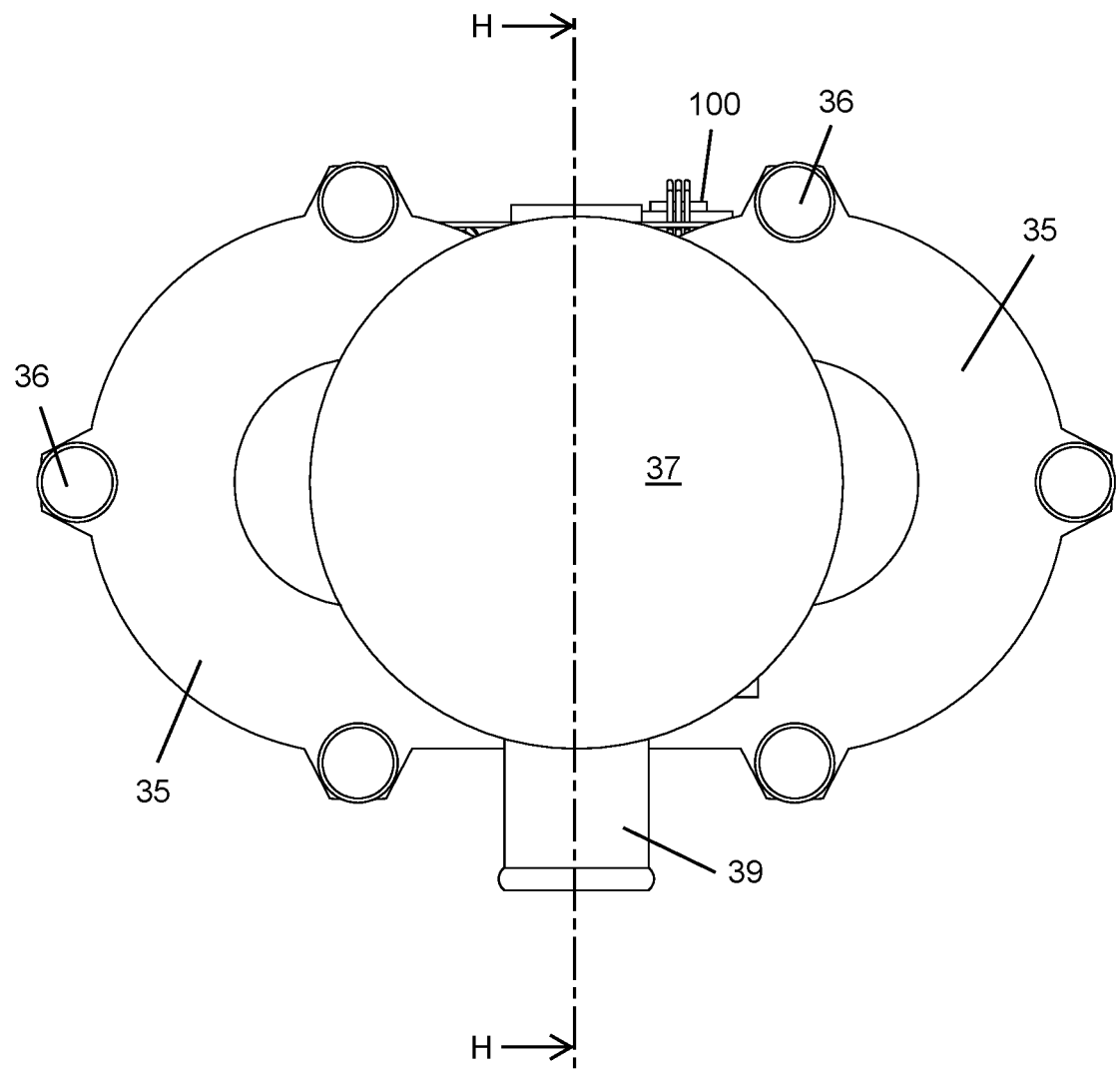
FIG. 14 shows a top view of the liquid separating device of FIG. 2.

FIG. 13 is a sectional view taken along the line AA of FIG. 10 when using the further embodiment of connecting the base housing 31 to the removable cap as shown in FIG. 8. The pressure regulator 110 is in the closed position with the moveable means 112 and the surge reduction plate 113 seated upon the walls 47 in the removable cap 35. As noted above, in this position the differential pressure between the crankcase and the engine air inlet manifold 23 forces the moveable means 112 and surge reduction plate 113 to the closed position. FIG. 13 also shows a pair of cylindrical rings 58 extend from the flange 56 on the underside of the removable cap 35. Each ring 58 has a recess 59 for receiving therein a sealing member 44A. When placed in position on the base housing 31 the cylindrical rings 58 are received within each receptacle and between the base housing 31 and the filter top flange 94. The sealing member 44A seals against the surface 48 in each receptacle of the base housing 31.

FIGS. 14 to 20 show sectional views and a top view of the liquid separating device 30 in accordance with the present invention.

Figure 15:
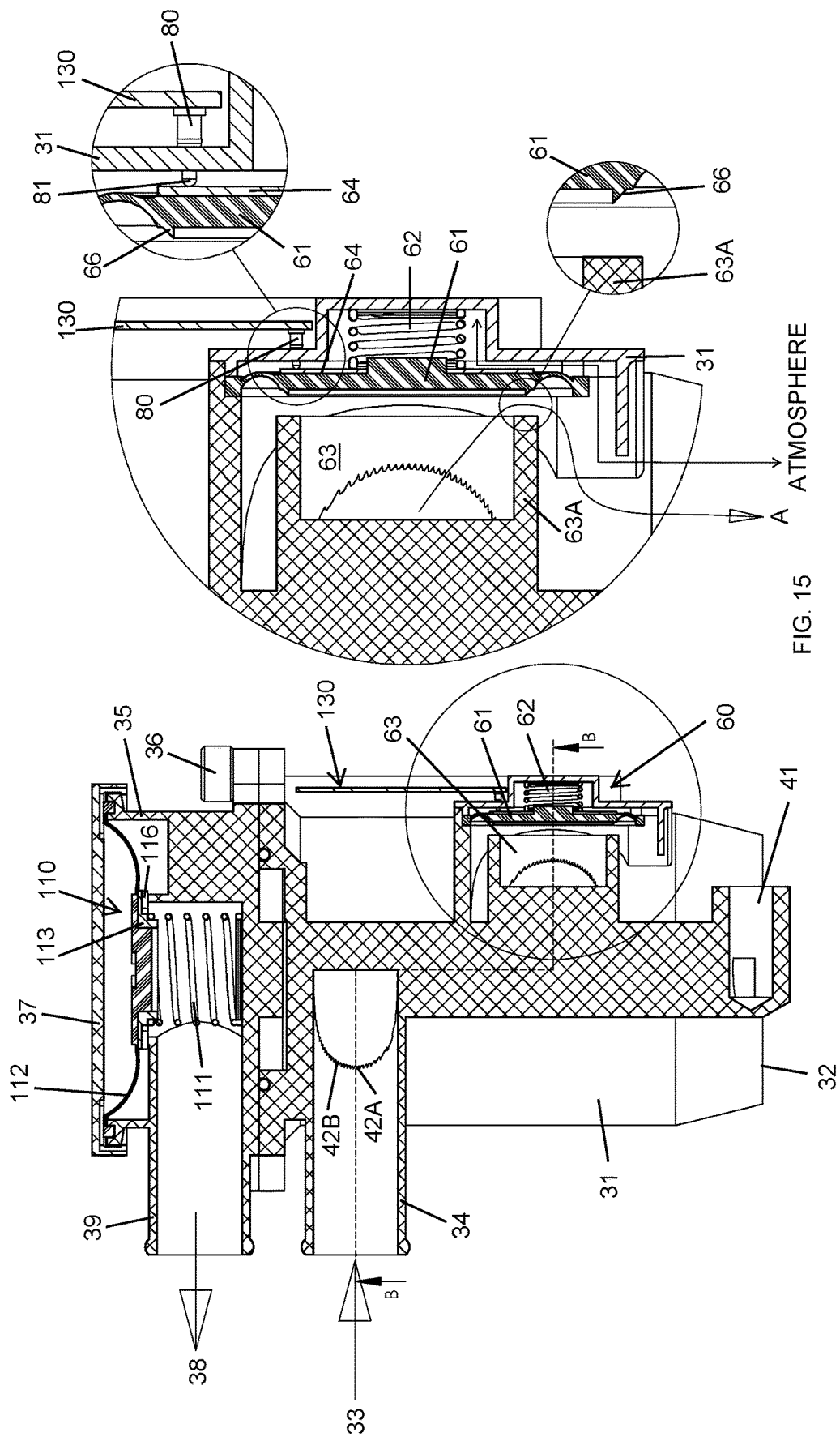
FIG. 15 illustrates a sectional view taken along line HH of FIG. 14 and showing the pressure regulator in the removable cap portion drawn in the closed position and a first embodiment of the over pressure relief valve in the open position indicating a partially blocked filter element.

FIG. 15 shows the operation of the pressure regulator 110 which has been described in detail above in relation to FIGS. 11 and 12 and will not be repeated here. FIG. 15 also shows in detail the operation of a first embodiment of the filter blocked valve 60, in particular the position of the filter blocked valve 60 when a partially blocked filter 90 condition exists and the filter blocked valve 60 opens to atmosphere. Under normal operating conditions a substantial flow of blow-by gas will still flow through the partially blocked filter 90 and back to the engine air intake manifold 23. This partially blocked filter condition creates an increased pressure on the moveable means 61 of the filter blocked valve 60 which overcomes the biasing member 62 and opens the moveable means 61 to allow an amount of the flow of blow-by gas to atmosphere in the direction of arrow A to avoid crankcase overpressure.

The filter blocked valve 60 operates to indicate when a filter is partially blocked by closing the contacts between a contact plate 64 or moveable contact on the moveable means 61 and contacts 80, 81 on the electronic controller 130 to activate the warning signal system 140. The filter blocked valve 60 is designed to open and close the pressure relief port 63 to avoid an increase in pressure in the crankcase of the internal combustion engine 11. With the filter blocked valve 60 in the open position an amount of the blow-by gas will exit the pressure relief port 63 in the direction of arrow A to atmosphere and avoid any overpressure in the crankcase. The remainder or substantial amount of blow-by gas will flow through the partially blocked filter 90 back to the engine air intake manifold 23. The filter blocked valve 60 has a moveable means 61 supported by a biasing spring 62. To the backside of the moveable means 61 a contact plate 64 is mounted to form the moving part of the electrical contact 80, 81 which opens and closes the circuit to indicate the operation of the filter blocked valve 60 when a partially blocked filter 90 exists. A fixed electrical contact 81 is mounted through the rear wall of the base housing 31 and connects to the bottom of the electronic controller 130.

The pressure relief port 63 is positioned centrally and between both filter receptacles in the base housing 31. This ensures that the relief port 63 and subsequently the filter blocked valve 60 is in fluid communication with both filter elements 90 to identify when a filter element 90 becomes partially blocked. The moveable means 61 has been designed to have a knife edge surface component 66 to control the opening and closing of the moveable means 61 against the wall 63A of the relief port 63. The knife edge surface 66 increases the contact pressure between the movable means 61 and the filter blocked valve seat 63A to prevent leakage of gas pressure or liquid within the pressure relief port 63.

During use the filters 90 will become increasingly clogged and ultimately are a maintenance item that should be replaced. Once the filters 90 become partially blocked and creates an increase in pressure within the crankcase the filter blocked valve 60 will open, closing the contacts between the spring loaded contact plate 64 on the moveable means 61 and on the electronic controller 130. This will activate the warning light (LED) 141 and/or buzzer, causing the LED 141 to flash at a pre-determined rate, therefore indicating by virtue of the flash rate that the filters 90 are partially blocked and require maintenance.

Figure 16:
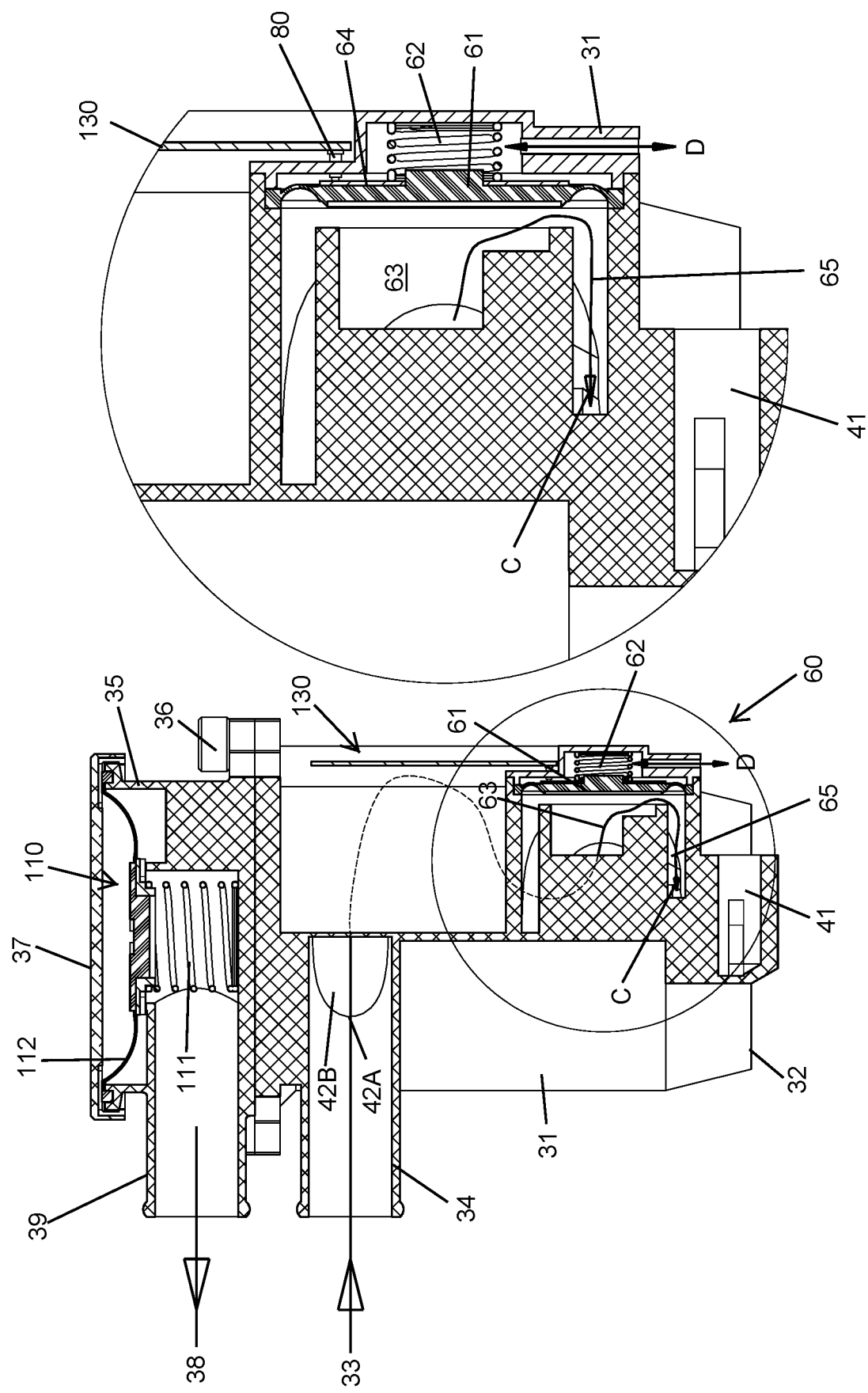
FIG. 16 illustrates a further sectional view taken along line HH of FIG. 14 and showing the pressure regulator in the removable cap portion drawn in the closed position and a further embodiment of the over pressure relief valve in the open position indicating a partially blocked filter element.

FIG. 16 shows in detail the operation of a further embodiment of the filter blocked valve 60, in particular the position of the filter blocked valve 60 when a partially blocked filter 90 condition exists and the filter blocked valve 60 recirculates the blow-by gas through the liquid separating device 30. Under normal operating conditions a substantial flow of blow-by gas will still flow through the partially blocked filter 90 and back to the engine air intake manifold 23. This partially blocked filter condition creates an increased pressure on the moveable means 61 of the filter blocked valve 60 which overcomes the biasing member 62 and opens the moveable means 61 to allow an amount of the flow of blow-by gas to flow back through passage 65 in the base housing 31 of liquid separating device 30 in the direction of arrow C to avoid crankcase overpressure. The passage 65 is connected directly from the relief port 63 to direct the flow of blow-by gas back into the liquid separating device 30. Also illustrated in FIG. 16 is the passage highlighted by arrow D which shows that the rear side of the moveable means 61 supported by the biasing spring 62 is open to atmosphere. This allows venting of the rear side of the moveable means 61 to allow the moveable means 61 to move between open and closed positions.

Figure 17:
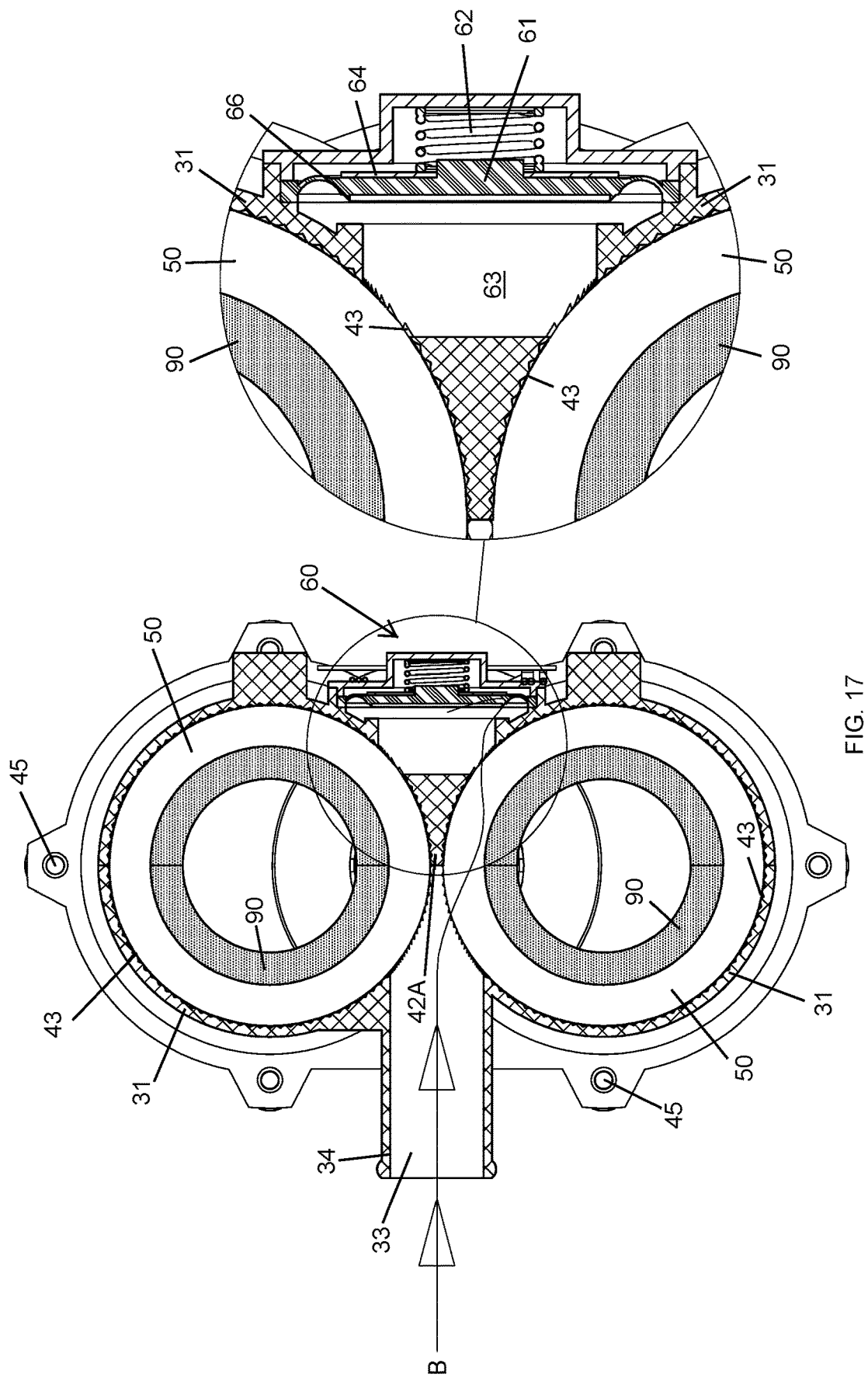
FIG. 17 shows a sectional view taken along line BB of FIG. 15.

FIG. 17 shows a sectional view taken along line BB of FIG. 15. As illustrated the filters 90 are shown in the partially blocked or soiled condition which causes the pressure to increase in the annulus 50 causing the filter blocked valve 60 to move away from and open the pressure relief port 63. Also illustrated here each filter element 90 is disposed within each receptacle in the base housing 31 and positioned within the receptacle leaving an annular space 50 between an external surface of the filter element 90 and an internal surface 43 of the filter receptacle. The annular space 50 together with the textured finish on the internal surface 43 represents a combination that maximizes the liquid wettability within each receptacle, which in conjunction with the tangential nature of the blow-by gas flow relative to the internal receptacle wall 43 increases the separating efficiency of liquid particles in the gas flow within the receptacle onto the internal receptacle wall 43. In particular, when a downward spiral surface texture is utilised on the internal receptacle wall 43 this ensures that the blow-by gas stream will flow substantially over the axial length of each filter element 90. Liquid wettability is defined as the tendency of one fluid to spread on or adhere to a solid surface in the presence of other immiscible fluids.

Figure 19:
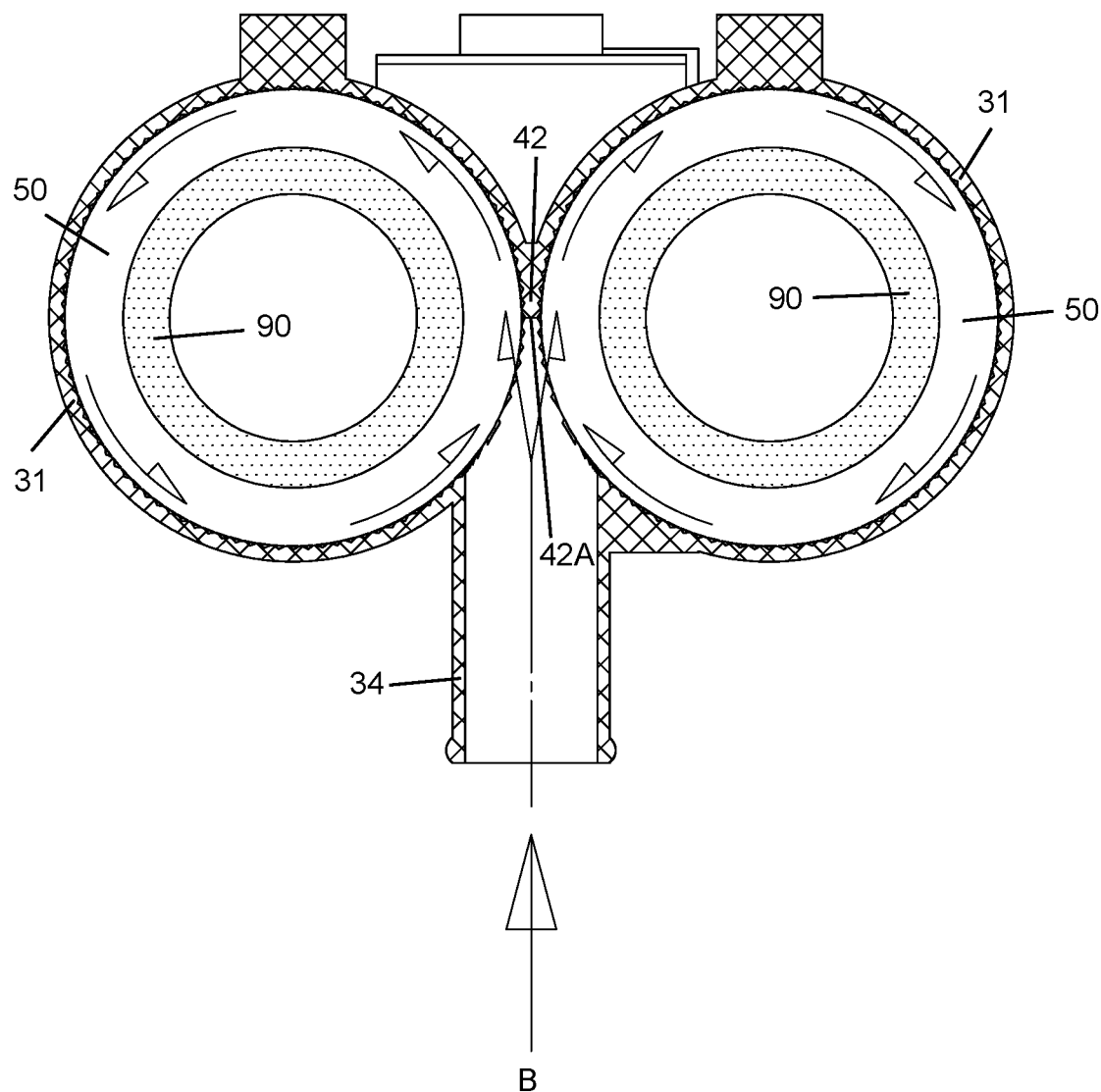
FIG. 19 shows a sectional view taken along line CC of FIG. 18.

Also illustrated in FIGS. 17 and 19, the flow splitter 42 has a leading edge 42A positioned centrally in line with the inlet port 33 and provides two diametrically opposed openings 42B into each filter receptacle. The flow splitter 42 is described above in detail with regards to FIG. 4 and will not be repeated here. The blow-by gas stream is indicated by arrow B, as the gas stream hits the flow splitter 42, the stream and the velocity of the stream is split equally into two paths which flow into both filter receptacles and over both filter elements 90. It is the shape and positioning of the flow splitter 42 which causes the gas stream to split evenly. The filters 90 placed inside the liquid separating device 30 are preferably a cylindrical filter 90 as illustrated but can be other shapes. Each filter element 90 has a covering surface 91 extending parallel to a direction of flow of the fluid flowing through the filter media 91. The filter media 91 is formed from any one of a metal mesh, synthetic fibre or natural fibre.

Figure 18:
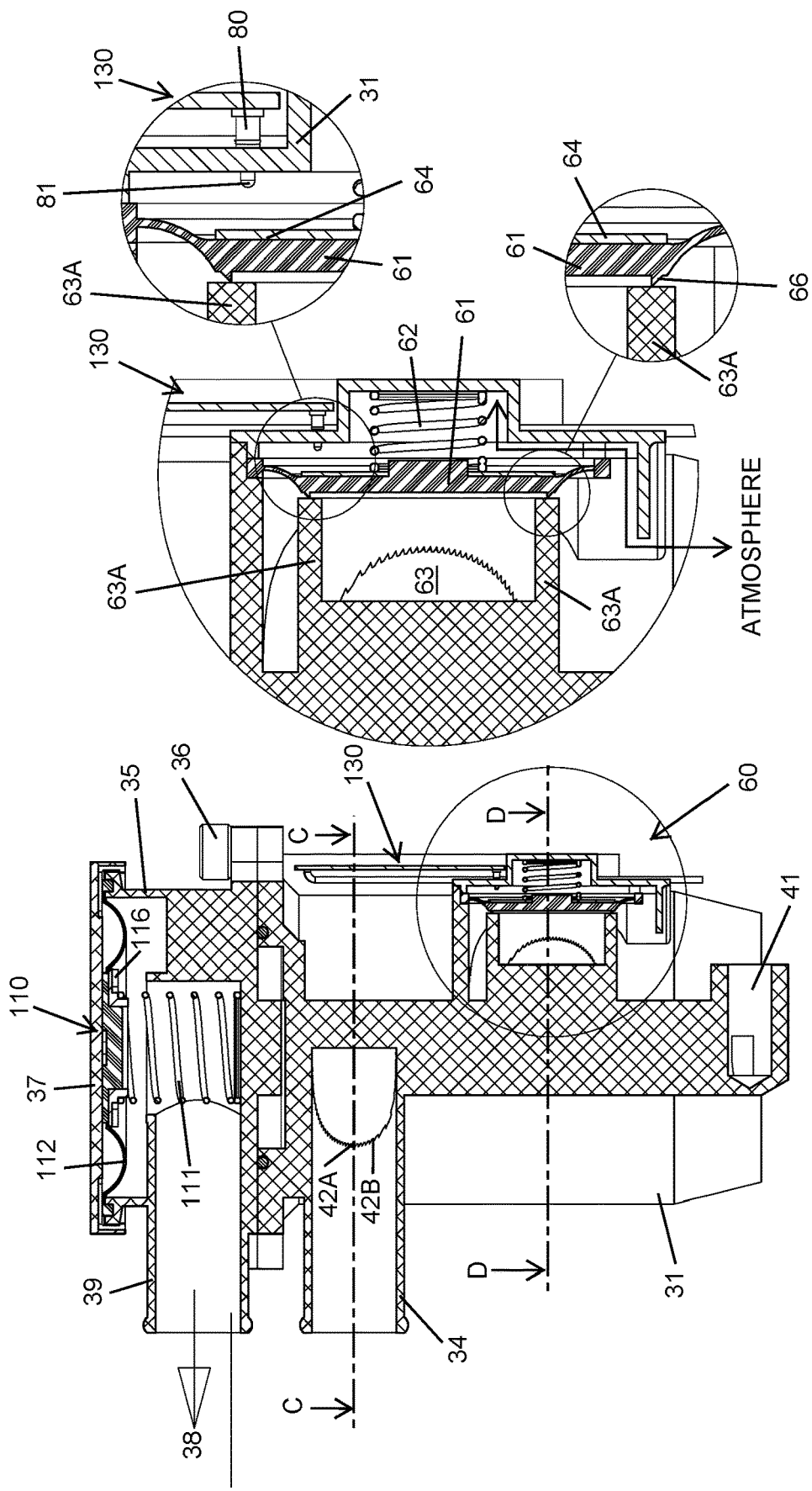
FIG. 18 illustrates another sectional view taken along line HH of FIG. 14 and showing the pressure regulator in the removable cap portion drawn in the open position and the over pressure relief valve in the closed position indicating normal operation of the liquid separating device.

FIG. 18 shows the normal operation of the liquid separating device 30 with the filter blocked valve 60 in the closed position against the walls 63A of the pressure relief port 63. As is illustrated, the moveable means 61 and the contact plate 64 are positioned away from the contacts 80, 81 therefore opening the contacts 80, 81 and ensuring that the warning light (LED) 141 and/or buzzer are not activated. FIG. 18 also shows that the moveable means 61 and the knife edge surface 66 with the filter blocked valve 60 in the closed position engages with the outer wall 63A of the pressure relief port 63 of the base housing 31. The knife edge surface 66 increases the contact pressure between the movable means 61 and the filter blocked valve seat or walls 63A to prevent leakage of gas pressure and liquid within the pressure relief port 63.

The filter blocked valve 60 and the moveable means 61 may be manufactured from a polymer material, such as a nitrile rubber material. Likewise, the biasing member or spring 62 is manufactured from stainless steel or the like material. The contact plate 64 is a metal plate, and preferably any metal plate which is electrically conductive to aid in forming the moveable contact part of the filter blocked switch 64, 80, 81.

Figure 20:
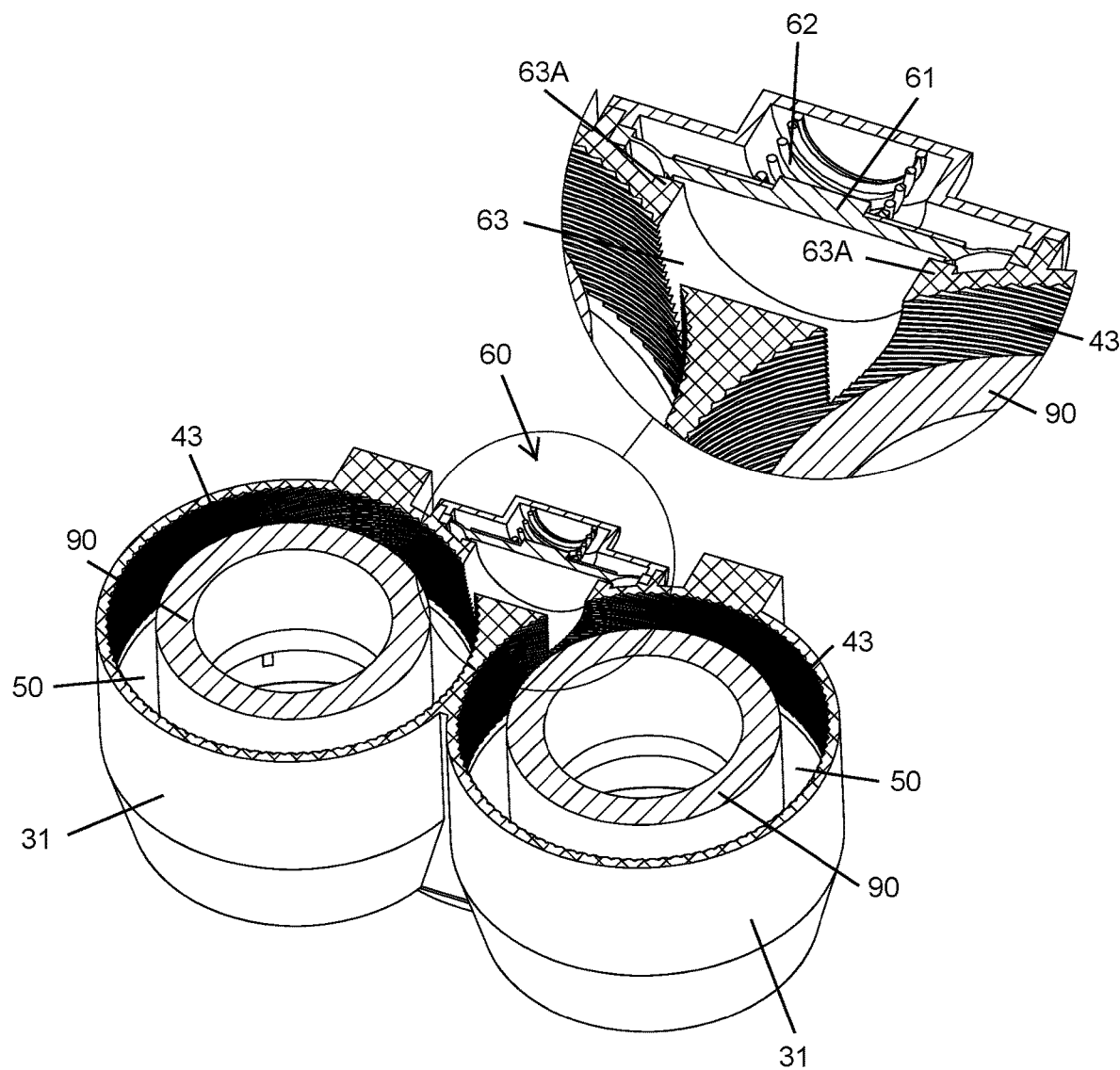
FIG. 20 shows a sectional perspective view taken along line DD of FIG. 18.
Figure 21:
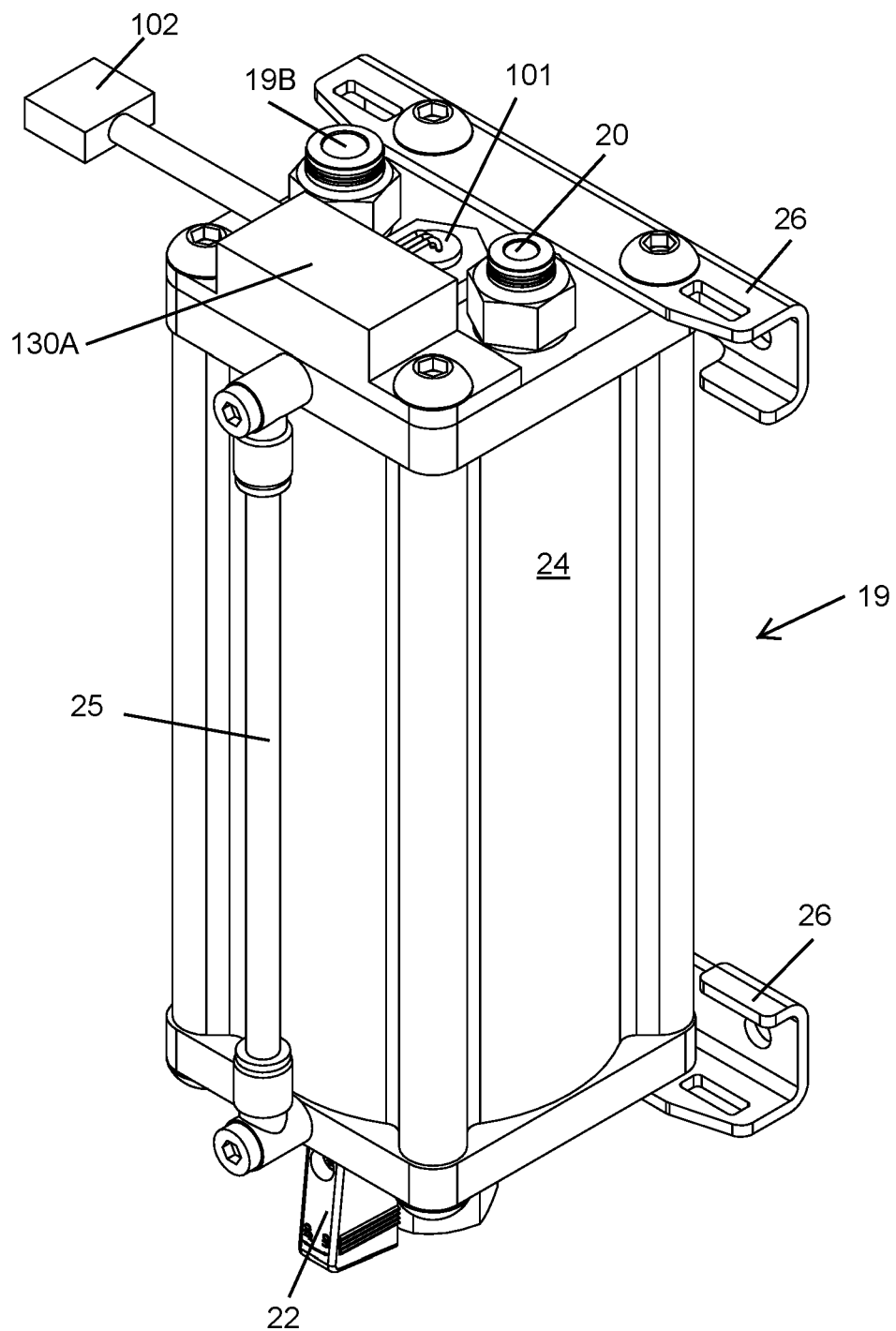
FIG. 21 shows a perspective front view of the remote liquid reservoir in accordance with an embodiment of the present invention.

FIG. 19 is a sectional view taken along line CC of FIG. 18 and illustrates the even split of the flow and velocity of the blow-by gas stream as indicated by arrow B. Likewise, FIG. 20 is a sectional perspective view taken along line DD of FIG. 18 and highlights the annular space 50 between the filter element 90 and the internal wall 43 of each filter receptacle in the base housing 31.

Figure 24:
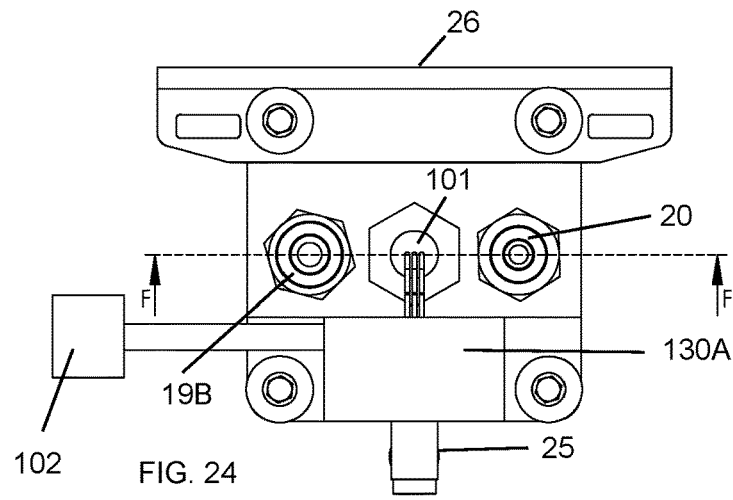
FIG. 24 shows a top view of the remote oil reservoir of FIG. 21.
Figure 25:
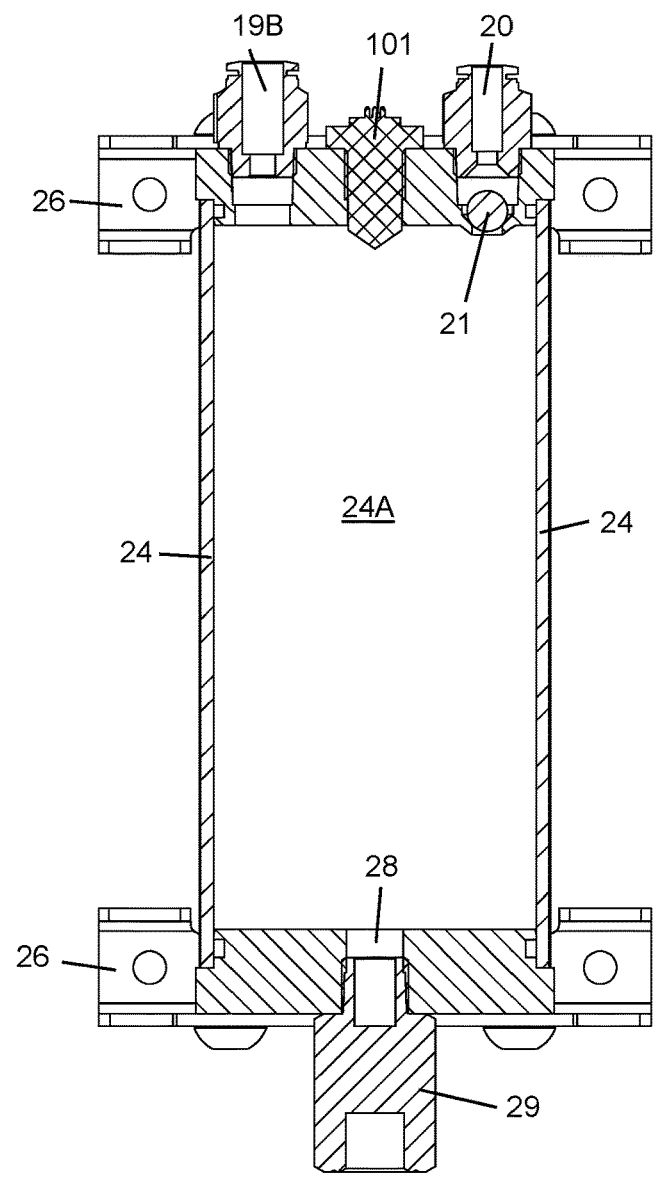
FIG. 25 illustrates a sectional view taken along the line FF of FIG. 24.
Figure 26:
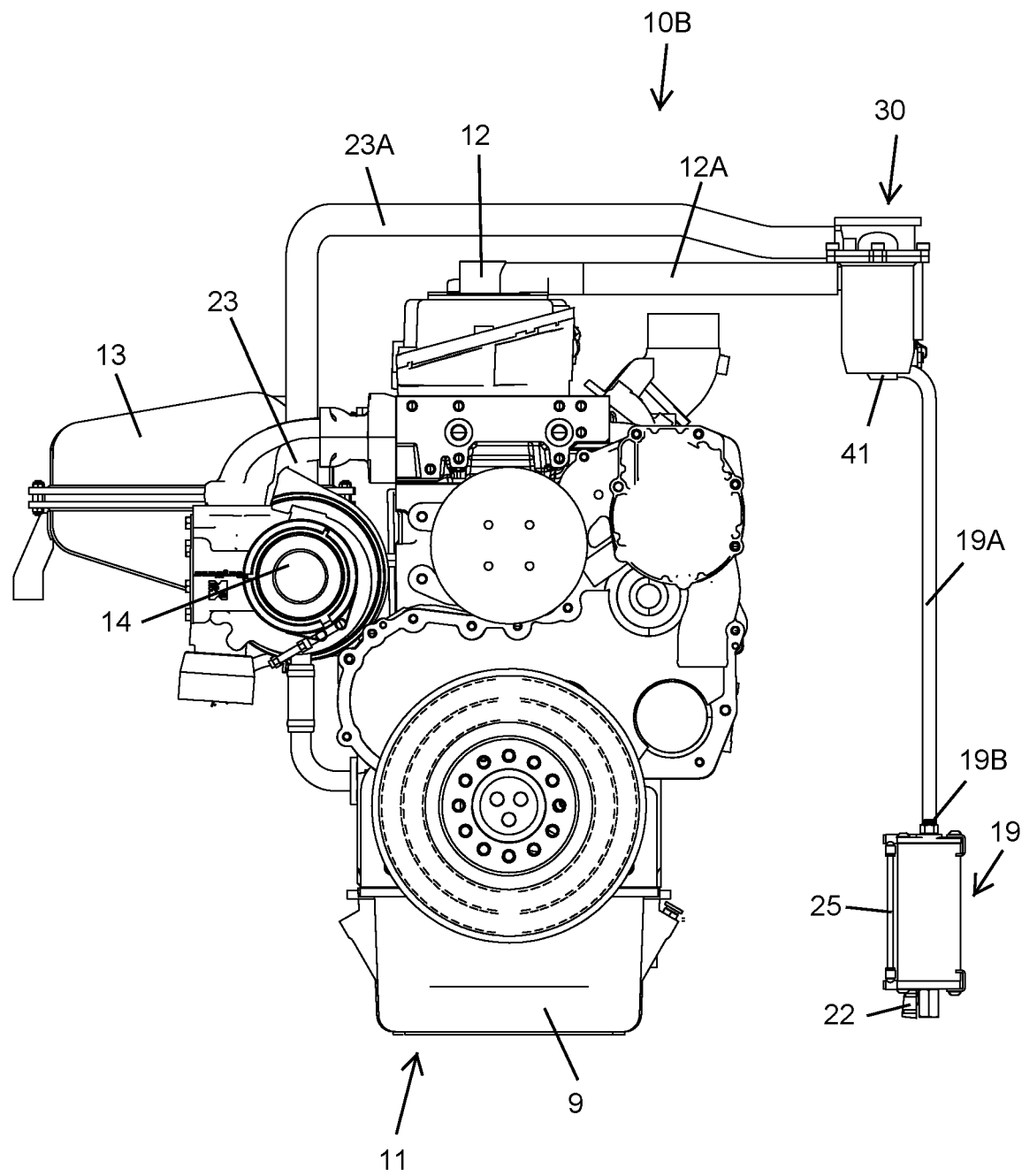
FIG. 26 shows a perspective view of the liquid separator system in accordance with another embodiment of the present invention.

FIGS. 21 to 25 show a remote reservoir 19 which is utilised in the embodiment of the liquid separating system 10B shown in FIG. 26. The remote reservoir 19 is formed as an elongated rectangular or circular body with one end housing the liquid inlet port 19B, breather vent 20, liquid level switch 101, reservoir electronic controller 130A and electrical connector 102. The opposing end housing the drain port 28, drain 29 and manual drain valve 22. A reservoir 24 for retaining liquid therein is positioned between the opposing ends of the remote reservoir 19. Mounting brackets 26 are attached at the opposing ends of the remote reservoir 19 for mounting the remote reservoir 19 in a position below the drain port 41 of the liquid separating device 30. The mounting brackets 26 can be mounted in position using fasteners or retaining straps (not shown). A sight glass 25 is mounted externally on the front of the remote reservoir 19 to provide an indication of the amount of liquid within the reservoir 24.

FIG. 23 is a sectional view taken along line EE of FIG. 22. Passages 27, 27A are provided in the opposing ends of the remote reservoir 19 which allow the flow of liquid in the reservoir into the sight glass 25 to provide the indication of the amount of liquid within the reservoir 24. The passages 27, 27A allow the liquid within the reservoir to be in fluid communication with the sight glass 25. The liquid level switch 101 is mounted in the end of the reservoir housing so that one end of the liquid level switch 101 is in fluid contact with the inside of the reservoir 24. As such, when liquid within the reservoir 24 comes into contact with the bottom of the liquid level switch 101 and closes the circuit in the switch 101, the switch 101 activates the latching relay 135A in the reservoir electronic controller 130A and provides the circuit to activate the LED 141 in the remote warning/maintenance system 140.

The latching relay 135A maintains the closed circuit until it is reset by the reset switch 142 of the remote warning/maintenance system 140. The electronic controller 130A also includes a delay circuit 136A for the liquid level switch 101. The delay circuit 136A is designed to prevent false triggering of the remote warning/maintenance system 140 by liquid movement within the remote reservoir 19. In order to avoid inadvertently triggering the remote warning/maintenance system 140, the delay circuit 136A or a delay timer sets a predetermined amount of time which liquid must be in contact with the liquid level switch 101 prior to triggering the remote warning/maintenance system 140. This will avoid triggering the remote warning/maintenance system 140 where any momentary splash of liquid comes into contact with the liquid level switch 101 in the remote reservoir 19. The electronic controller 130A may also include components which control the speed at which the warning light or LED 141 flashes or the intensity of the warning light 141 to indicate specifically that the remote reservoir 19 needs to be drained. This can be used to differentiate the activation of the warning light 141 from other faults our indications from the liquid separating system 10B.

FIG. 25 is a sectional view taken along line FF of FIG. 24 and illustrates the design of the breather vent 20 in the top of the remote reservoir 19. As shown in FIG. 25 the internal surface 24A of the reservoir 24 is in fluid communication with the inlet port 19B, the liquid level switch 101 and the breather vent 20. Remote reservoir 19 has a liquid inlet 19B from the liquid separating device 30. The breather vent 20 has a float 21 positioned within a channel in the upper end of the remote reservoir 19. The channel connects the breather vent 20 to the reservoir 24. The float 21 is weighted so that it will float on the liquid within the remote reservoir 19 and move with the liquid within the channel between the breather vent 20 and the reservoir 24. The float 21 may be a plastic ball, such as polypropylene or polyethylene ball and is used to prevent escape of liquid from the reservoir 24 by blocking the channel seat in the bottom of the breather vent 20. The float 21 also acts as a non-return valve so that if there was a pressure created in the liquid separating device 30 air cannot be pushed or sucked into the remote reservoir 19 and liquid therefore potentially be pushed (or sucked) back into the liquid separating device 30.

FIG. 26 illustrates the embodiment 10B in which the remote reservoir 19 connects to the liquid separating device 30. A hose 19A connects the remote reservoir 19 to the liquid drain port 41 at the bottom of the liquid separating device 30. FIG. 26 illustrates the liquid separator system 10B installed on an internal combustion engine 11. The liquid separating device 30 is conveniently positioned to allow the blow-by gasses to flow from the crankcase via the positive crankcase ventilation outlet 12 and the connecting hose 12A. The blow-by gasses and the end of hose 12A is connected to the inlet port 33 on the liquid separating device 30. The outlet port 38 of the liquid separating device 30 provides a gas stream with any oil/fuel aerosol removed and returned to the engine air inlet manifold 23 via hose 23A. The returned gas stream is then mixed with fresh air from the air filter 13. In this embodiment the liquid separating device 30 and the liquid drain 41 of the liquid separating device 30 is connected to the hose 19A and the remote reservoir 19. In this embodiment the liquid from the liquid separating device 30 flows directly into the remote reservoir 19 via hose 19A. The liquid will accumulate in the remote reservoir 19 as will be indicated by the sight glass 25. As the remote reservoir 19 and the hose 19A becomes full of liquid, the fluid level switch 100 will be activated and subsequently trigger the remote warning/maintenance system 140. This flashes the LED 141 to provide an indication to the operator of the internal combustion engine 11 that the remote reservoir 19 needs to be drained. Alternatively, and as described above in relation to FIGS. 21 to 25 the remote reservoir 19 may include liquid level switch 101, reservoir electronic controller 130A and electrical connector 102. The liquid level switch 101 is mounted in the end of the reservoir housing so that one end of the liquid level switch 101 is in fluid contact with the liquid inside the reservoir 24.

Figure 27:
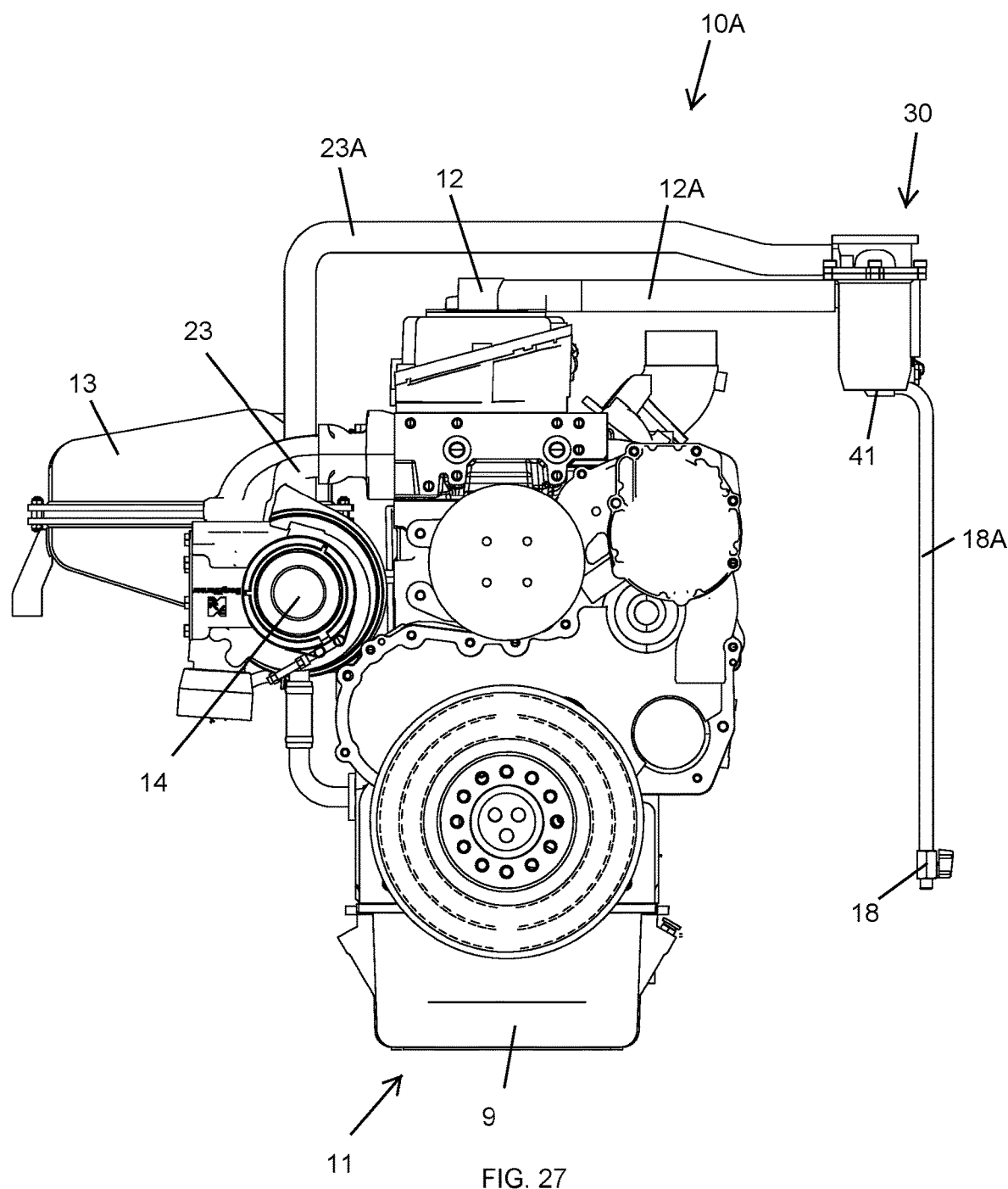
FIG. 27 shows a perspective view of the liquid separator system in accordance with a still further embodiment of the present invention.

FIG. 27 illustrates the embodiment 10A in which the liquid drain port 41 of the liquid separating device 30 is connected by hose 18A to the manual drain valve 18. FIG. 27, like FIG. 26 illustrates the liquid separator system 10A installed on an internal combustion engine 11. As the hose 18A and the bottom of the liquid separating device 30 becomes full of liquid, the fluid level switch 100 will be activated and subsequently trigger the remote warning/maintenance system 140. This flashes the LED 141 to provide an indication to the operator of the internal combustion engine 11 that the manual drain valve 18 should be utilised to drain the liquid from the hose 18A.

Figure 28:
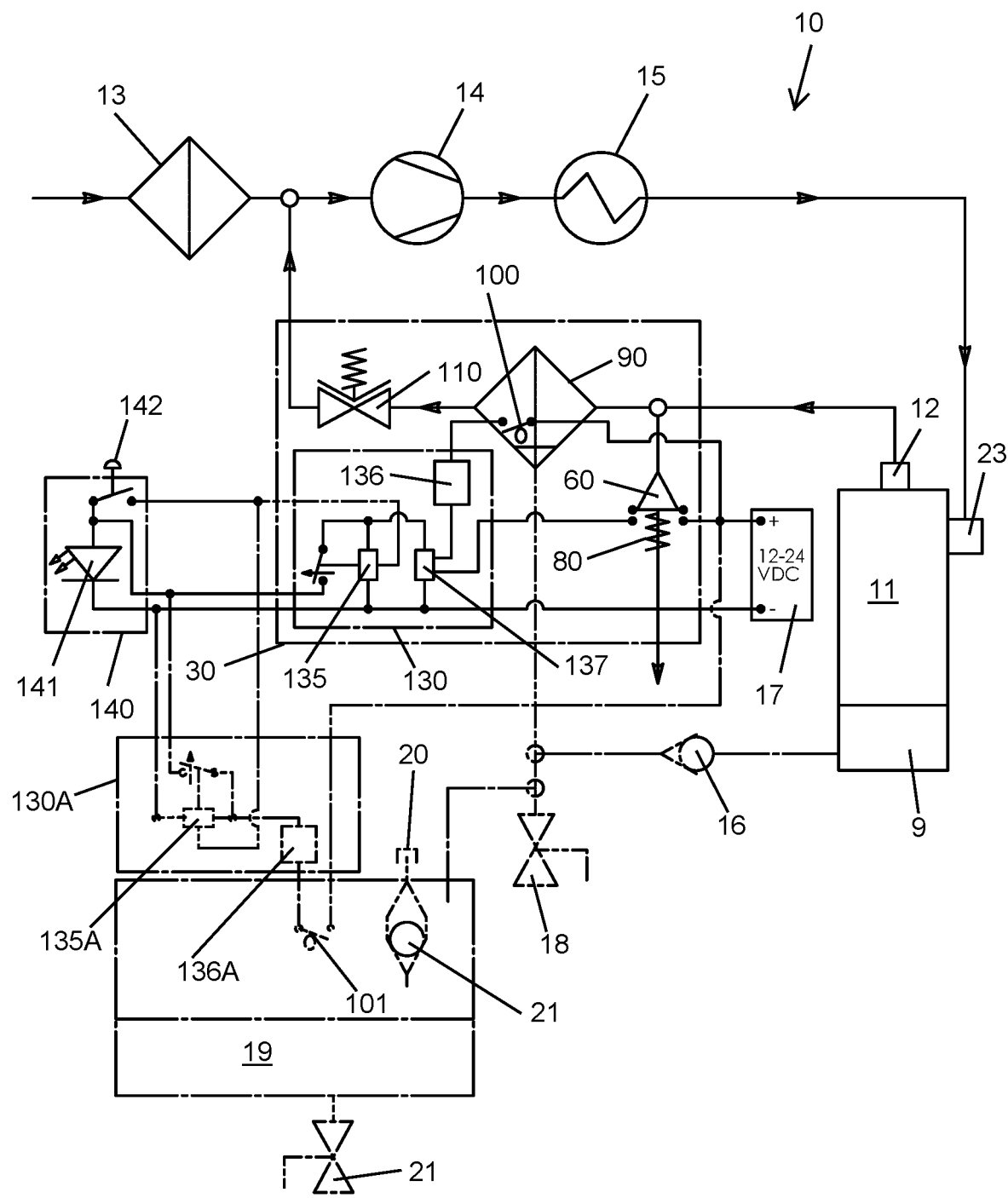
FIG. 28 shows a schematic view of the liquid separator systems of FIGS. 1, 26 and 27.
Figure 29:
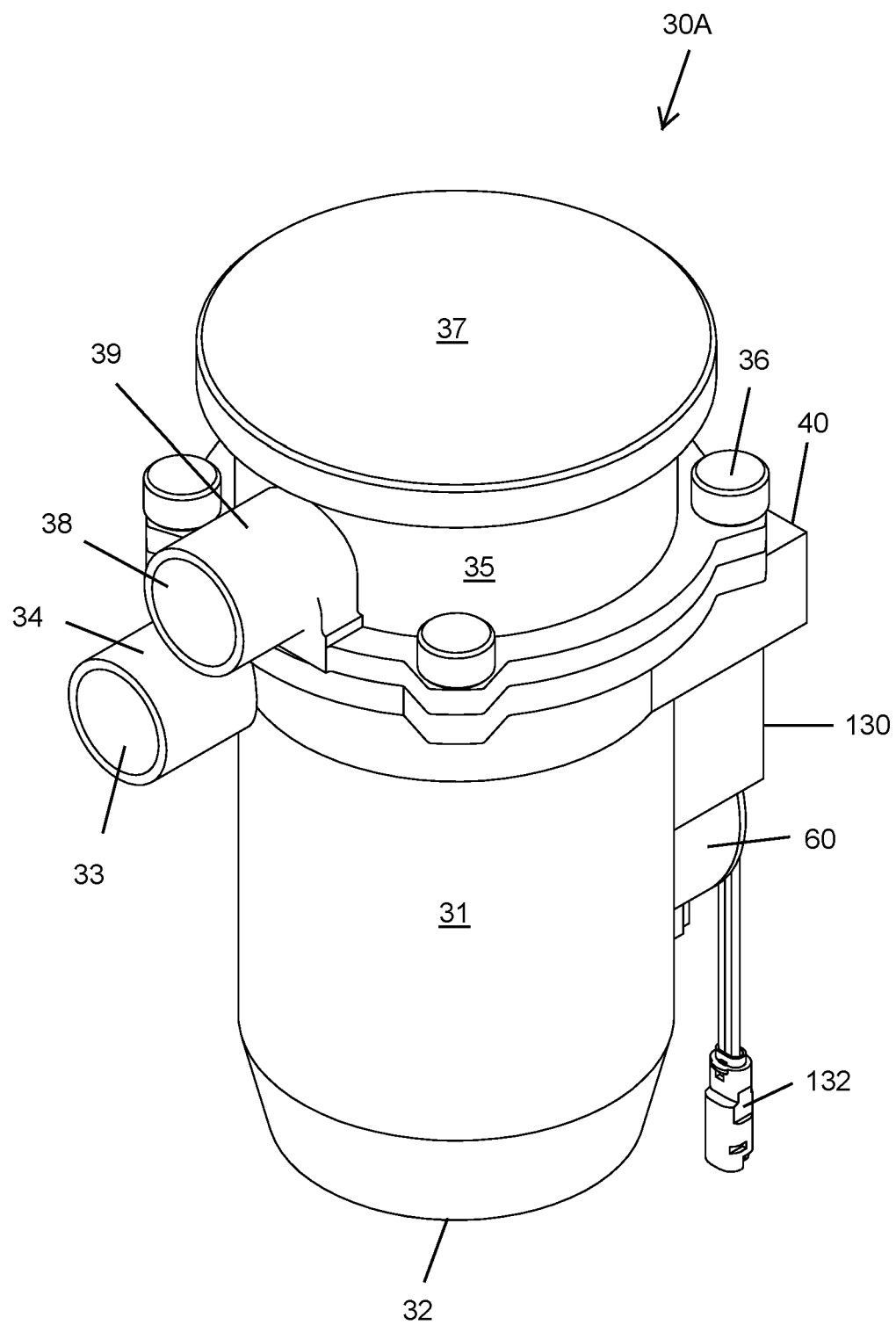
FIG. 29 shows a perspective view of a further embodiment of the liquid separating device in accordance with the present invention.

FIG. 28 illustrates a schematic system view of the liquid separator systems 10, 10A and 10B. The liquid separator device 30 is connected to internal combustion engine 11 at the positive crankcase ventilation outlet 12. The internal combustion engine 11 as illustrated is a diesel engine, the kind typically seen in 4WD vehicles or commercial vehicles. The internal combustion engine 11 has an air intake system including air filter 13, turbocharger 14 and intercooler 15. The air intake system is connected to the internal combustion engine 11 at the engine air inlet manifold 23. The air filter 13 provides air from the environment for compression within the turbocharger 14, once compressed the intercooler 15 as its name suggest, cools the compressed air by removing heat from the compressed air. The cooled compressed air is then provided to the internal combustion engine 11 via the engine air inlet manifold 23 for the combustion process.

Pressure-charged diesel engines often generate blow-by gases. A blow-by gas is any gas stream or flow of air-fuel mixture leaking past pistons from the combustion chambers. Most blow-by gases contain a gas phase, such as air or combustion gases, typically containing a hydrophobic fluid, such as oil including fuel aerosol. The blow-by gas is directed outwardly from the engine crankcase via the positive crankcase ventilation outlet 12 to the liquid separator device 30 where the hydrophobic fluid is removed from the blow-by gas stream. The liquid separator device 30 is typically positioned within the engine compartment and in most cases adjacent to the crankcase of the internal combustion engine 11. The positive crankcase ventilation outlet 12 is connected to the inlet port 33 by hose 12A. Opposing ends of the hose 12A are secured by a suitable fastening device at one end to the positive crankcase ventilation outlet 12 and at the other end over the inlet spigot 34 of the inlet port 33. The outlet port 38 is connected to the engine air inlet manifold 23 by hose 23A. Opposing ends of the hose 23A are secured by a suitable fastening device at one end to the engine air inlet manifold 23 and at the other end over the outlet spigot 39 of the outlet port 38.

As described above in relation to FIGS. 1, 26 and 27 the drain outlet port 41 of the liquid separator device 30 is connected for draining in one of three options. As illustrated in FIG. 1 the drain port 41 is connected via check valve 16 to return oil to the engine oil sump 9. In FIG. 26 the drain port 41 is connected via hose 19A to a remote reservoir 19. For the liquid to drain from the drain port 41 of the liquid separator device 30 to the remote reservoir 19, the remote reservoir 19 needs to be positioned in or adjacent to the engine compartment below the liquid separator device 30. The remote reservoir 19 has mounting brackets 26 which allow the remote reservoir 19 to be easily mounted within or adjacent to the engine compartment. In FIG. 27 the drain port 41 is connected via hose 18A to manual drain valve 18.

The liquid separator device 30 includes the pair of filter receptacles separated by flow splitter 42 in the base housing 31. The filter receptacles are adapted to receive therein filter elements 90. Each filter element 90 is a removable cylindrical filter 90 with a filter media 91 for removing the hydrophobic liquid from the blow-by gas. The base housing 31 also includes the inlet port 33 and the filter blocked valve 60 for identifying when a filter element 90 is partially blocked. Mounted in the bottom of one of the receptacles is a liquid level switch 100 for alerting the operator when the liquid in the bottom of the base housing 31 reaches a predetermined level. The filter blocked switch fixed contact 80 and the electronic controller 130 are also positioned on the rear surface of the base housing 31. A removable cap 35 is fastened to the top of the base housing 31 and includes the pressure regulator 110 and the outlet port 38. The removable cap 35 allows access within the liquid separator device 30 for removal or maintenance of the filter elements 90.

The electronic controller 130 is mounted on the rear of the base housing 31 and has a conformal coating to protect the electronic controller 130 from moisture, dust, chemicals, and temperature extremes. For example, the electronic controller 130 may include a coating material such as a thin polymeric film which conforms to the contours of the electronic controller 130 to protect the controller's components. Alternatively, the conformal coating material may be selected from the group consisting of acrylics, silicones, urethanes, and polymers. The electronic controller 130 includes circuitry for receiving switching signals from the liquid level switch 100 and the filter blocked switch fixed contact 80 and providing activating signals to the remote warning/maintenance system 140 and/or a warning buzzer mounted on the liquid separating device 30. The electronic controller 130 also includes a latching relay 135 to maintain the closed contact when activated by either the filter blocked switch fixed contact 80 or the liquid level switch 100, until it is reset by the reset switch 142 of the remote warning/maintenance system 140. Connected between the latching relay 135 and the liquid level switch 100 is the delay circuit 136. The delay circuit 136 is designed to prevent false triggering of the remote warning/maintenance system 140 by liquid movement within the liquid separating device 30. In order to avoid inadvertently triggering the remote warning/maintenance system 140, the delay circuit 136 or a delay timer sets a predetermined amount of time which liquid must be in contact with the liquid level switch 100 prior to triggering the remote warning/maintenance system 140. This will avoid triggering the remote warning/maintenance system 140 where any momentary splash of liquid comes into contact with the liquid level switch 100 in the liquid separating device 30.

The remote warning/maintenance system 140 provides an operator of the internal combustion engine 11 with the operating status of the liquid separator system 10, 10A, 10B, an indication that a problem exists, or maintenance is required for the liquid separator system 10, 10A, 10B. In this example the remote warning/maintenance system 140 is a combined warning LED 141 and fault reset switch 142 mounted conveniently within the dash of a vehicle.

The remote reservoir 19 includes liquid level switch 101, reservoir electronic controller 130A and electrical connector 102. When liquid within the reservoir 24 comes into contact with the bottom of the liquid level switch 101 and closes the circuit in the switch 101, the switch 101 activates the latching relay 135A in the reservoir electronic controller 130A and provides the circuit to activate the LED 141 in the remote warning/maintenance system 140. The latching relay 135A maintains the closed circuit until it is reset by the reset switch 142 of the remote warning/maintenance system 140. The electronic controller 130A also includes a delay circuit 136A for the liquid level switch 101. The delay circuit 136A is designed to prevent false triggering of the remote warning/maintenance system 140 by liquid movement within the remote reservoir 19. In order to avoid inadvertently triggering the remote warning/maintenance system 140, the delay circuit 136A or a delay timer sets a predetermined amount of time which liquid must be in contact with the liquid level switch 101 prior to triggering the remote warning/maintenance system 140. This will avoid triggering the remote warning/maintenance system 140 where any momentary splash of liquid comes into contact with the liquid level switch 101 in the remote reservoir 19.

The electronic controllers 130, 130A may also include circuitry 137 for controlling the flash rate of the LED 141. The remote warning/maintenance system 140 and the LED 141 can be designed to provide different flash rates to quickly identify which fault has occurred or what maintenance is required. For example, a partially blocked filter indication which could cause an over pressure within the crankcase of the internal combustion engine 11 may flash the LED 141 at a fast continuous rate. Likewise, if the liquid level switch 100, 101 has been triggered a slower intermittent flash rate of the LED 141 may occur. Also, on startup the LED 141 will flash twice to indicate that the system is operational and that respective components of the system are functioning correctly.

The electronic controller 130 also includes the filter blocked switch fixed contact 80 which activates the remote warning/maintenance system 140 when a filter partially blocked condition is identified. As described above moveable means 61 of the filter blocked valve 60 has a contact plate 64 mounted around the moveable means 61. As the moveable means 61 transfers from the closed position to the open position, the contact plate 64 closes against the fixed contacts 81 extending through the rear wall of the base housing 31 to complete the circuit. The completed circuit activates the remote warning/maintenance system 140 via the electronic controller 130. The contacts 81 are mounted through the rear wall of the base housing 31 and connect to the filter blocked switch fixed contact 80 on the electronic controller 130. The contacts 81 may be a gold plated contact or any other suitable contact material. The electronic controller 130 also includes an electrical connector 132 which provides the required power source for the liquid separator systems 10, 10A and 10B. In this example the power source is the 12 or 24 VDC vehicle battery 17.

As described above the electronic controller 130, 130A may provide the signal to activate the remote warning/maintenance system 140 via a cable system 133 through the electrical connector 132, 102 or alternatively may provide wireless connectivity between the fluid separator device 30 and the remote warning/maintenance system 140. The wireless connectivity is provided by a wireless transceiver 134 connected to the liquid separating device 30 and a wireless receiver and antenna 143 on the combined warning LED 141 and fault reset switch 142 of the remote warning/maintenance system 140. The wireless connectivity also provides the further option of a software application on a mobile device which can connect via a Bluetooth connection or other wireless communication connection to enable a user to remotely monitor the liquid separating systems 10, 10A, 10B.

In a still further embodiment, the electronic controller 130 may comprise a programmable computing device with a communication interface, a central processing unit in communication with the communication interface, and a memory in communication with the central processing unit. The memory has stored therein a set of machine readable code executable by the programmable computing device to perform one or more operations in relation to the operation and control of the liquid separator systems 10, 10A, 10B. As mentioned above the machine readable code may include code for receiving and sending the instruction for operation and control from an application running on a mobile device or remote communication device, wherein the application allows a user to send and receive the instructions, the mobile device or remote communication device communicating with the liquid separator system 10, 10A, 10B using a Bluetooth technology or any other wireless communication technology.

FIGS. 29 to 34 illustrate a further embodiment of the liquid separating device 30A in accordance with the present invention. The liquid separator device 30A includes at least one filter receptacle in the base housing 31. The filter receptacle is adapted to receive therein a filter element 90. The filter element 90 is a removable cylindrical filter 90 with a filter media 91 for removing the hydrophobic liquid from the blow-by gas. The base housing 31 also includes the inlet port 33 and inlet spigot 34 and the filter blocked valve 60 for identifying when a filter element 90 is partially blocked. Mounted adjacent the bottom 32 of the receptacle is a liquid level switch 100 for alerting the operator when the liquid in the bottom of the base housing 31 reaches a predetermined level. Mounted on the bottom 32 of the receptacle is the liquid drain port 41 which allows the draining of any liquid which is filtered by the filter element 90 in the liquid separating device 30A. Like the previous embodiment, the drain port 41 can be connected to any one of a hose connected directly back into the sump 9 on the internal combustion engine 11, a drain valve 18 connected directly to the drain port 41 or connected on the distal end of a hose with a proximal end connected to the drain port 41, or to a remote reservoir 19 connected by a hose to the drain port 41. Also mounted on the rear surface of the base housing 31 is at least one mounting block 40 for securing the liquid separating device 30A to the engine compartment.

The filter blocked switch fixed contact 80, electronic controller 130 and the electrical connector 132 are also positioned on or near the rear surface of the base housing 31. A removable cap 35 is secured by fasteners 36 to the top of the base housing 31 and includes the pressure regulator 110, the outlet port 38 and the outlet spigot 39. The removable cap 35 allows access within the liquid separator device 30A for removal or maintenance of the filter element 90. The pressure regulator 110 is secured within the removable cap 35 by the cap 37. The cap 37 can be crimped or secured by any other means to the top of the removable cap 35.

Like the previous embodiment the liquid separator device 30A, the internal surface 43 of the filter receptacle in the base housing 31 has a surface finish which can simply be a textured finish or a surface finish with vane shapes. The shape and/or surface texture is adapted to significantly increase the surface area per unit volume of each receptacle internal surface 43 in comparison to that of a smooth walled receptacle.

Figure 30:
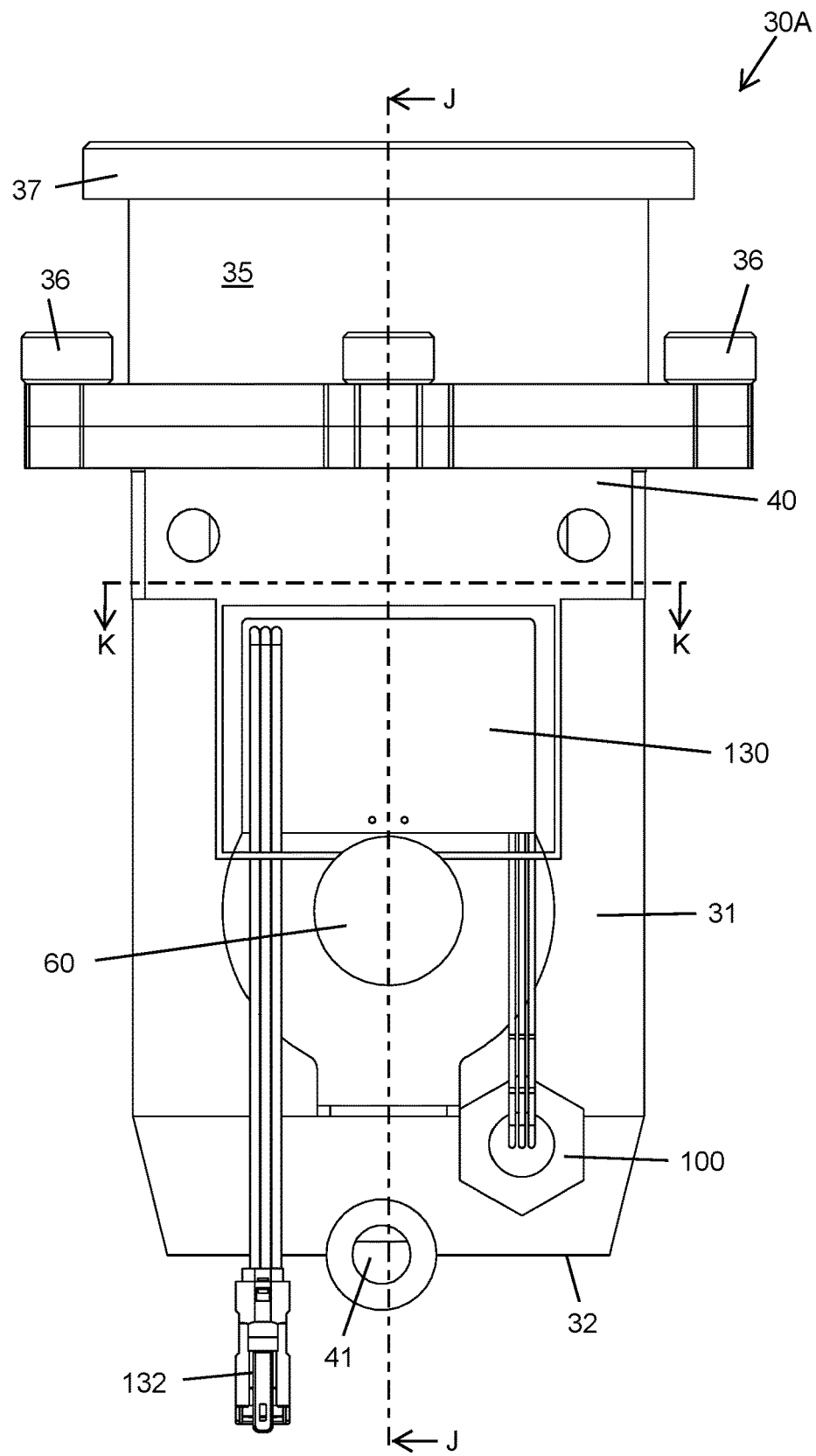
FIG. 30 shows a rear perspective view of the liquid separator device of FIG. 29.
Figure 31:
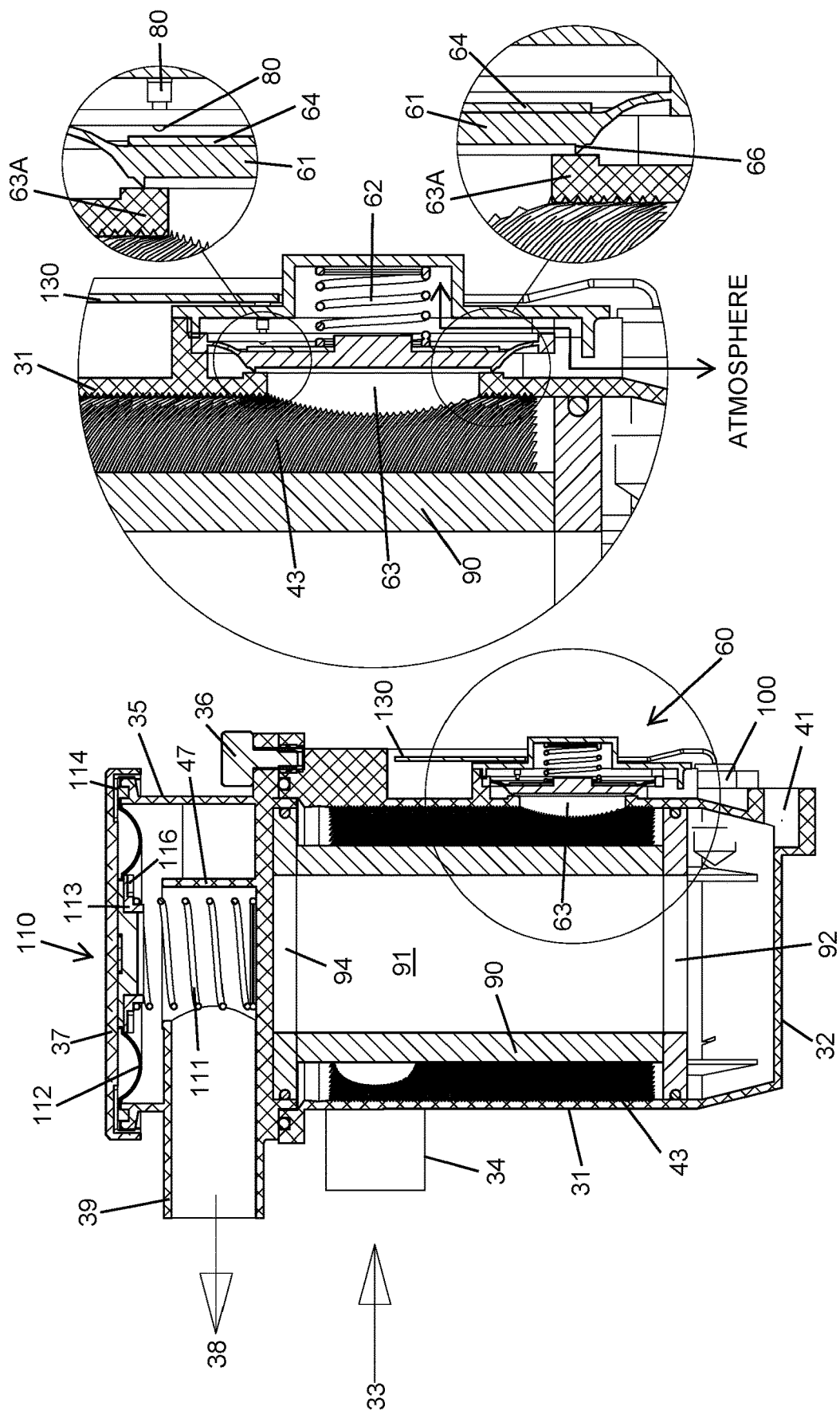
FIG. 31 is a sectional view taken along line JJ of FIG. 30 and showing the pressure regulator in the removable cap portion drawn in the open position and a first embodiment of the over pressure relief valve in the closed position indicating normal operation of the liquid separating device.

FIG. 31 illustrates a sectional view of a first embodiment of the liquid separating device 30A taken along line JJ of FIG. 30 which shows the normal operation of the pressure regulator 110 and the filter blocked valve 60. In the first embodiment, when the filter blocked valve opens an amount of blow-by gas is vented to atmosphere. The operation of these components is identical to that of the previous embodiment and is not repeated here. For example, and while not shown, when the filter blocked valve 60 opens it will vent an amount of the blow-by gas to atmosphere to avoid crankcase overpressure. Under normal operating conditions a substantial flow of blow-by gas will still flow through the partially blocked filter 90 and back to the engine air intake manifold 23. Likewise, the electronic controller 130, the remote warning/maintenance system 140 and associated components all operate in the same manner as those described in relation to the previous embodiment.

The filter receptacle(s) in the base housing 31 are substantially cylindrical in shape but can be other shapes to suit the shape of the filter element 90. The receptacle interior wall 43 has a surface finish or textured finish which in conjunction with the tangential nature of the blow-by gas flow relative to the receptacle wall increases the separating efficiency of oil and similar liquid particles in the gas flow within the receptacle onto the receptacle wall 43. In particular, when the surface finish has the downward spiral surface texture is applied to the internal surface 43 this encourages the flow of blow-by gas in a downward direction. As blow-by gas enters from the inlet port 33 it is forced in a downward direction to ensure that the gas stream is cleaned over substantially the entire length of each filter element 90.

Figure 32:
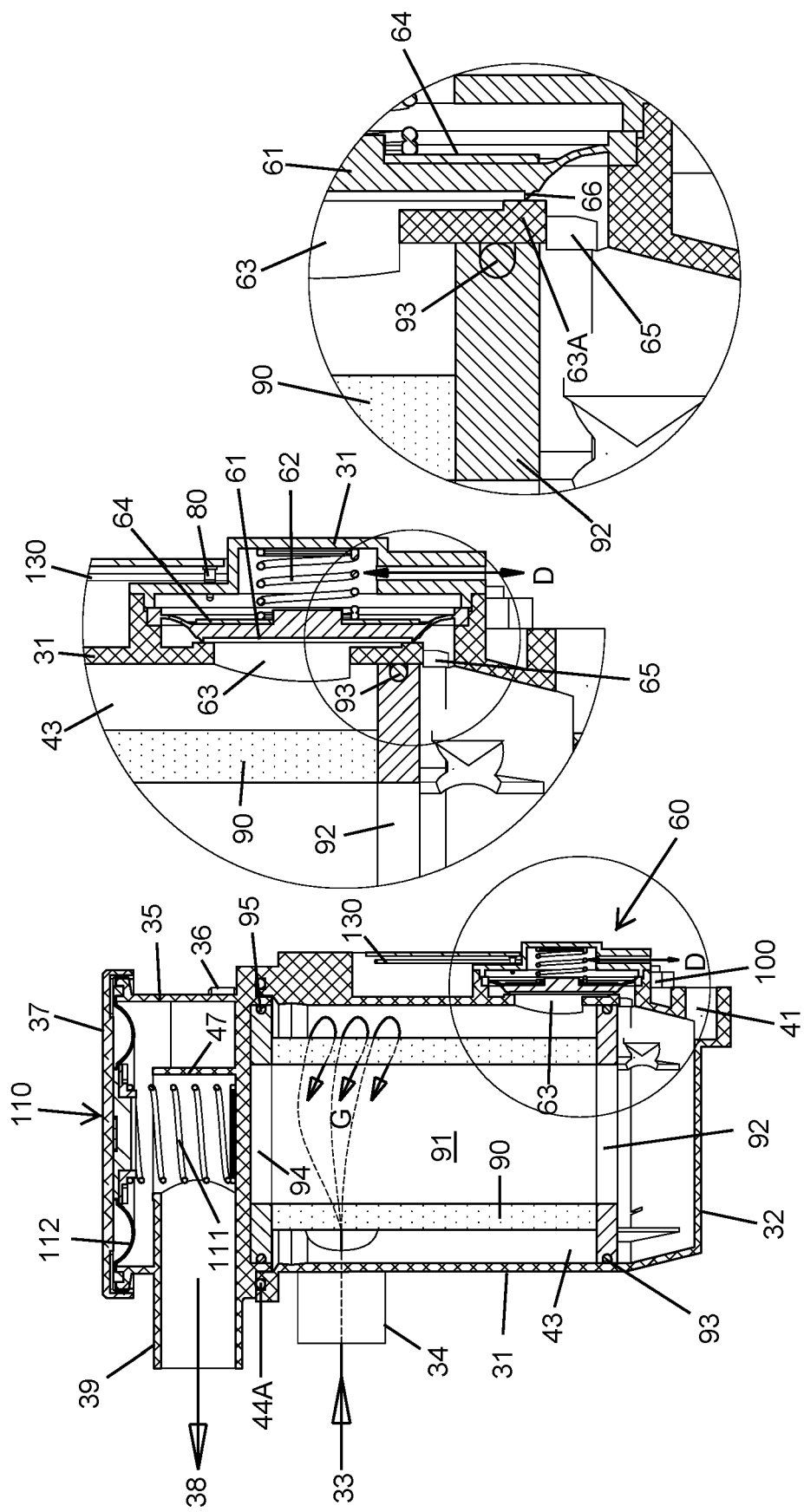
FIG. 32 is a sectional view taken along line JJ of FIG. 30 and showing the pressure regulator in the removable cap portion drawn in the open position and a further embodiment of the over pressure relief valve in the closed position indicating normal operation of the liquid separating device.

FIG. 32 illustrates a sectional view of a further embodiment of the liquid separating device 30A taken along line JJ of FIG. 30 which shows the normal operation of the pressure regulator 110 in the open position and the filter blocked valve 60 in the closed position. In this further embodiment when the filter blocked valve 60 opens the blow-by gas is channeled back into the liquid separating device 30A via passage 65 connected to the pressure relief port 63. Also, of note in this embodiment is that the passage highlighted by arrow D which shows that the rear side of the moveable means 61 supported by the biasing spring 62 is open to atmosphere.

FIG. 32 shows the blow-by gas flow as indicated by arrows G flows in through the inlet port 33 and is forced in a downward direction to ensure that the gas stream is cleaned over substantially the entire length of the filter element 90. The filter blocked valve 60 is shown in the closed position against the walls 63A of the pressure relief port 63. As is illustrated, the moveable means 61 and the contact plate 64 are positioned away from the contacts 80, 81 therefore opening the contacts 80, 81 and ensuring that the warning light (LED) 141 and/or buzzer are not activated. FIG. 32 also shows that the moveable means 61 and the knife edge surface 66 with the filter blocked valve 60 in the closed position engages with the outer wall 63A of the pressure relief port 63 of the base housing 31. The knife edge surface 66 increases the contact pressure between the movable means 61 and the filter blocked valve seat or walls 63A to prevent leakage of gas pressure and liquid within the pressure relief port 63.

Figure 33:
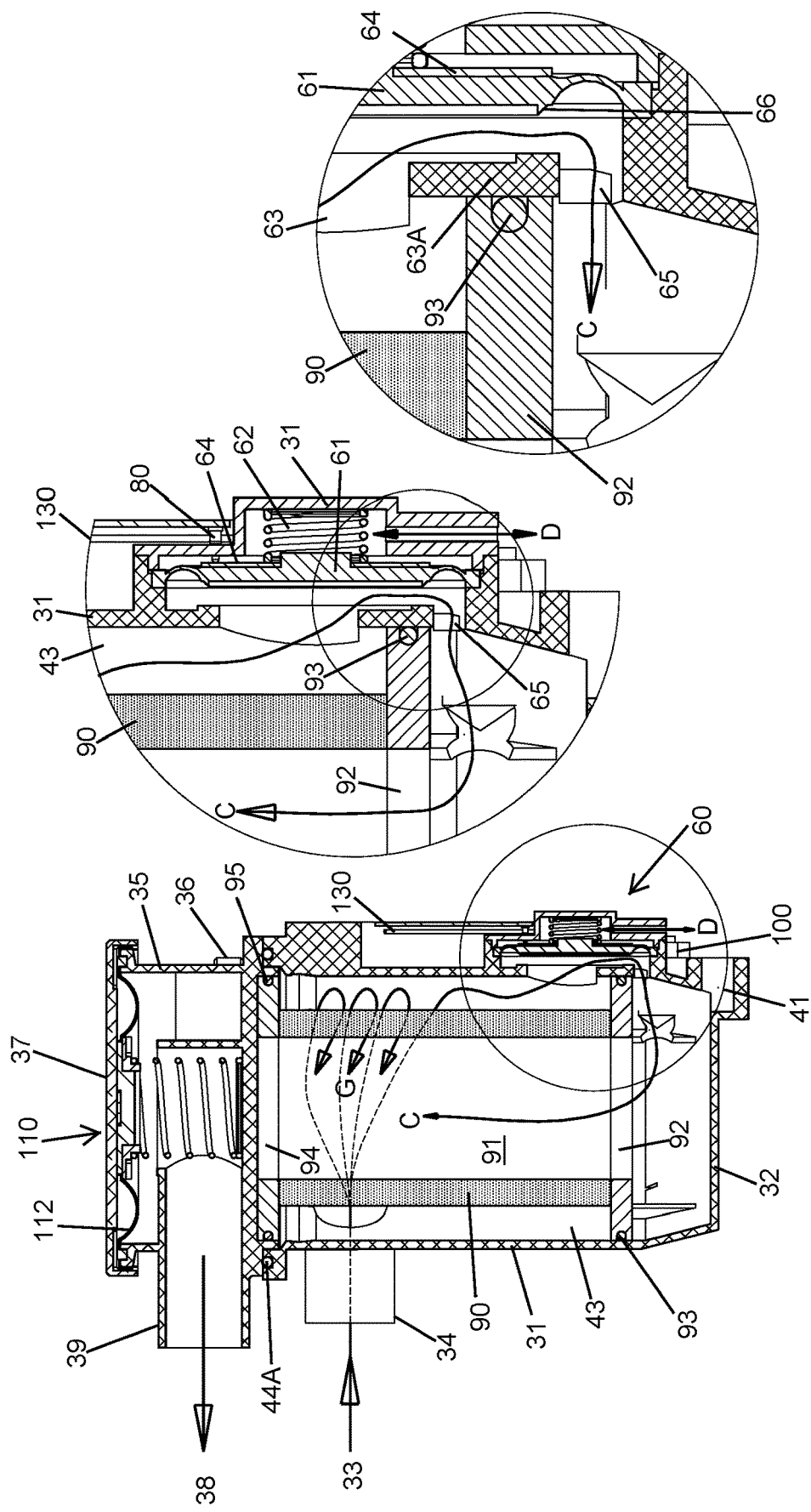
FIG. 33 is a sectional view taken along line JJ of FIG. 30 and showing the pressure regulator in the removable cap portion drawn in the open position and a further embodiment of the over pressure relief valve in the open position indicating a partially blocked filter element.

FIG. 33 illustrates a sectional view of the further embodiment of the liquid separating device 30A taken along line JJ of FIG. 30 which shows the operation of the pressure regulator 110 in the open position and the filter blocked valve 60 in the open position. The filter blocked valve 60, in particular the position of the filter blocked valve 60 when a partially blocked filter 90 condition exists and the filter blocked valve 60 re-circulates the blow-by gas through the liquid separating device 30A. Under normal operating conditions a substantial flow of blow-by gas as indicated by arrows G will still flow through the partially blocked filter 90 and back to the engine air intake manifold 23. This partially blocked filter condition creates an increased pressure on the moveable means 61 of the filter blocked valve 60 which overcomes the biasing member 62 and opens the moveable means 61 to allow an amount of the flow of blow-by gas to flow back through passage 65 in the base housing 31 of liquid separating device 30A in the direction of arrow C to avoid crankcase overpressure. The passage 65 is connected directly from the relief port 63 to direct the flow of blow-by gas back into the liquid separating device 30A. Also illustrated in FIG. 33 is the passage highlighted by arrow D which shows that the rear side of the moveable means 61 supported by the biasing spring 62 is open to atmosphere.

Figure 34:
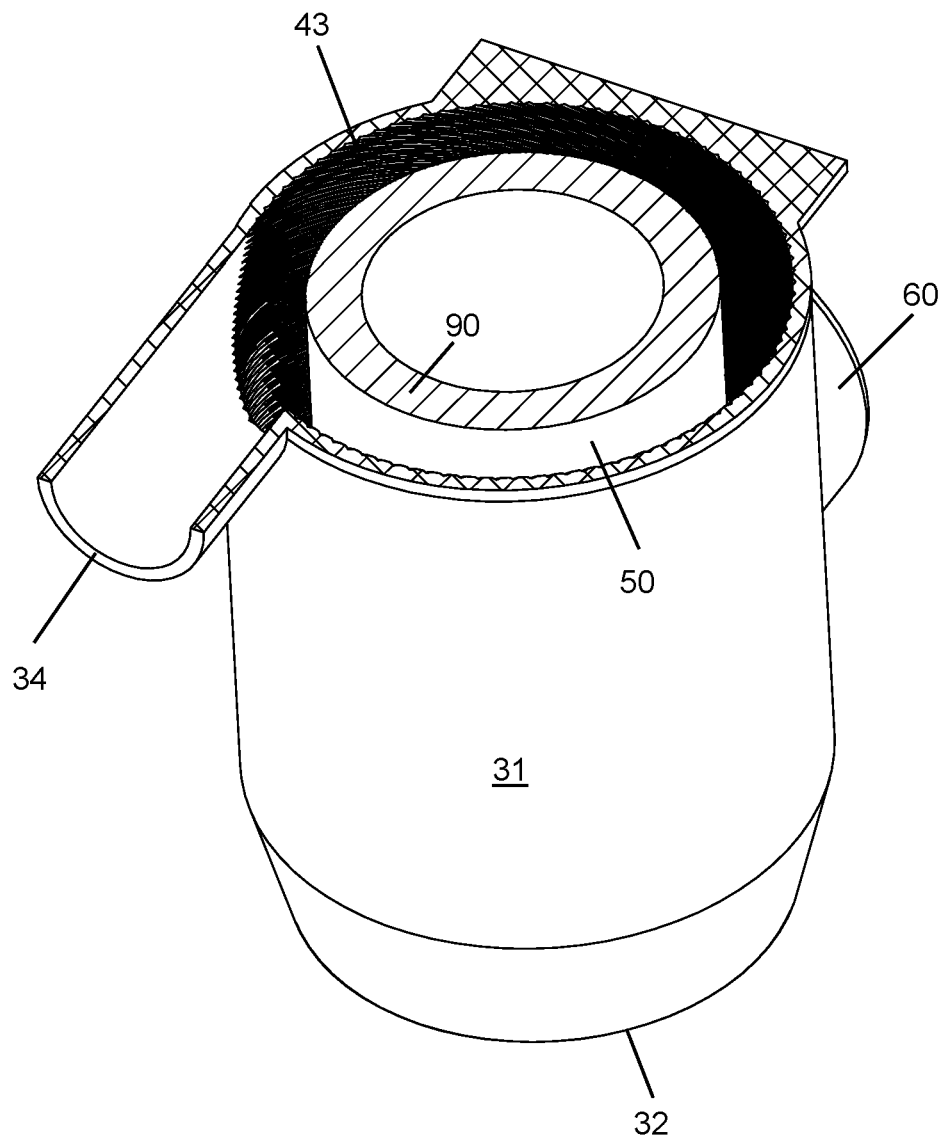
FIG. 34 is a sectional view taken along line KK of FIG. 30.

FIG. 34 shows a sectional view of the liquid separating device 30A taken along line KK of FIG. 30. FIG. 34 highlights the annular space 50 between the filter element 90 and the internal wall 43 of each filter receptacle in the base housing 31. It also illustrates the surface finish or textured finish which in conjunction with the tangential nature of the blow-by gas flow relative to the receptacle wall 43 increases the separating efficiency of oil and similar liquid particles in the gas flow within the receptacle onto the receptacle wall 43.

Figure 35:
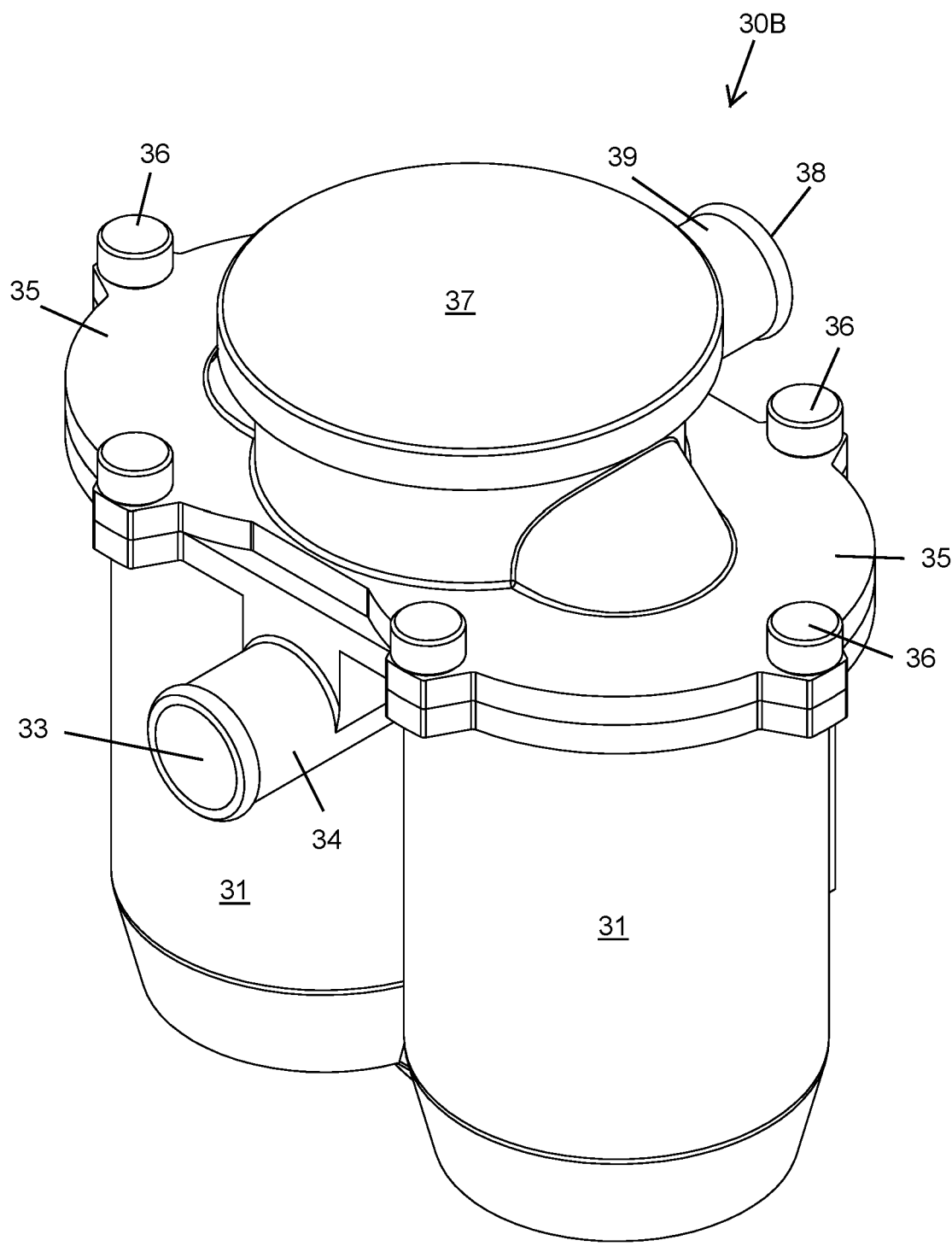
FIGS. 35 to 38 show perspective views of further embodiments of the liquid separating device in accordance with the present invention.
Figure 36:
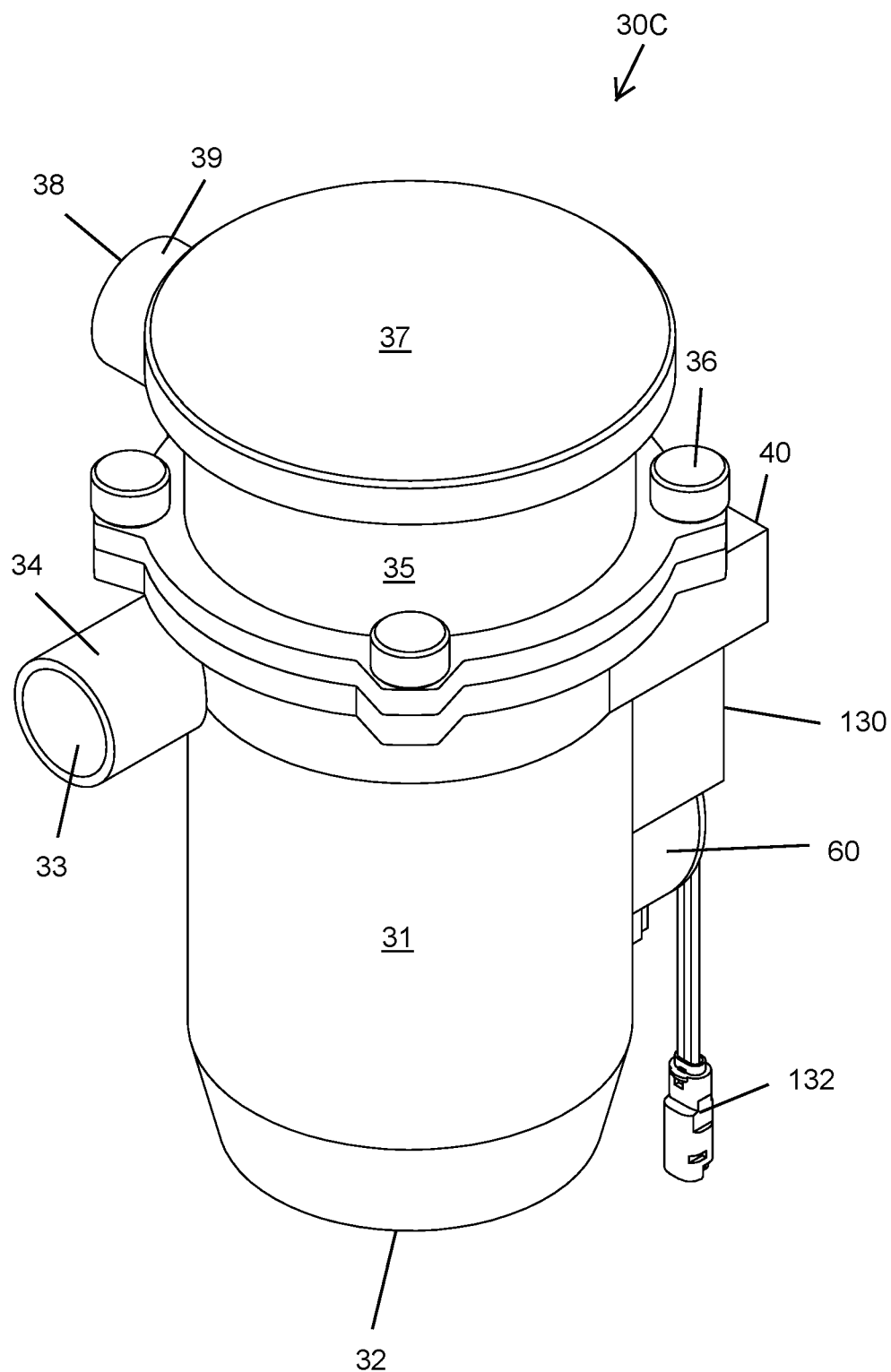
Figure 37:
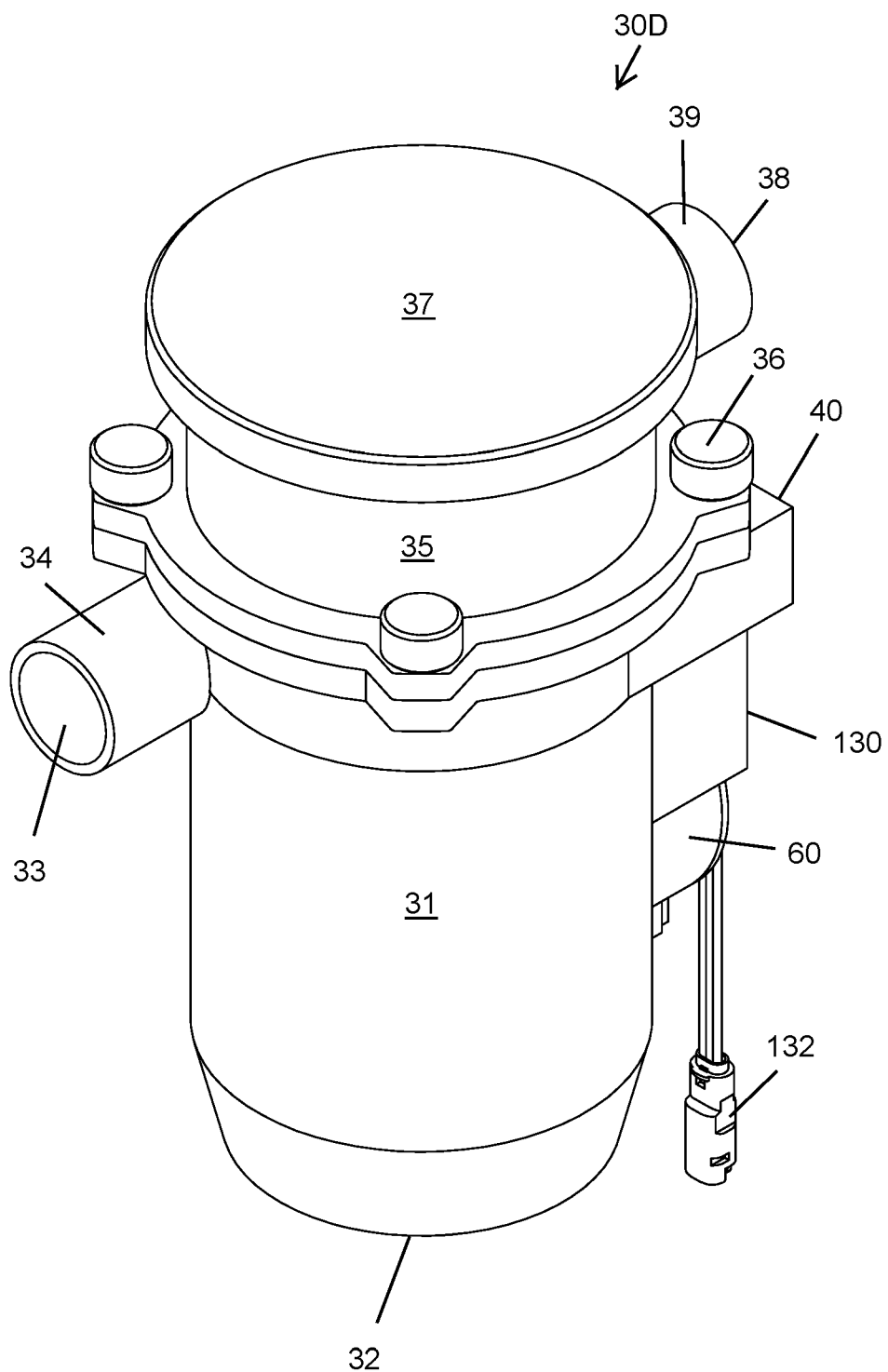
Figure 38:
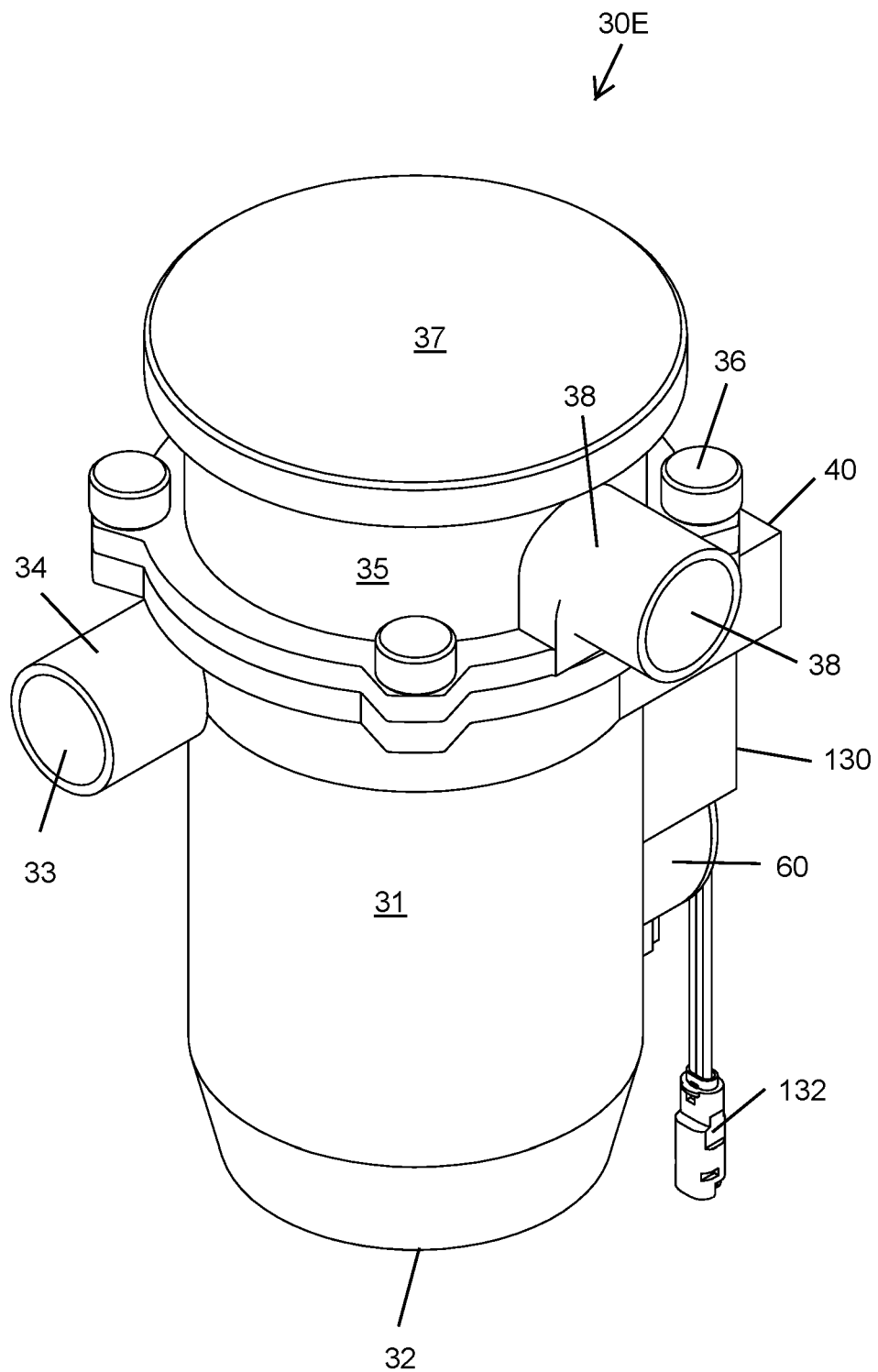

FIGS. 35 to 38 show further embodiments of the liquid separating device 30B, 30C, 30D and 30E of the present invention. When installing the liquid separating device 30, 30A, 30B, 30C, 30D, 30E within the engine compartment of the internal combustion engine 11, it is often desirable to be able to position the hoses 12A, 23A in the best orientation as possible. To achieve the best possible orientation, the removable cap portion 35 has been designed to be able to rotate around the base housing 31 to change the position of the inlet port 33 with respect to the outlet port 38. FIG. 35 illustrates the liquid separating device 30B, the removable cap portion 35 is rotated 180 degrees and secured to the base housing 31 by fasteners 36. In this position, the outlet port 38 is positioned on the opposite side of the base housing 31 to the inlet port 33. FIGS. 36 to 38 show the single reservoir liquid separating device 30C, 30D and 30E illustrating that the removable cap portion 35 can be rotated around the base housing 31. The outlet port 38 can be rotated around the base housing 31 in 90 degree increments with respect to the inlet port 33. FIG. 36 shows the outlet port 38 rotated at 90 degrees with respect to the inlet port 33. Likewise, FIG. 37 shows the outlet port 38 rotated at 180 degrees with respect to the inlet port 33 and so on.

The pressure regulator 110 is integrated into the removable cap 35 and is primarily designed to protect the crankcase of the internal combustion engine 11 from large pressure fluctuations due to differing engine load and speed conditions. The pressure regulator 110 in cooperation with the fluid separating device 30, 30A of the present invention is designed so that the differential pressure between the crankcase and the engine air inlet manifold 23 of the internal combustion engine 11 doesn't become excessive. The engine air inlet manifold 23 of the internal combustion engine 11 draws the blow-by gas stream from the crankcase and maintains a regulated pressure within the crankcase, to pass the blow-by gas stream through the inlet port 33 of the liquid separator device 30, 30A. The flow splitter means 42 of the liquid separator 30 is positioned opposite the inlet port 33 to equally split the flow and velocity of the blow-by gas into each filter receptacle. The filter elements 90 separate the liquid from the blow-by gas and drain the liquid to the bottom of the base housing 31 to prevent passing the liquid in the blow-by gas to the engine air inlet manifold 23.

It is to be understood, however, that even though numerous characteristics and advantages of the present invention have been set forth in the foregoing description, together with details of the structure and function of the invention, the disclosure is illustrative only. Changes may be made in the details, especially in matters of shape, size, materials, and arrangement of parts within the principles of the invention to the full extent indicated by the broad general meaning of the terms mentioned.

Advantages

The present invention has been designed to provide a liquid separator system for an internal combustion engine that provides an indication to an operator when a predetermined fault condition occurs. In the present invention the fault conditions exist when either the filter media is partially blocked and could cause an over pressure situation within the engine crankcase or that the liquid level within the liquid separating device or remote reservoir has reached a predetermined level and requires the operator to drain the system in order to prevent the filters within the device becoming submerged in liquid thus reducing filter efficiency and potentially causing engine damage due to increased crankcase pressures.

The present invention therefore provides an advantage over the prior art systems in that the filter blockage indicator will protect the internal combustion engine against accidental crankcase over pressurization. The liquid level switch or sensor is designed to prevent the filters within the liquid separator device from becoming partially or completely submerged in oil or other liquid. The liquid level switch therefore avoids degrading the operating efficiency of the liquid separating system and potential damage to the internal combustion engine.

Another advantage of providing the embodiment with the pair of receptacles and filter elements is that the device can be provided with a relatively small form factor or footprint in comparison with single filter element devices of the prior art. This provides a liquid separating device which is capable of a high flow capacity within a small device.

Another advantage is that the present invention can be utilised in both open and closed crankcase ventilation systems. Due to the low pressure insertion loss of the present invention, means the system will provide ideal protection for the turbocharger and other components installed downstream in the internal combustion engine.

The present invention has also been advantageously designed to allow the easy installation of the components within any engine compartment or other similar location. The smaller size of the present invention is particularly advantageous in modern vehicles where space is at a premium.

The incorporation of the liquid separating system in accordance with the present invention provides an internal combustion engine with greater levels of protection against pollution of the atmosphere and engine damage than less efficient separators or conventional open systems. The system also provides maintenance friendly fittings which do not require the respective components to be removed during maintenance.

The present invention during testing has provided a system for removing hydrophobic liquid from a blow-by gas stream, which provides exceptional performance for variable flow rates, flexible installation locations in the engine or in the engine compartment, compact design, light and robust design and integrated safety feature against irregularly high crankcase pressure.

Variations

It will be realized that the foregoing has been given by way of illustrative example only and that all other modifications and variations as would be apparent to persons skilled in the art are deemed to fall within the broad scope and ambit of the invention as herein set forth.

As used herein the term "and/or" means "and" or "or", or both.

As used herein "(s)" following a noun means the plural and/or singular forms of the noun.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the scope of the above described invention.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The invention claimed is:

1. A liquid separator system for an internal combustion engine, the liquid separator system comprising:
a liquid separating device for removing liquid particles from a blow-by gas stream from a crankcase, the liquid separating device comprising:
a housing having a removable housing portion mounted on a base housing portion, an inlet port, and an outlet port, wherein the housing comprises at least one receptacle configured to accommodate a filter element disposed within the at least one receptacle;
wherein the at least one receptacle comprises a pair of receptacles configured to accommodate a respective filter element positioned within each respective receptacle, the respective filter elements when positioned leaving a respective space between an external surface of the respective filter element and an internal surface of each respective receptacle;
wherein the liquid separator system further comprises a liquid level sensor provided to the housing, the liquid level sensor being configured to detect when a level of liquid within the housing has reached a predetermined level; and
wherein the liquid separator system further comprises a remote warning system configured to generate a warning signal for an operator of the internal combustion engine in response to the liquid level sensor detecting that said level of liquid in the housing has reached the predetermined level.

2. The liquid separator system as claimed in claim 1, wherein the predetermined level is a level below or adjacent the bottom of at least one respective filter element when said filter element is positioned within the at least one receptacle.

3. The liquid separator system as claimed in claim 1, wherein the liquid separator system comprises an electronic controller for communication between the liquid level sensor and the remote warning system.

4. The liquid separator system as claimed in claim 1, wherein the liquid separator system comprises a delay circuit, associated with the liquid level sensor, such that the remote warning system generates said warning signal for the operator of the internal combustion engine only in response to the liquid level sensor detecting liquid in the housing at the predetermined level for a predetermined amount of time.

5. The liquid separator system as claimed in claim 1, wherein the remote warning system comprises a warning unit for generating an audible and/or visual warning signal for the operator of the internal combustion engine, and wherein the warning unit is adapted to be located in the cabin of a vehicle of which the internal combustion engine is a part, during use of the vehicle.

6. The liquid separator system as claimed in claim 1, wherein the liquid level sensor is in fluid communication with a bottom portion of at least one said respective receptacle.

7. The liquid separator system as claimed in claim 1, wherein the liquid separator system further comprises a filter blockage sensor configured to detect a partially blocked filter element; and wherein the remote warning system is adapted to generate a filter blockage warning signal for an operator of the internal combustion engine in response to the filter blockage sensor detecting a partially blocked filter element.

8. The liquid separator system as claimed in claim 1, wherein the liquid separator system further comprises a pressure regulator configured to keep a predetermined crankcase pressure independent from a negative pressure of an engine air intake of the internal combustion engine.

9. The liquid separator system as claimed in claim 8, wherein the removable housing portion comprises a removable cap portion and further comprises a cover for securing said pressure regulator within the removable cap portion, wherein a plurality of slots extend around an underside of the cover, each slot extends axially from an outer periphery of the underside of the cover, when the cover is secured to the removable cap portion, the slots form an open space between the underside of the cover and the removable cap portion to open a space above the pressure regulator to atmosphere.

10. The liquid separator system as claimed in claim 8, wherein the pressure regulator comprises a moveable part and a biasing mechanism, wherein during operation of the liquid separator system the moveable part and the biasing mechanism open and close the outlet port to regulate the flow of blow-by gas to keep said predetermined crankcase pressure independent from said negative pressure of the engine air inlet.

11. The liquid separator system as claimed in claim 10, wherein the moveable part further comprises a surge reduction plate with cutouts in the surge reduction plate to reduce pressure surge and allow blow-by gas from the crankcase to maintain flow to the engine air inlet when the moveable part is in a closed position.

12. The liquid separator system as claimed in claim 1, wherein the inlet port is configured to be connected in fluid communication with the crankcase of the internal combustion engine, and is configured to receive blow-by gas from the crankcase of the internal combustion engine to assist in separation of liquid from the blow-by gas, and wherein the outlet port is configured to be connected in fluid communication with an engine air inlet, and to allow filtered blow-by gas to pass through the outlet port to the engine air inlet, and wherein the housing further has a drain port configured to be operable to allow liquid filtered from the blow-by gas to be removed from the base housing portion.

13. The liquid separator system as claimed in claim 12, wherein, in use, a differential pressure between the crankcase and the engine air inlet of the internal combustion engine draws the blow-by gas stream from the crankcase to maintain a regulated pressure within the crankcase and pass the blow-by gas stream through an inlet port, and the filter element separates liquid from the blow-by gas and drains the liquid to the bottom of the base housing portion to prevent passing the liquid in the blow-by gas to the engine air inlet.

14. The liquid separator system as claimed in claim 1, wherein the removable housing portion comprises a removable cap portion securable to the base housing portion by one or more fasteners to close an upper end of the base housing portion, wherein the outlet port is configured to extend from the removable cap portion, and wherein the removable cap portion is configured to be securable to the base housing portion in different rotational orientations to allow selection of a position of the outlet port with respect to the inlet port.

15. The liquid separator system as claimed in claim 1, wherein the liquid separator further comprises filter blocked valve in fluid connection with at least one said respective receptacle and configured to open and close a pressure relief port;

wherein the filter blocked valve comprises a moveable valve member and a biasing mechanism, wherein during operation of the liquid separator system when the filter element becomes partially blocked an increase in pressure within the crankcase and liquid separating device overcomes the biasing member and opens the moveable valve member to vent an amount of the flow of blow-by gas from the housing.

16. The liquid separator system as claimed in claim 15, wherein the filter blocked valve vents said amount of the flow of blow-by gas to flow back to the engine air inlet via the outlet port of the liquid separating device, or to flow to the atmosphere.

17. The liquid separator system as claimed in claim 15, wherein the moveable valve member further comprises an electric contact which is adapted to move with the moveable valve member between open and closed positions, the electrical contact forming a moving contact of a filter blocked sensor which is configured to activate the remote warning system.

18. The liquid separator system as claimed in claim 15, wherein the remote warning system is configured to generate: the warning signal in response to the liquid level sensor detecting that the level of liquid in the housing has reached the predetermined level; and the filter blockage warning signal in response to the filter blockage sensor detecting the partially blocked filter element, the warning and filter blockage warning signals being readily distinguishable therebetween.

19. The liquid separator system as claimed in claim 1, wherein each said respective space is annular.

* * * * *